(12) United States Patent
Tanaka et al.

(10) Patent No.: US 6,963,335 B2
(45) Date of Patent: Nov. 8, 2005

(54) ACTIVE MATRIX TYPE DISPLAY APPARATUS METHOD FOR DRIVING THE SAME, AND DISPLAY ELEMENT

(75) Inventors: Yukio Tanaka, Kyoto (JP); Katsuhiko Kumagawa, Neyagawa (JP); Masanori Kimura, Daitou (JP); Kazunori Komori, Sanda (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 368 days.

(21) Appl. No.: 10/049,583

(22) PCT Filed: Jun. 11, 2001

(86) PCT No.: PCT/JP01/04918
§ 371 (c)(1),
(2), (4) Date: Feb. 13, 2002

(87) PCT Pub. No.: WO01/96937
PCT Pub. Date: Dec. 20, 2001

(65) Prior Publication Data
US 2002/0154084 A1 Oct. 24, 2002

(30) Foreign Application Priority Data
Jun. 16, 2000 (JP) ........................... 2000-181101

(51) Int. Cl.$^7$ ................................ G09G 5/00
(52) U.S. Cl. ........................ 345/204; 345/208
(58) Field of Search .................. 345/204, 208, 345/58, 87, 63, 69, 92–100; 349/44, 178, 139

(56) References Cited

U.S. PATENT DOCUMENTS

| 4,789,223 | A | | 12/1988 | Kasahara et al. | |
|---|---|---|---|---|---|
| 5,032,830 | A | * | 7/1991 | Kuijk | 345/91 |
| 5,296,847 | A | * | 3/1994 | Takeda et al. | 345/92 |
| 5,561,442 | A | * | 10/1996 | Okada et al. | 345/94 |
| 5,706,023 | A | * | 1/1998 | Nagata et al. | 345/92 |
| 6,020,214 | A | | 2/2000 | Watanabe et al. | |
| 6,028,578 | A | * | 2/2000 | Ota et al. | 345/94 |
| 6,040,813 | A | * | 3/2000 | Takubo | 345/92 |
| 6,115,099 | A | * | 9/2000 | Yamamoto et al. | 349/178 |
| 6,331,845 | B1 | * | 12/2001 | Kitajima et al. | 345/88 |
| 6,359,608 | B1 | * | 3/2002 | Lebrun et al. | 345/100 |
| 6,496,170 | B1 | * | 12/2002 | Yoshida et al. | 345/87 |
| 6,590,552 | B1 | | 7/2003 | Yokoyama et al. | |
| 2004/0201809 | A1 | * | 10/2004 | Ohta et al. | 349/139 |

FOREIGN PATENT DOCUMENTS

| JP | 62-11829 | 1/1987 |
|---|---|---|
| JP | 11-38445 A | 5/1989 |
| JP | 2-913 A | 1/1990 |
| JP | 5-143021 A | 6/1993 |
| JP | 5-232509 A | 9/1993 |
| JP | 9-73101 A | 3/1997 |
| JP | 2000-81606 | 3/2000 |
| JP | 2000-147539 | 5/2000 |

OTHER PUBLICATIONS

Journal of the SID, 1/2, 1993 (pp. 211–218).
The Journal of the Institute of Image Information and Television Engineers, vol. 52, No. 7, 1998 (pp. 992–995).

* cited by examiner

*Primary Examiner*—Vijay Shankar
*Assistant Examiner*—Parbodh Dharia
(74) *Attorney, Agent, or Firm*—Hamre, Schumann, Mueller & Larson, P.C.

(57) ABSTRACT

An active matrix type display apparatus is provided that is inexpensive, has less crosstalk, has no flickering and a brightness gradient, and is suitable for a large screen size. The display apparatus includes a plurality of pixel electrodes arranged in a matrix, switching elements (TFTs) connected thereto, scanning electrodes, video signal electrodes, common electrodes, and a counter electrode, wherein liquid crystal, for example, is interposed between the pixel electrodes and the counter electrode. Assuming that a gate-drain capacitance is $C_{gd}$, a common electrode-pixel electrode capacitance is $C_{st}$, and the total capacitance connected to the pixel electrodes is $C_{tot}$ in this configuration, $\alpha_{gd}$ and $\alpha_{st}$ represented by $\alpha_{gd}=C_{gd}/C_{tot}$, $\alpha_{st}=C_{st}/C_{tot}$ are set to be different values between a portion close to feeding ends in a screen and a portion away therefrom.

22 Claims, 33 Drawing Sheets

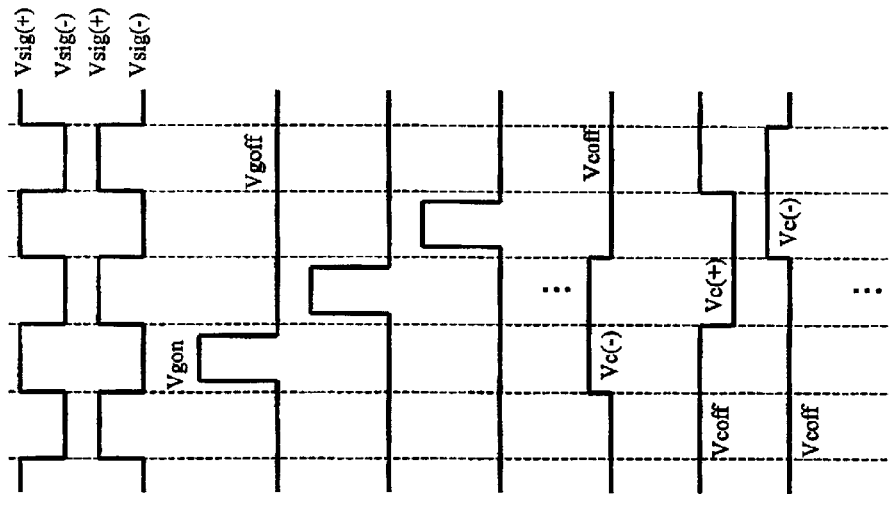
FIG. 6B (Even-number frame)
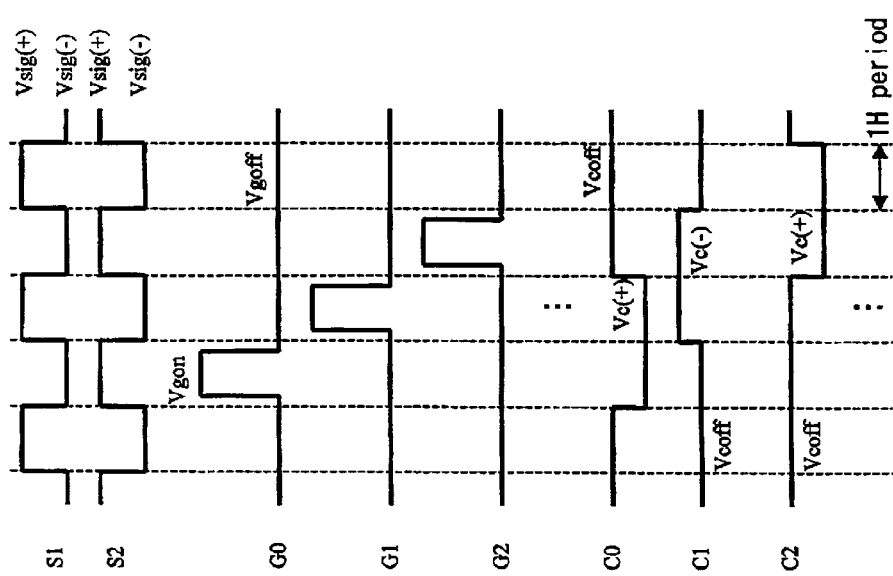
FIG. 6A (Odd-number frame)

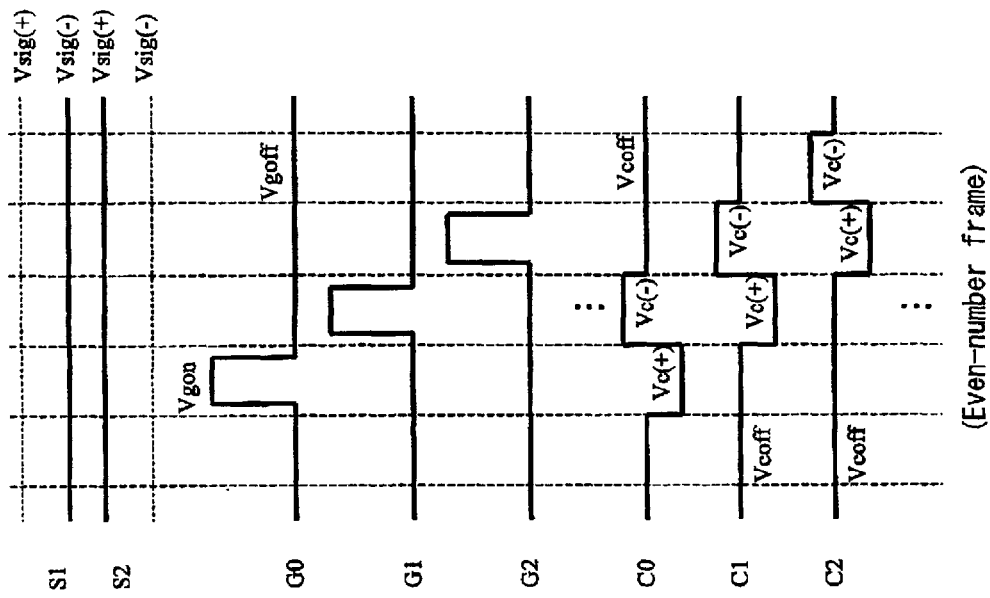
FIG. 7B (Even-number frame)
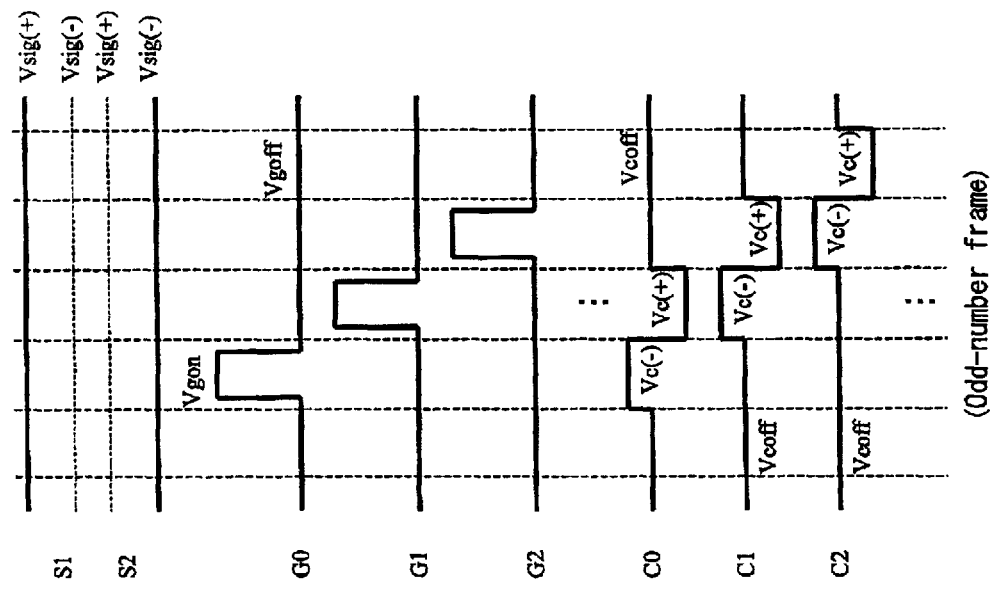
FIG. 7A (Odd-number frame)

FIG. 16A
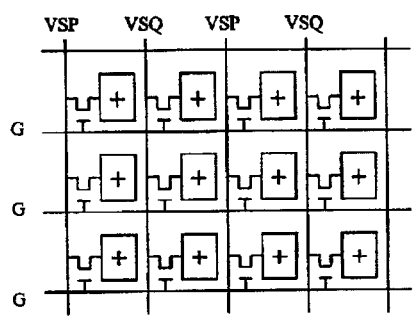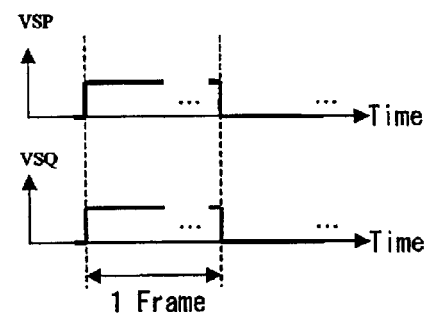
FIG. 16B
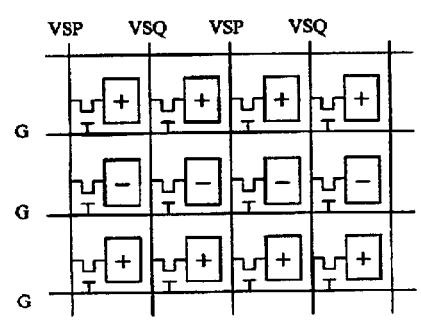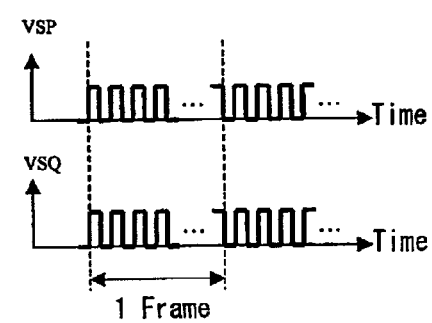
FIG. 16C
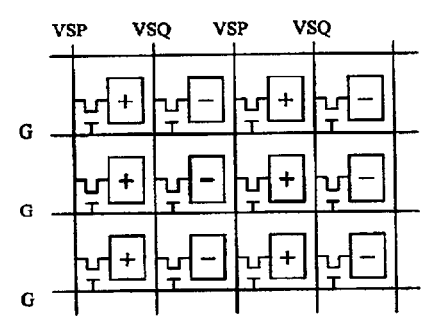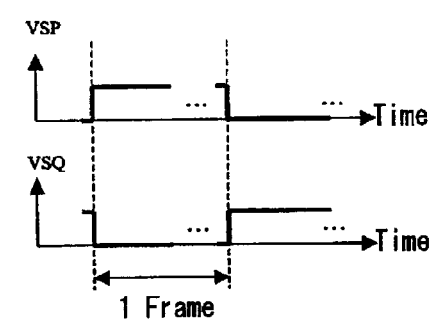
FIG. 16D
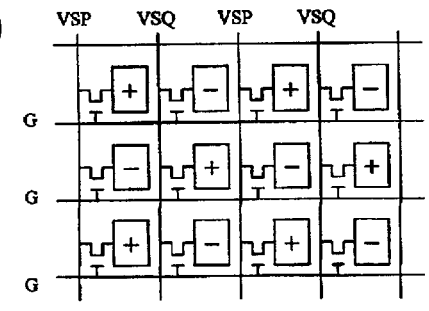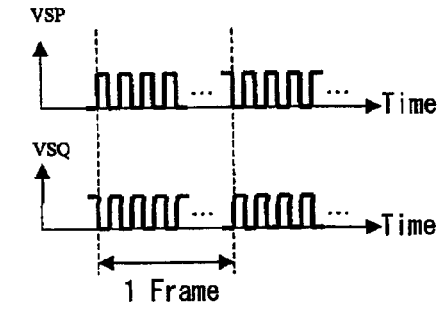

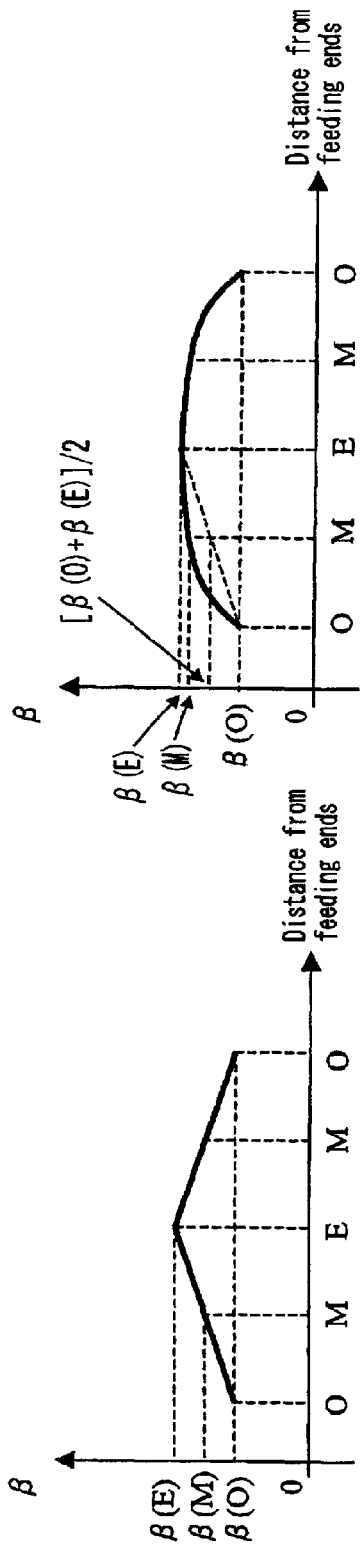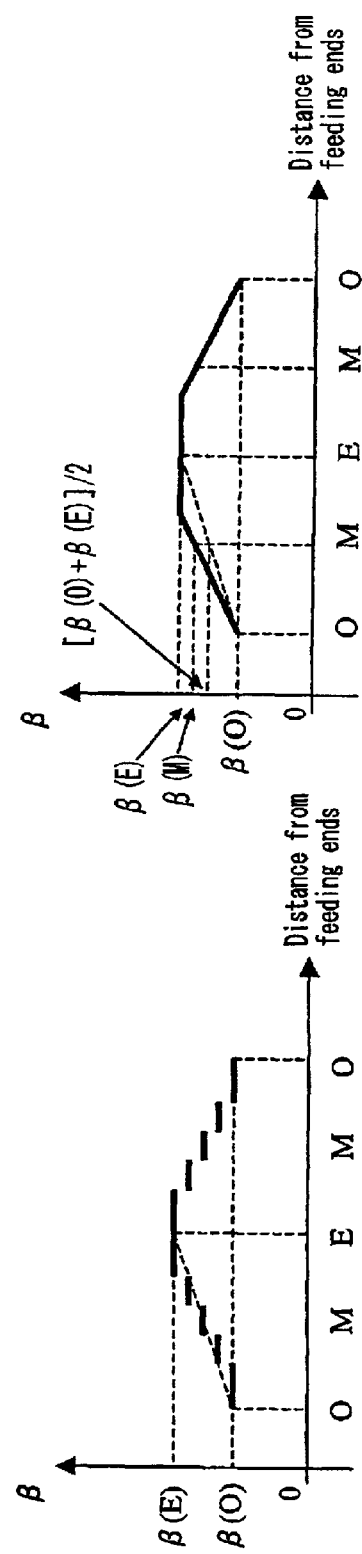

□ represents that a power is being supplied

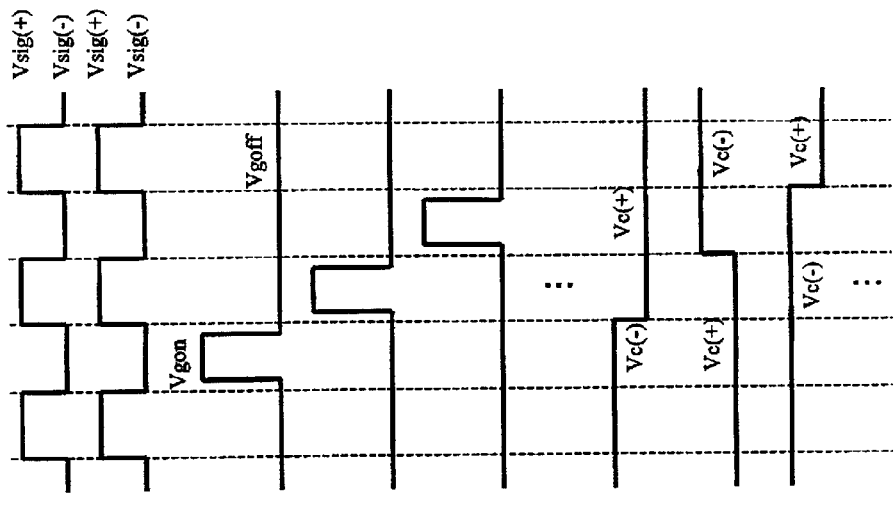
FIG. 28B (Even-number frame)
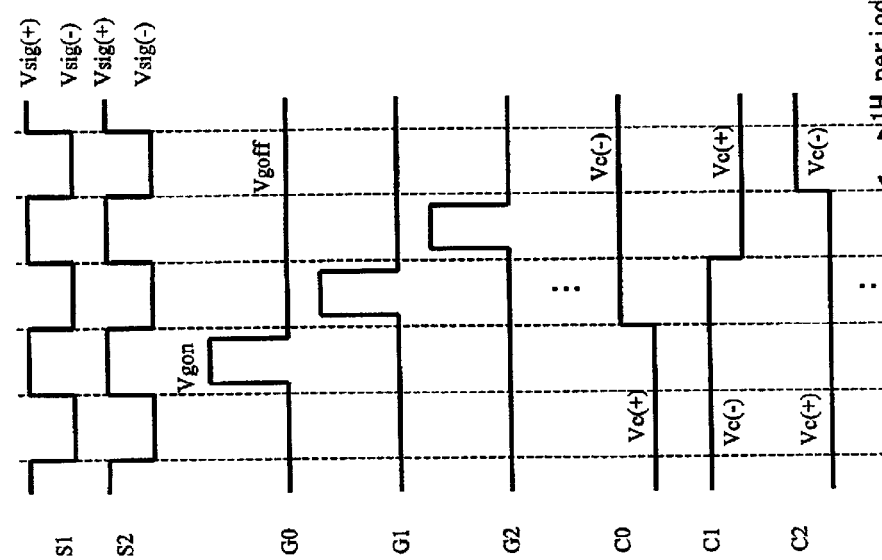
FIG. 28A (Odd-number frame)

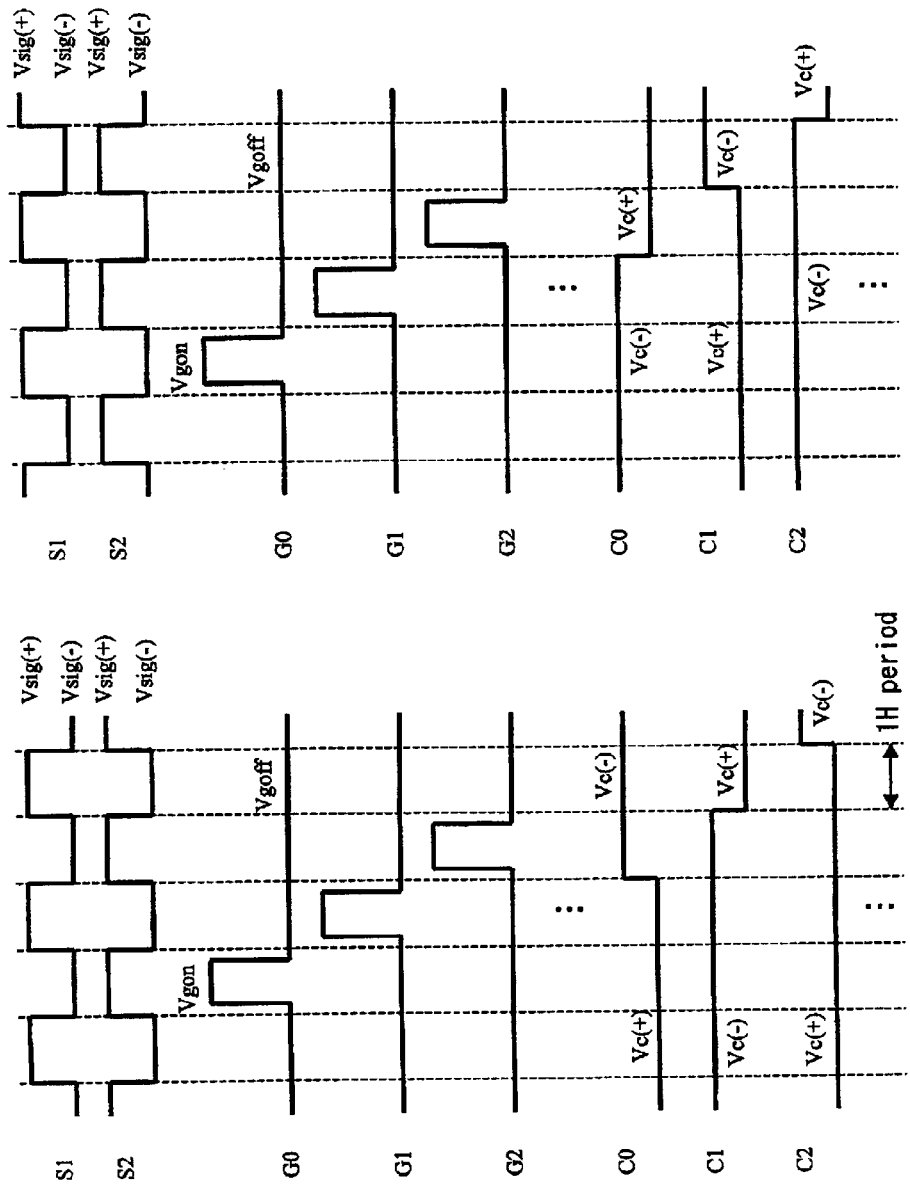

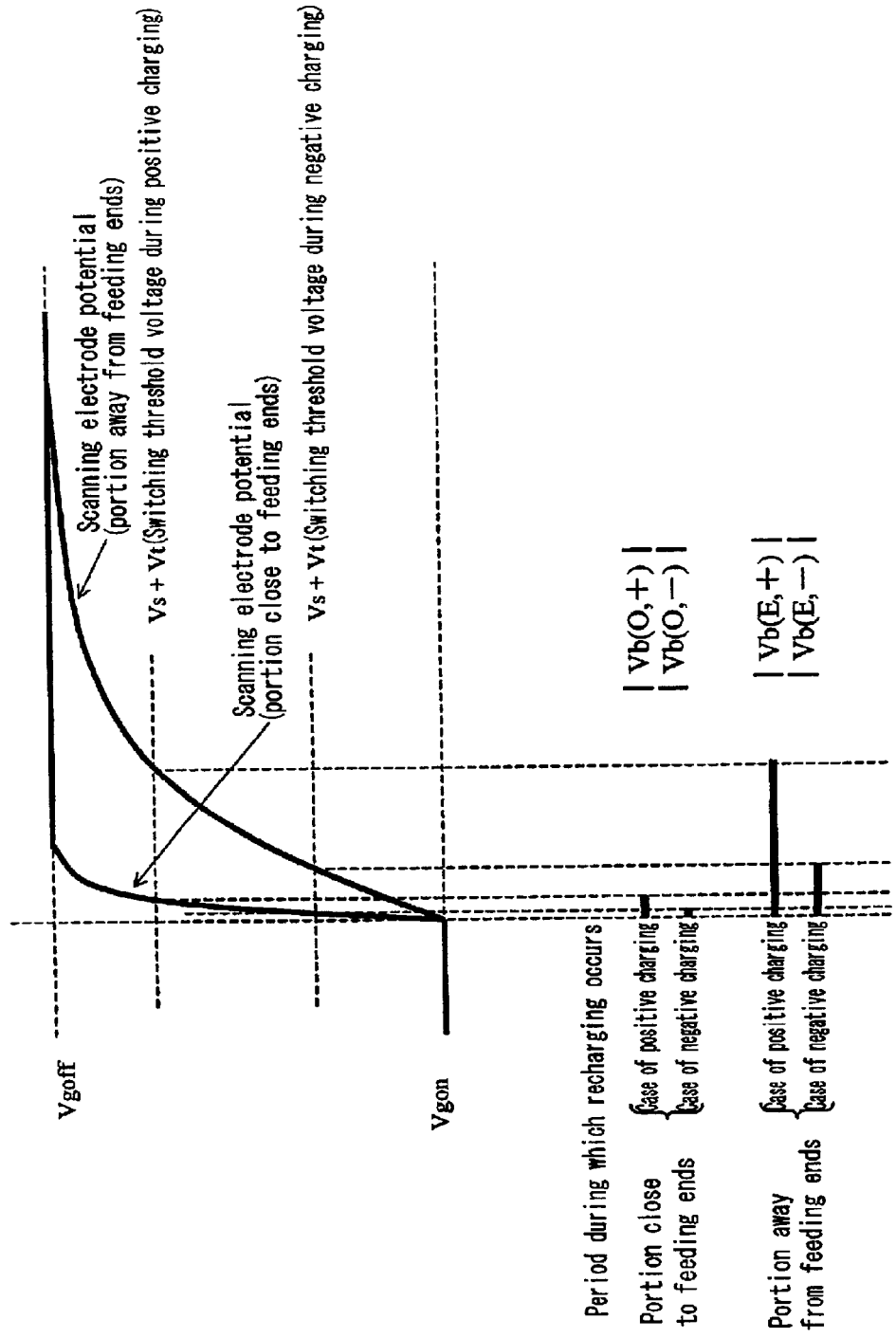
F I G. 30

ACTIVE MATRIX TYPE DISPLAY APPARATUS METHOD FOR DRIVING THE SAME, AND DISPLAY ELEMENT

TECHNICAL FIELD

The present invention relates to an active matrix type display apparatus using a switching element such as a thin film transistor, a method for driving the same, and a display element.

BACKGROUND ART

A display apparatus, for example, a liquid crystal display apparatus widely is used for various kinds of electronic equipment as a thin and light-weight flat display. In particular, an active matrix type liquid crystal display apparatus using a switching element such as a thin film transistor (TFT) actively is being applied to a monitor display for a personal computer, a liquid crystal TV, and the like due to its excellent image characteristics.

First, the basic configuration of an active matrix type display apparatus will be described with reference to FIG. 3. The display apparatus roughly is composed of a scanning signal driving circuit 21, a video signal driving circuit 22, and a display element 23. The display element includes, as its main components, a plurality of pixel electrodes 5 disposed in a matrix, a plurality of switching elements 3 (generally, a thin film transistor (TFT) or the like is used) arranged corresponding to the pixel electrodes 5, and a plurality of scanning electrodes 1 disposed in a line direction (horizontal direction) and a plurality of video signal electrodes 2 arranged in a column direction (vertical direction) corresponding to the matrix arrangement of the pixel electrodes. The video signal electrodes 2 are connected electrically to the pixel electrodes 5 via the switching elements 3. Furthermore, a counter electrode 20 is provided so as to oppose the pixel electrodes 5, and a display medium such as liquid crystal is inserted between the pixel electrodes 5 and the counter electrodes 20. Furthermore, electrodes called common electrodes 4 are provided in parallel with the scanning electrodes 1, and storage capacitors 7 are provided between the common electrodes 4 and the pixel electrodes 5. The video signal driving circuit 22 supplies a video signal to a plurality of video signal electrodes 2 of the display element 23. Furthermore, the scanning signal driving circuit 21 supplies a scanning signal for controlling conduction of the switching elements 3 to a plurality of scanning electrodes 1 of the display element 23.

JP 5(1993)-143021 discloses a method for driving an active matrix type liquid crystal display apparatus. According to this method, wiring called common electrodes is provided in parallel with scanning electrodes (gate electrodes or gate lines), storage capacitors are formed between the common electrodes and the pixel electrodes, the potential of the common electrodes is varied in synchronization with that of the scanning electrodes, and a superimposed voltage is applied to the potential of the pixel electrodes by capacitive coupling through the storage capacitors. Because of the effect of the superimposition of a voltage, a decrease in a video signal voltage (source voltage), a reduction in driving power, enhancement of response speed and driving reliability, and the like are achieved.

FIG. 14 is an equivalent circuit diagram of one pixel of a liquid crystal display apparatus in which a storage capacitance $C_{st}$ ($C_{st}$ is a common electrode-pixel electrode capacitance in more general terms) is formed between a common electrode and a pixel electrode. FIG. 15 is a diagram illustrating the potential of each portion in the case where the liquid crystal display apparatus 1 is driven. In FIG. 14, TFT represents a thin film transistor, $C_{gd}$ represents a gate-drain capacitance (scanning electrode-pixel electrode capacitance), $C_{lc}$ represents a pixel electrode-counter electrode capacitance (which is a capacitance mainly from liquid crystal; however, there also is a capacitance component generated by electrical addition in series or in parallel from the other medium. Alternatively, such a capacitance may be applied intentionally) formed between a pixel electrode and a counter electrode provided so as to oppose the pixel electrode with liquid crystal interposed therebetween, $V_g(n)$ represents the potential of a scanning electrode, $V_s$ represents the potential of a video signal, $V_d$ represents the potential of a pixel electrode, $V_d$ represents the potential of a counter electrode, and $V_c(n)$ represents the potential of a common electrode. The pixels are arranged in a matrix, and $V_g$ and $V_c$ are provided with a suffix "n" since the n-th pixel is paid attention to.

A plurality of scanning electrodes, pixel electrodes, and the like are arranged in a matrix. For a strict definition, based on a scanning electrode, a pixel (generally, there are a plurality of such pixels) whose ON/OFF (of a TFT) is controlled by the scanning electrode may be referred to as "a pixel belonging to the scanning electrode". In contrast, based on a pixel (or a pixel electrode), a scanning electrode that controls ON/OFF of a TFT of the pixel may be referred to as "a scanning electrode of the stage concerned". The pixel electrode ($V_d$) in FIG. 14 refers to "a pixel electrode belonging to the scanning electrode ($V_g(n)$), and the scanning electrode ($V_g(n)$) refers to "a scanning electrode of the stage concerned with respect to the pixel ($V_d$). Hereinafter, unless otherwise specified, the term "pixel (electrode)" or "scanning electrode" simply will be used.

There also are a plurality of common electrodes. Therefore, in the case of strictly specifying a common electrode, the expression "common electrode that is the other connection destination of storage capacitance connected to a pixel electrode" or the like will be used. The common electrode ($V_c(n)$) in FIG. 14 refers to "a common electrode that is the other connection destination of storage capacitance connected to the pixel electrode ($V_d$)". However, this also will be simply referred to as "a common electrode".

As shown in FIG. 15, in an odd-numbered frame, a video signal voltage takes a negative value based on $V_d$ (i.e., $V_{sig}(-)$). When the potential of a scanning electrode $V_g$ becomes an ON level (first potential level of a scanning electrode) $V_{gon}$, a TFT is brought into conduction (ON state), and the potential of a pixel $V_d$ is charged to $V_{sig}(-)$. At this time, the potential of a common electrode has a value $V_c(-)$ (second potential level of a common electrode). Then, under the condition that $V_g(n)$ is at an OFF level (second potential level of the scanning electrode) $V_{goff}$, the TFT is brought out of conduction (OFF state). Thereafter, when the potential of the common electrode is changed in a downward direction i.e., from $V_c(-)$ to $V_{coff}$ (third potential level of the common electrode), the pixel potential $V_d$ is superimposed with a coupling voltage proportional to the voltage difference in a downward direction (arrow in FIG. 15).

In an even-numbered frame, a video signal voltage takes a positive value based on $V_d$ (i.e., $V_{sig}(+)$). When a pixel is charged to $V_{sig}(+)$, the potential of the common electrode is set at $V_c(+)$ (first potential level of the common electrode). After discharging is completed and the potential of the scanning electrode falls, the potential of the common electrode is changed from $V_c(+)$ to $V_{coff}$ in an upward direction. The pixel potential $V_d$ is superimposed with a coupling voltage proportional to the voltage difference in an upward direction.

Consequently, while a voltage with a small amplitude ($V_{sig}(+)$ and $V_{sig}(-)$) is applied to a video signal electrode, a pixel electrode can be supplied with a voltage with a larger amplitude ($V_{do}(+)$ and $V_{do}(-)$). For example, by using an IC for a video signal of an output voltage range of 5 V, a voltage range applied to liquid crystal can be increased to 10 V or 15 V. Thus, while using an IC with a low withstand voltage, the liquid crystal can be driven with a voltage equal to or higher than the withstand voltage.

A period during which the potential of the common electrode becomes $V_c(+)$ or $V_c(-)$ will be referred to as a common electrode compensating period, and the voltage $V_c(\pm)$ will be referred to as a common electrode compensating voltage (compensating potential). Although it is desirable that $V_c(+)$ is different from $V_c(-)$, $V_{coff}$ may be the same voltage as either $V_c(+)$ or $V_c(-)$. Furthermore, the potential of the common electrode is not always required to be either $V_c(+)$ or $V_c(-)$ while the potential of the scanning electrode is $V_{gon}$. The potential of the common electrode should be at this value at least when the scanning electrode falls from $V_{gon}$ to $V_{goff}$ (more specifically, when a TFT is changed from an ON state to an OFF state).

The scanning signal driving circuit has two output levels, and the common electrode potential control circuit has three output levels. More specifically, the scanning signal driving circuit has a first potential level $V_{gon}$ and a second potential level $V_{goff}$, and the common electrode potential control circuit has a first potential level $V_c(+)$, a second potential level $V_c(-)$, and a third potential level $V_{coff}$. In general, three power sources are required of the common electrode potential driving circuit so as to correspond to the above-mentioned three potential levels. However, if either one of the first potential level $V_c(+)$ or the second potential level $V_c(-)$ is made equal to the third potential level $V_{coff}$, only two power sources are enough. Even in the case where either of the compensating potentials is equal to $V_{coff}$, the potential levels are considered to be different, so that three potential levels are considered to be present.

It is simply that the above-mentioned superimposition of a voltage is conservation of charge on a pixel electrode from a different point of view. More specifically, during a period from a time immediately before charging of a pixel is completed and the potential of a scanning electrode falls (the potential of the scanning electrode is $V_{gon}$) to a time when the common electrode compensating period is completed, charge of the pixel electrode is stored. Therefore, in each of the odd-numbered frame and the even-numbered frame, the following (Formula 11) is obtained.

$$C_{gd}(V_{sig}(-) - V_{gon}) + \quad \text{(Formula 11)}$$
$$C_{st}(V_{sig}(-) - V_c(-)) + C_{lc}(V_{sig}(-) - V_d) =$$
$$C_{gd}(V_{do}(-) - V_{goff}) + C_{st}(V_{do}(-) - V_{coff}) +$$
$$C_{lc}(V_{do}(-) - V_d) C_{gd}(V_{sig}(+) - V_{gon}) +$$
$$C_{st}(V_{sig}(+) - V_c(+)) + C_{lc}(V_{sig}(+) - V_d) =$$
$$C_{gd}(V_{do}(+) - V_{goff}) + C_{st}(V_{do}(+) - V_{coff}) +$$
$$C_{lc}(V_{do}(+) - V_d)$$

The following (Formulae 12) are obtained by modifying Formula 11.

$$V_{do}(-) = V_{sig}(-) - \alpha_{st}\Delta V_c(-) - \alpha_{gd}\Delta V_{gon}$$
$$V_{do}(+) = V_{sig}(+) - \alpha_{st}\Delta V_c(+) - \alpha_{gd}\Delta V_{gon} \quad \text{(Formula 12)}$$

$\Delta V_{gon}$, $\Delta V_c(+)$, $\Delta V_c(-)$, and $\alpha_{gd}$, $\alpha_{st}$ are represented by the following (Formula 13) and (Formula 14).

$$\Delta V_{gon} = V_{gon} - V_{goff}$$
$$\Delta V_c(+) = V_c(+) - V_{coff}$$
$$\Delta V_c(-) = V_c(-) - V_{coff} \quad \text{(Formula 13)}$$
$$\alpha_{gd} = C_{gd}/C_{tot}$$
$$\alpha_{st} = C_{st}/C_{tot}$$
$$C_{tot} = C_{gd} + C_{lc} + C_{st} \quad \text{(Formula 14)}$$

In both (Formulae 12), the second term of the right side corresponds to a superimposed portion by a (capacitive) coupling voltage from the common electrode, and is determined by $\Delta V_c(+)$ or $\Delta V_c(-)$. $\Delta V_c(+)$ or $\Delta V_c(-)$ is a value of a potential (in this case, $V_c(+)$ or $V_c(-)$), at a moment when a pixel is charged, of a common electrode to which storage capacitance is connected, based on the potential (in this case, $V_{coff}$) in a retained state. The third term of the right side of (Formulae 12) is a (capacitive) coupling voltage from a scanning electrode, and is called a feedthrough. $C_{tot}$ in (Formula 14) can be considered as the total capacitance electrically connected to the pixel electrode.

As described with reference to FIG. 15, the pixel electrode is charged with a signal voltage with its polarity inverted per frame. At this time, it may be possible that the entire screen is set at the same polarity, and the polarity is inverted per frame (field inversion system). In addition, there are a system of inverting the polarity per line (line inversion system), a system of inverting the polarity per column (column inversion system), and a system of inverting the polarity in a checkered pattern by combining the line inversion and the column inversion (dot inversion system). A charging pattern of a pixel by each system is drawn as in FIGS. 16A, 16B, 16C, and 16D. Voltage waveforms applied to video signal electrodes $V_{SP}$ and $V_{SQ}$ adjacent to each other can be drawn as shown on the right side of each figure.

In the case of the field inversion and the column inversion, the polarity of a video signal applied to a video signal electrode in one frame is constant. However, in the case of the line inversion and the dot inversion, the polarity of a video signal is inverted every time each scanning electrode is selected. Furthermore, in the case of the field inversion and the line inversion, the polarity is the same between the adjacent video signal electrodes. However, in the case of the column inversion and the dot inversion, the polarity becomes opposite between the adjacent video signal electrodes. In the case of the column inversion and the dot inversion, the video signal driving circuit has a function of simultaneously applying two kinds (i.e., positive polarity and negative polarity) of video signals having different polarities to a plurality of video signal electrodes.

Among the respective systems, S. Tomita et al. (Journal of the SID, ½ (1993), pp. 211–218) describe in detail that horizontal crosstalk is likely to occur in the field inversion and the line inversion. Hereinafter, this will be summarized.

In the field inversion and the line inversion, when a scanning electrode is selected to charge pixel electrodes, all the pixel electrodes are charged with the same polarity. More specifically, the potential of pixel electrodes in the corresponding line changes from a negative voltage to a positive voltage in the case of the even-numbered field, and the potential of pixel electrodes in the corresponding line changes from a positive voltage to a negative voltage in the case of the odd-numbered field. Then, the potential of a counter electrode fluctuates via the capacitance (liquid crystal capacitance also is included) between the pixel electrodes and the counter electrode (since the counter electrode has a finite sheet resistance, even if the potential is fixed at the end of a screen, the potential slightly fluctuates in the screen), the potential charged to the pixel also fluctuates due to the influence; as a result, crosstalk may occur. This also may be considered to occur since $V_d$ appearing on both sides of (Formula 11) due to the fluctuations in the potential of a common electrode become different values between the left side and the right side, and the retention potential $V_{do}(\pm)$ of the pixel electrode does not become a value represented by (Formula 12).

In contrast, in the case of the column inversion and the dot inversion, when scanning electrodes in a line are selected to charge pixels, the polarity of charging is opposite between adjacent pixels. Therefore, the fluctuations in the potential of the common electrodes via the pixel electrode-common electrode capacitance cancel each other, whereby the above-mentioned crosstalk does not occur.

For the above-mentioned reasons, it is desirable to adopt the column inversion or the dot inversion.

However, in a liquid crystal display apparatus that changes the potential of a common electrode by the driving method as described in FIG. 15 with the circuit configuration in FIG. 3, the following becomes apparent: as a screen size increases, flickering and a brightness gradient (brightness inconsistency) occur conspicuously.

Furthermore, when a screen size increases, the potential of a counter electrode for writing a video signal fluctuates largely, and horizontal crosstalk becomes conspicuous. Therefore, it is required to adopt the column inversion or the dot inversion that is a driving system advantageous to horizontal crosstalk. However, in the case of adopting the driving method of FIG. 15 with the circuit configuration of FIG. 3, by controlling the potential of a common electrode at a moment when a scanning electrode is selected, a predetermined superimposed voltage with the same polarity as that of a video signal is applied to all the pixels belonging to this line to obtain the effect of an increased amplitude of the retention potential of pixel electrodes. Therefore, in the case of the driving system in which a video signal with positive and negative polarities is applied while a scanning electrode is selected as in the column inversion and the dot inversion, the effect of an increased amplitude of the retention potential of a pixel electrode cannot be obtained (more specifically, the voltage of a video signal driving circuit IC cannot be lowered). More specifically, the problems in the prior art lie in that a video display apparatus capable of lowering the voltage of the video signal driving circuit IC and reducing horizontal crosstalk cannot be achieved.

DISCLOSURE OF INVENTION

The present invention has been achieved in view of the above-mentioned problems, and its object is to provide a display apparatus capable of reducing flickering and a brightness gradient, and lowering the voltage of a video signal driving circuit IC and reducing horizontal crosstalk, a method for driving the same, and a display element.

In order to achieve the above-mentioned object, a first display apparatus of the present invention includes: a plurality of pixel electrodes arranged in a matrix; switching elements connected thereto; scanning electrodes; video signal electrodes; common electrodes; a counter electrode; a display medium interposed between the pixel electrodes and the counter electrode; and storage capacitance formed between the pixel electrodes and the common electrodes, wherein, in a case where a scanning electrode-pixel electrode capacitance between the pixel electrodes and the scanning electrodes is represented by $C_{gd}$, a common electrode-pixel electrode capacitance between the pixel electrodes and the common electrodes is represented by $C_{st}$, and a total capacitance connected electrically to the pixel electrodes is represented by $C_{tot}$, $\alpha_{gd}$ and $\alpha_{st}$ represented by $$\alpha_{gd}=C_{gd}/C_{tot}, \alpha_{st}=C_{st}/C_{tot} \qquad \text{(Formula 1)}$$

are set to be different values between a portion close to feeding ends in a screen and a portion away therefrom.

It is preferable that the first display apparatus includes a video signal driving circuit for applying two kinds of video signals having different polarities to video signal electrodes in accordance with a display period.

Furthermore, it is preferable that the first display apparatus includes a common electrode potential control circuit for applying a voltage signal to a plurality of common electrodes and a scanning signal driving circuit for applying a voltage signal to a plurality of scanning electrodes, the common electrode potential control circuit has output potential levels of at least two values, and the scanning signal driving circuit has output potential levels of at least two values.

It is preferable that a potential of a scanning electrode becomes a first potential level $V_{gon}$ when the scanning electrode is selected and becomes substantially a second potential level $V_{goff}$ during a retention period in which the scanning electrode is not selected, a potential of a common electrode that is a connection destination of storage capacitance connected to pixel electrodes of a plurality of pixels belonging to the scanning electrode becomes a first potential level $V_c(+)$ in a case where a polarity of a video signal is positive and a second potential level $V_c(-)$ in a case where the polarity of the video signal is negative, when the scanning electrode is selected, and in a case where a difference between the first potential level $V_c(+)$ of the common electrode and a potential during a subsequent retention period is represented by $\Delta V_c(+)$, and a difference between the second potential level $V_c(-)$ of the common electrode and a potential during a subsequent retention period is represented by $\Delta V_c(-)$, γ represented by $$\gamma=\alpha_{st}V_{cp}/2 \qquad \text{(Formula 2)}$$
$$\text{(where } V_{cp}=\Delta V_c(+)-\Delta V_c(-)\text{)} \qquad \text{(Formula 3))}$$

is set to be smaller in the portion away from the feeding ends in the screen, compared with the portion close thereto.

In this case, it is preferable that, assuming that a value of γ in the portion close to the feeding ends in the screen is γ(O), a value of γ in the portion away from the feeding ends in the screen is γ(E), and a value of γ in a portion in a middle therebetween in terms of a distance is γ(M), γ(M) is smaller than [γ(O)+γ(E)]/2.

Furthermore, it is preferable that $V_{cp}$ takes a negative value.

In the first display apparatus, it is preferable that a potential of a scanning electrode becomes a first potential level $V_{gon}$ when the scanning electrode is selected and becomes substantially a second potential level $V_{goff}$ during a retention period in which the scanning electrode is not selected, a potential of a common electrode that is a connection destination of storage capacitance connected to pixel electrodes of a plurality of pixels belonging to the scanning electrode becomes a first potential level $V_c(+)$ in a case where a polarity of a video signal is positive and a second potential level $V_c(-)$ in a case where the polarity of the video signal is negative, when the scanning electrode is selected, and in a case where a difference between the first potential level $V_c(+)$ of the common electrode and a potential during a subsequent retention period is represented by $\Delta V_c(+)$, and a difference between the second potential level $V_c(-)$ of the common electrode and a potential during a subsequent retention period is represented by $\Delta V_c(-)$, β represented by $$\beta = \alpha_{gd} + \alpha_{st}(\Delta V_{cc}/\Delta V_{gon}) \quad \text{(Formula 4)}$$

$$\text{(where } \Delta V_{gon} = V_{gon} - V_{goff}, \Delta V_{cc} = [\Delta V_c(+) + \Delta V_c(-)]/2 \text{)} \quad \text{(Formula 5)}$$

is set to be larger in the portion away from the feeding ends in the screen, compared with the portion close thereto.

In this case, it is preferable that, assuming that a value of β in the portion close to the feeding ends in the screen is β(O), a value of β in the portion away from the feeding ends in the screen is β(E) and a value of β in a portion in a middle therebetween in terms of a distance is β(M), β(M) is larger than [β(O)+β(E)]/2.

Furthermore, it is preferable that $\Delta V_{cc}$ is negative.

In the first display apparatus, it is preferable that a potential of a scanning electrode becomes a first potential level $V_{gon}$ when the scanning electrode is selected and becomes substantially a second potential level $V_{goff}$ during a retention period in which the scanning electrode is not selected, a potential of a common electrode that is a connection destination of storage capacitance connected to pixel electrodes of a plurality of pixels belonging to the scanning electrode becomes a first potential level $V_c(+)$ in a case where a polarity of a video signal is positive and a second potential level $V_c(-)$ in a case where the polarity of the video signal is negative, when the scanning electrode is selected, in a case where a difference between the first potential level $V_c(+)$ of the common electrode and a potential during a subsequent retention period is represented by $\Delta V_c(+)$, and a difference between the second potential level $V_c(-)$ of the common electrode and a potential during a subsequent retention period is represented by $\Delta V_c(-)$, γ represented by $$\gamma = \alpha_{st} V_{cp}/2 \quad \text{(Formula 2)}$$

$$\text{(where } V_{cp} = \Delta V_c(+) - \Delta V_c(-) \text{)} \quad \text{(Formula 3)}$$

is set to be smaller in the portion away from the feeding ends in the screen, compared with the portion close thereto, and β represented by $$\beta = \alpha_{gd} + \alpha_{st}(\Delta V_{cc}/\Delta V_{gon}) \quad \text{(Formula 4)}$$

$$\text{(where } \Delta V_{gon} = V_{gon} - V_{goff}, \Delta V_{cc} = [\Delta V_c(+) + \Delta V_c(-)]/2 \text{)} \quad \text{(Formula 5)}$$

is set to be larger in the portion away from the feeding ends in the screen, compared with the portion close thereto.

In order to achieve the above-mentioned object, a second display apparatus of the present invention includes: a plurality of pixel electrodes arranged in a matrix; switching elements connected thereto; scanning electrodes; video signal electrodes; common electrodes; a counter electrode; a display medium interposed between the pixel electrodes and the counter electrode; and storage capacitance formed between the pixel electrodes and either of the common electrodes, a plurality of the common electrodes that are connection destinations of the storage capacitance being connected to the pixel electrodes of a plurality of pixels belonging to one of the scanning electrodes, wherein, in a case where a scanning electrode-pixel electrode capacitance between the pixel electrodes and the scanning electrodes is represented by $C_{gd}$, a common electrode-pixel electrode capacitance between the pixel electrodes and the common electrodes is represented by $C_{st}$, and a total capacitance connected electrically to the pixel electrodes is represented by $C_{tot}$, $\alpha_{gd}$ and $\alpha_{st}$ represented by $$\alpha_{gd} = C_{gd}/C_{tot}, \alpha_{st} = C_{st}/C_{tot} \quad \text{(Formula 1)}$$

are set to be different values between a portion close to feeding ends in a screen and a portion away therefrom.

It is preferable that the second display apparatus includes a video signal driving circuit for simultaneously applying two kinds of video signals having different polarities to a plurality of video signal electrodes, and applying two kinds of video signals having different polarities to each of the video signal electrodes in accordance with a display period.

Furthermore, it is preferable that the second display apparatus includes a first common electrode that is a connection destination of storage capacitance connected to pixel electrodes of pixels belonging to a video signal electrode to which a video signal with a first polarity is applied among a plurality of pixels belonging to one of the scanning electrodes, and a second common electrode that is different from the first common electrode and is a connection destination of the storage capacitance connected to the pixel electrodes of the pixels belonging to the video signal electrode to which the video signal with a second polarity is applied.

Furthermore, it is preferable that the second display apparatus includes a common electrode potential control circuit for applying a voltage signal to a plurality of common electrodes and a scanning signal driving circuit for applying a voltage signal to a plurality of scanning electrodes, the common electrode potential control circuit has output potential levels of at least two values, and the scanning signal driving circuit has output potential levels of at least two values.

Furthermore, it is preferable that a potential of a scanning electrode becomes a first potential level $V_{gon}$ when the scanning electrode is selected and becomes substantially a second potential level $V_{goff}$ during a retention period in which the scanning electrode is not selected, among common electrodes that are connection destinations of storage capacitance connected to pixel electrodes of a plurality of pixels belonging to the scanning electrode, a potential of the first common electrode becomes a first potential level $V_c(+)$ in a case where a polarity of a video signal applied to a video signal electrode corresponding to the first common electrode is positive and a second potential level $V_c(-)$ in a case where the polarity of the video signal is negative, when the scanning electrode is selected, a potential of the second common electrode becomes a first potential level $V_c(+)$ in a case where the polarity of the video signal applied to the video signal electrode corresponding to the second common electrode is positive and a second potential level $V_c(-)$ in a case where the polarity of the video signal is negative, when the scanning electrode is selected, and in a case where a difference between the first potential level $V_c(+)$ of the common electrode and a potential during a subsequent retention period is represented by $\Delta V_c(+)$, and a difference between the second potential level $V_c(-)$ of the common electrode and a potential during a subsequent retention period is represented by $\Delta V_c(-)$, γ represented by $$\gamma = \alpha_{st} V_{cp}/2 \quad \text{(Formula 2)}$$

$$\text{(where } V_{cp} = \Delta V_c(+) - \Delta V_c(-)) \quad \text{(Formula 3))}$$

is set to be smaller in the portion away from the feeding ends in the screen, compared with the portion close thereto.

In this case, it is preferable that, assuming that a value of γ in the portion close to the feeding ends in the screen is γ(O), a value of γ in the portion away from the feeding ends in the screen is γ(E), and a value of γ in a portion in a middle therebetween in terms of a distance is γ(M), γ(M) is smaller than $[\gamma(O)+\gamma(E)]/2$.

Furthermore, it is preferable that $V_{cp}$ is negative.

In the second display apparatus, it is preferable that a potential of a scanning electrode becomes a first potential level $V_{gon}$ when the scanning electrode is selected and becomes substantially a second potential level $V_{goff}$ during a retention period in which the scanning electrode is not selected, among common electrodes that are connection destinations of storage capacitance connected to pixel electrodes of a plurality of pixels belonging to the scanning electrodes, a potential of the first common electrode becomes a first potential level $V_c(+)$ in a case where a polarity of a video signal applied to a video signal electrode corresponding to the first common electrode is positive and a second potential level $V_c(-)$ in a case where the polarity of the video signal is negative, when the scanning electrode is selected, a potential of the second common electrode becomes a first potential level $V_c(+)$ in a case where the polarity of the video signal applied to the video signal electrode corresponding to the second common electrode is positive and a second potential level $V_c(-)$ in a case where the polarity of the video signal is negative, when the scanning electrode is selected, and in a case where a difference between the first potential level $V_c(+)$ of the common electrode and a potential during a subsequent retention period is represented by $\Delta V_c(+)$, and a difference between the second potential level $V_c(-)$ of the common electrode and a potential during a subsequent retention period is represented by $\Delta V_c(-)$, β represented by $$\beta = \alpha_{gd} + \alpha_{st}(\Delta V_{cc}/\Delta V_{gon}) \quad \text{(Formula 4)}$$

$$\text{(where } \Delta V_{gon} = V_{gon} - V_{goff}, \Delta V_{cc} = [\Delta V_c(+) + \Delta V_c(-)]/2) \quad \text{(Formula 5))}$$

is set to be larger in the portion away from the feeding ends in the screen, compared with the portion close thereto.

In this case, it is preferable that, assuming that a value of β in the portion close to the feeding ends in the screen is β(O), a value of β in the portion away from the feeding ends in the screen is β(E), and a value of β in a portion in a middle therebetween in terms of a distance is β(M), β(M) is larger than $[\beta(O)+\beta(E)]/2$.

Furthermore, it is preferable that $\Delta V_{cc}$ is negative.

In the second display apparatus, it is preferable that a potential of a scanning electrode becomes a first potential level $V_{gon}$ when the scanning electrode is selected and becomes substantially a second potential level $V_{goff}$ during a retention period in which the scanning electrode is not selected, among common electrodes that are connection destinations of storage capacitance connected to pixel electrodes of a plurality of pixels belonging to the scanning electrodes, a potential of the first common electrode becomes a first potential level $V_c(+)$ in a case where a polarity of a video signal applied to a video signal electrode corresponding to the first common electrode is positive and a second potential level $V_c(-)$ in a case where the polarity of the video signal is negative, when the scanning electrode is selected, a potential of the second common electrode becomes a first potential level $V_c(+)$ in a case where the polarity of the video signal applied to the video signal electrode corresponding to the second common electrode is positive and a second potential level $V_c(-)$ in a case where the polarity of the video signal is negative, when the scanning electrode is selected, in a case where a difference between the first potential level $V_c(+)$ of the common electrode and a potential during a subsequent retention period is represented by $\Delta V_c(+)$, and a difference between the second potential level $V_c(-)$ of the common electrode and a potential during a subsequent retention period is represented by $\Delta V_c(-)$, γ represented by $$\gamma = \alpha_{st} V_{cp}/2 \quad \text{(Formula 2)}$$

$$\text{(where } V_{cp} = \Delta V_c(+) - \Delta V_c(-)) \quad \text{(Formula 3))}$$

is set to be smaller in the portion away from the feeding ends in the screen, compared with the portion close thereto, and β represented by $$\beta = \alpha_{gd} + \alpha_{st}(\Delta V_{cc}/\Delta V_{gon}) \quad \text{(Formula 4)}$$

$$\text{(where } \Delta V_{gon} = V_{gon} - V_{goff}, \Delta V_{cc} = [\Delta V_c(+) + \Delta V_c(-)]/2) \quad \text{(Formula 5))}$$

is set to be larger in the portion away from the feeding ends in the screen, compared with the portion close thereto.

In order to achieve the above-mentioned object, a third display apparatus of the present invention includes: a plurality of pixel electrodes arranged in a matrix; switching elements connected thereto; scanning electrodes; video signal electrodes; common electrodes; a display medium interposed between the pixel electrodes and the common electrodes; and storage capacitance formed between electrodes, other than the common electrodes opposing the pixel electrodes via the display medium and the scanning electrodes of the stage concerned, and the pixel electrodes, wherein, in a case where a scanning electrode-pixel electrode capacitance between the pixel electrodes and the scanning electrodes is represented by $C_{gd}$, a common electrode-pixel electrode capacitance between the pixel electrodes and the common electrodes is represented by $C_{lc}$, and a total capacitance connected electrically to the pixel electrodes is represented by $C_{tot}$, $\alpha_{gd}$ and $\alpha_{lc}$ represented by $$\alpha_{gd} = C_{gd}/C_{tot}, \alpha_{lc} = C_{lc}/C_{tot} \quad \text{(Formula 6)}$$

are set to be different values between a portion close to feeding ends in a screen and a portion away therefrom.

It is preferable that the third display apparatus includes a video signal driving circuit for applying two kinds of video signals having different polarities to video signal electrodes in accordance with a display period.

Furthermore, it is preferable that the third display apparatus includes a common electrode potential control circuit for applying a voltage signal to a plurality of common electrodes and a scanning signal driving circuit for applying a voltage signal to a plurality of scanning electrodes, the common electrode potential control circuit has output potential levels of at least two values, and the scanning signal driving circuit has output potential levels of at least two values.

In the third display apparatus, it is preferable that a potential of a scanning electrode becomes a first potential level $V_{gon}$ when the scanning electrode is selected and becomes substantially a second potential level $V_{goff}$ during a retention period in which the scanning electrode is not selected, a potential of a common electrode that opposes pixel electrodes of a plurality of pixels belonging to the scanning electrode via the display medium becomes a first potential level $V_c(+)$ in a case where a polarity of a video signal is positive and a second potential level $V_c(-)$ in a case where the polarity of the video signal is negative, when the scanning electrode is selected, and in a case where a difference between the first potential level $V_c(+)$ of the common electrode and a potential during a subsequent retention period is represented by $\Delta V_c(+)$, and a difference between the second potential level $V_c(-)$ of the common electrode and a potential during a subsequent retention period is represented by $\Delta V_c(-)$, γ represented by $$\gamma = \alpha_{lc} V_{cp}/2 \qquad \text{(Formula 7)}$$

$$(\text{where } V_{cp} = \Delta V_c(+) - \Delta V_c(-)) \qquad \text{(Formula 8))}$$

is set to be smaller in the portion away from the feeding ends in the screen, compared with the portion close thereto.

In this case, it is preferable that, assuming that a value of γ in the portion close to the feeding ends in the screen is γ(O), a value of γ in the portion away from the feeding ends in the screen is γ(E), and a value of γ in a portion in a middle therebetween in terms of a distance is γ(M), γ(M) is smaller than [γ(O)+γ(E)]/2.

Furthermore, it is preferable that $V_{cp}$ is negative.

In the third display apparatus, it is preferable that a potential of a scanning electrode becomes a first potential level $V_{gon}$ when the scanning electrode is selected and becomes substantially a second potential level $V_{goff}$ during a retention period in which the scanning electrode is not selected, a potential of a common electrode that opposes pixel electrodes of a plurality of pixels belonging to the scanning electrodes via the display medium becomes a first potential level $V_c(+)$ in a case where a polarity of a video signal is positive and a second potential level $V_c(-)$ in a case where the polarity of the video signal is negative, when the scanning electrode is selected, and in a case where a difference between the first potential level $V_c(+)$ of the common electrode and a potential during a subsequent retention period is represented by $\Delta V_c(+)$, and a difference between the second potential level $V_c(-)$ of the common electrode and a potential during a subsequent retention period is represented by $\Delta V_c(-)$, β represented by $$\beta = \alpha_{gd} + \alpha_{lc}(\Delta V_{cc}/\Delta V_{gon}) \qquad \text{(Formula 9)}$$

$$(\text{where } \Delta V_{gon} = V_{gon} - V_{goff}, \Delta V_{cc} = [\Delta V_c(+) + \Delta V_c(-)]/2 \qquad \text{(Formula 10))}$$

is set to be larger in the portion away from the feeding ends in the screen, compared with the portion close thereto.

In this case, it is preferable that, assuming that a value of β in the portion close to the feeding ends in the screen is β(O), a value of β in the L portion away from the feeding ends in the screen is β(E), and a value of β in a portion in a middle therebetween in terms of a distance is β(M), β(M) is larger than [β(O)+β(E)]/2.

Furthermore, it is preferable that $\Delta V_{cc}$ is negative.

In the third display apparatus, it is preferable that a potential of a scanning electrode becomes a first potential level $V_{gon}$ when the scanning electrode is selected and becomes substantially a second potential level $V_{goff}$ during a retention period in which the scanning electrode is not selected, a potential of a common electrode that opposes pixel electrodes of a plurality of pixels belonging to the scanning electrode via the display medium becomes a first potential level $V_c(+)$ in a case where a polarity of a video signal is positive and a second potential level $V_c(-)$ in a case where the polarity of the video signal is negative, when the scanning electrode is selected, in a case where a difference between the first potential level $V_c(+)$ of the common electrode and a potential during a subsequent retention period is represented by $\Delta V_c(+)$, and a difference between the second potential level $V_c(-)$ of the common electrode and a potential during a subsequent retention period is represented by $\Delta V_c(-)$, γ represented by $$\gamma = \alpha_{lc} V_{cp}/2 \qquad \text{(Formula 7)}$$

$$(\text{where } V_{cp} = \Delta V_c(+) - \Delta V_c(-)) \qquad \text{(Formula 8))}$$

is set to be smaller in the portion away from the feeding ends in the screen, compared with the portion close thereto, and β represented by $$\beta = \alpha_{gd} + \alpha_{lc}(\Delta V_{cc}/\Delta V_{gon}) \qquad \text{(Formula 9)}$$

$$(\text{where } \Delta V_{gon} = V_{gon} - V_{goff}, \Delta V_{cc} = [\Delta V_c(+) + \Delta V_c(-)]/2 \qquad \text{(Formula 10))}$$

is set to be larger in the portion away from the feeding ends in the screen, compared with the portion close thereto.

In order to achieve the above-mentioned object, the fourth display apparatus of the present invention includes: a plurality of pixel electrodes arranged in a matrix; switching elements connected thereto; scanning electrodes; video signal electrodes; common electrodes; a display medium interposed between the pixel electrodes and the common electrodes; and storage capacitance formed between electrodes, other than the common electrodes opposing the pixel electrodes via the display medium and the scanning electrodes of the stage concerned, and the pixel electrodes, a plurality of the common electrodes opposing the pixel electrodes of a plurality of pixels belonging to one of the scanning electrodes via the display medium, wherein, in a case where a scanning electrode-pixel electrode capacitance between the pixel electrodes and the scanning electrodes is represented by $C_{gd}$, a common electrode-pixel electrode capacitance between the pixel electrodes and the common electrodes is represented by $C_{lc}$, and a total capacitance connected electrically to the pixel electrodes is represented by $C_{tot}$, $\alpha_{gd}$ and $\alpha_{lc}$ represented by $$\alpha_{gd} = C_{gd}/C_{tot}, \alpha_{lc} = C_{lc}/C_{tot} \qquad \text{(Formula 6)}$$

are set to be different values between a portion close to feeding ends in a screen and a portion away therefrom.

It is preferable that the fourth display apparatus includes a video signal driving circuit for simultaneously applying two kinds of video signals having different polarities to a plurality of video signal electrodes, and applying two kinds of video signals having different polarities to each of the video signal electrodes in accordance with a display period.

Furthermore, it is preferable that the fourth display apparatus includes a first common electrode that opposes, via the display medium, pixel electrodes of pixels belonging to a video signal electrode to which a video signal with a first polarity is applied among a plurality of pixels belonging to one of the scanning electrodes, and a second common electrode that is different from the first common electrode and opposes, via the display medium, the pixel electrodes of the pixels belonging to the video signal electrode to which the video signal with a second polarity is applied.

Furthermore, it is preferable that the fourth display apparatus includes a common electrode potential control circuit for applying a voltage signal to a plurality of common electrodes and a scanning signal driving circuit for applying a voltage signal to a plurality of scanning electrodes, and the common electrode potential control circuit has output potential levels of at least two values, and the scanning signal driving circuit has output potential levels of at least two values.

In the fourth display apparatus, it is preferable that a potential of a scanning electrode becomes a first potential level $V_{gon}$ when the scanning electrode is selected and becomes substantially a second potential level $V_{goff}$ during a retention period in which the scanning electrode is not selected, among common electrodes opposing pixel electrodes of a plurality of pixels belonging to the scanning electrode via a display medium, a potential of the first common electrode becomes a first potential level $V_c(+)$ in a case where a polarity of a video signal applied to a video signal electrode corresponding to the first common electrode is positive and a second potential level $V_c(-)$ in a case where the polarity of the video signal is negative, when the scanning electrode is selected, a potential of the second common electrode becomes a first potential level $V_c(+)$ in a case where a polarity of the video signal applied to the video signal electrode corresponding to the second common electrode is positive and a second potential level $V_c(-)$ in a case where the polarity of the video signal is negative, when the scanning electrode is selected, and in a case where a difference between the first potential level $V_c(+)$ of the common electrode and a potential during a subsequent retention period is represented by $\Delta V_c(+)$, and a difference between the second potential level $V_c(-)$ of the common electrode and a potential during a subsequent retention period is represented by $\Delta V_c(-)$, γ represented by $$\gamma = \alpha_{lc} V_{cp}/2 \quad \text{(Formula 7)}$$

$$\text{(where } V_{cp} = \Delta V_c(+) - \Delta V_c(-)) \quad \text{(Formula 8))}$$

is set to be smaller in the portion away from the feeding ends in the screen, compared with the portion close thereto.

In this case, it is preferable that, assuming that a value of γ in the portion close to the feeding ends in the screen is γ(O), a value of γ in the portion away from the feeding ends in the screen is γ(E), and a value of γ in a portion in a middle therebetween in terms of a distance is γ(M), γ(M) is smaller than [γ(O)+γ(E)]/2.

Furthermore, it is preferable that $V_{cp}$ is negative.

In the fourth display apparatus, it is preferable that a potential of a scanning electrode becomes a first potential level $V_{gon}$ when the scanning electrode is selected and becomes substantially a second potential level $V_{goff}$ during a retention period in which the scanning electrode is not selected, among common electrodes opposing pixel electrodes of a plurality of pixels belonging to the scanning electrode via a display medium, a potential of the first common electrode becomes a first potential level $V_c(+)$ in a case where a polarity of a video signal applied to a video signal electrode corresponding to the first common electrode is positive and a second potential level $V_c(-)$ in a case where the polarity of the video signal is negative, when the scanning electrode is selected, a potential of the second common electrode becomes a first potential level $V_c(+)$ in a case where a polarity of the video signal applied to the video signal electrode corresponding to the second common electrode is positive and a second potential level $V_c(-)$ in a case where the polarity of the video signal is negative, when the scanning electrode is selected, and in a case where a difference between the first potential level $V_c(+)$ of the common electrode and a potential during a subsequent retention period is represented by $\Delta V_c(+)$, and a difference between the second potential level $V_c(-)$ of the common electrode and a potential during a subsequent retention period is represented by $\Delta V_c(-)$, β represented by $$\beta = \alpha_{gd} + \alpha_{lc}(\Delta V_{cc}/\Delta V_{gon}) \quad \text{(Formula 9)}$$

$$\text{(where } \Delta V_{gon} = V_{gon} - V_{goff}, \Delta V_{cc} = [\Delta V_c(+) + \Delta V_c(-)]/2 \quad \text{(Formula 10))}$$

is set to be larger in the portion away from the feeding ends in the screen, compared with the portion close thereto.

In this case, it is preferable that, assuming that a value of β in the portion close to the feeding ends in the screen is β(O), a value of β in the portion away from the feeding ends in the screen is β(E), and a value of β in a portion in a middle therebetween in terms of a distance is β(M), β(M) is larger than [β(O)+β(E)]/2.

Furthermore, it is preferable that $\Delta V_{cc}$ is negative.

In the fourth display apparatus, it is preferable that a potential of a scanning electrode becomes a first potential level $V_{gon}$ when the scanning electrode is selected and becomes substantially a second potential level $V_{goff}$ during a retention period in which the scanning electrode is not selected, among common electrodes opposing pixel electrodes of a plurality of pixels belonging to the scanning electrode via a display medium, a potential of the first common electrode becomes a first potential level $V_c(+)$ in a case where a polarity of a video signal applied to a video signal electrode corresponding to the first common electrode is positive and a second potential level $V_c(-)$ in a case where the polarity of the video signal is negative, when the scanning electrode is selected, a potential of the second common electrode becomes a first potential level $V_c(+)$ in a case where a polarity of the video signal applied to the video signal electrode corresponding to the second common electrode is positive and a second potential level $V_c(-)$ in a case where the polarity of the video signal is negative, when the scanning electrode is selected, in a case where a difference between the first potential level $V_c(+)$ of the common electrode and a potential during a subsequent retention period is represented by $\Delta V_c(+)$, and a difference between the second potential level $V_c(-)$ of the common electrode and a potential during a subsequent retention period is represented by $\Delta V_c(-)$, γ represented by $$\gamma = \alpha_{lc} V_{cp}/2 \quad \text{(Formula 7)}$$

$$\text{(where } V_{cp} = \Delta V_c(+) - \Delta V_c(-)) \quad \text{(Formula 8))}$$

is set to be smaller in the portion away from the feeding ends in the screen, compared with the portion close thereto, and β represented by $$\beta=\alpha_{gd}+\alpha_{lc}(\Delta V_{cc}/\Delta V_{gon}) \quad \text{(Formula 9)}$$

$$\text{(where } \Delta V_{gon}=V_{gon}-V_{goff}, \Delta V_{cc}=[\Delta V_c(+)+\Delta V_c(-)]/2 \quad \text{(Formula 10))}$$

is set to be larger in the portion away from the feeding ends in the screen, compared with the portion close thereto.

In the first and second display apparatuses, the display medium is liquid crystal.

In this case, the first and second display apparatuses have a configuration forming a parallel plate capacitance in which a liquid crystal layer is interposed between the pixel electrodes and the counter electrode.

In the third and fourth display apparatuses, the display medium is liquid crystal.

In this case, the common electrodes are formed on the same substrate as that of the pixel electrodes, and the liquid crystal is operated by an electric field parallel to the substrate.

In the first to forth display apparatuses, it is preferable that at least one of the capacitances forming $C_{tot}$ includes a capacitance formed by two conductive layers or semiconductor layers sandwiching an insulating layer therebetween, and an overlapping area of the two conductive layers or semiconductor layers is made different between the portion close to the feeding ends in the screen and the portion away therefrom, whereby $\alpha_{st}$ or $\alpha_{lc}$, and $\alpha_{gd}$ are allowed to have different values between the portion close to the feeding ends in the screen and the portion away therefrom.

In order to achieve the above-mentioned object, a first method for driving a display apparatus of the present invention is a method for driving the first or second display apparatus, wherein after a potential is written to the pixel electrodes via the switching elements, a voltage is superimposed via $C_{st}$ and has a value different between the portion close to the feeding ends in the screen and the portion away therefrom.

In the first driving method, it is preferable that, when a scanning electrode is selected, a first potential level $V_c(+)$ is applied to common electrodes that are connection destinations of storage capacitance connected to pixel electrodes of a plurality of pixels belonging to the scanning electrode in a case where a polarity of a video signal is positive, and a second potential level $V_c(-)$ is applied thereto in a case where a polarity of the video signal is negative.

In order to achieve the above-mentioned object, a second method for driving a display apparatus of the present invention is a method for driving a third or fourth display apparatus, wherein after a potential is written to the pixel electrodes via the switching elements, a voltage is superimposed via $C_{st}$ and has a value different between the portion close to the feeding ends in the screen and the portion away therefrom.

In the second driving method, it is preferable that, when a scanning electrode is selected, a first potential level $V_c(+)$ is applied to common electrodes opposing pixel electrodes of a plurality of pixels belonging to the scanning electrode via a display medium in a case where a polarity of a video signal is positive, and a second potential level $V_c(-)$ is applied thereto in a case where a polarity of the video signal is negative.

In order to achieve the above-mentioned object, a fifth display apparatus of the present invention conducts a display by controlling a voltage applied to a display medium with a potential of pixel electrodes and applying voltages with both positive and negative polarities to the display medium, wherein a capacitive coupling voltage is superimposed on the pixel electrodes from electrodes other than pixel electrodes, and a distribution of the capacitive coupling voltage is made different in a display region between a case where a positive voltage is applied to the display medium and a case where a negative voltage is applied thereto.

In the fifth display apparatus, the electrodes other than the pixel electrodes are common electrodes.

In order to achieve the above-mentioned object, a sixth display apparatus of the present invention includes: a plurality of pixel electrodes arranged in a matrix; switching elements connected thereto; scanning electrodes, video signal electrodes; common electrodes; a counter electrode; a display medium interposed between the pixel electrodes and the counter electrodes; and storage capacitance formed between the pixel electrodes and the common electrodes, wherein a capacitive coupling voltage from the scanning electrode, and a capacitive coupling voltage from the common electrode are allowed to have a distribution in a screen, whereby flickering and a brightness gradient are corrected simultaneously.

In order to achieve the above-mentioned object, a seventh display apparatus of the present invention includes: a plurality of pixel electrodes arranged in a matrix; switching elements connected thereto; scanning electrodes, video signal electrodes; common electrodes; a display medium interposed between the pixel electrodes and the common electrodes; and storage capacitance formed between electrodes, other than the common electrodes opposing the pixel electrodes via the display medium and the scanning electrodes of the stage concerned, and the pixel electrodes, wherein a capacitive coupling voltage from the scanning electrode, and a capacitive coupling voltage from the common electrode are allowed to have a distribution in a screen, whereby flickering and a brightness gradient are corrected simultaneously.

In order to achieve the above-mentioned object, an eighth display apparatus of the present invention includes: a plurality of pixel electrodes arranged in a matrix; switching elements connected thereto; scanning electrodes, video signal electrodes; common electrodes; a counter electrode; a display medium interposed between the pixel electrodes and the counter electrode; and storage capacitance formed between the pixel electrodes and either of the common electrodes, wherein a plurality of the common electrodes that are connection destinations of the storage capacitance are connected to the pixel electrodes of a plurality of pixels belonging to one of the scanning electrodes.

In order to achieve the above-mentioned object, a ninth display apparatus of the present invention, includes: a plurality of pixel electrodes arranged in a matrix; switching elements connected thereto; scanning electrodes, video signal electrodes; common electrodes; and a display medium interposed between the pixel electrodes and the common electrodes, wherein a plurality of the common electrodes oppose the pixel electrodes of a plurality of pixels belonging to one of the scanning electrodes via the display medium.

In order to achieve the above-mentioned object, a first display element of the present invention includes: a plurality of pixel electrodes arranged in a matrix; switching elements connected thereto; scanning electrodes; video signal electrodes; common electrodes; a counter electrode; a display medium interposed between the pixel electrodes and the counter electrode; and storage capacitance formed between the pixel electrodes and the common electrodes, wherein, in a case where a scanning electrode-pixel electrode capacitance between the pixel electrodes and the scanning electrodes is represented by $C_{gd}$, a common electrode-pixel electrode capacitance between the pixel electrodes and the common electrodes is represented by $C_{st}$, and a total capacitance connected electrically to the pixel electrodes is represented by $C_{tot}$, $\alpha_{gd}$ and $\alpha_{st}$ represented by $$\alpha_{gd}=C_{gd}/C_{tot}, \alpha_{st}=C_{st}/C_{tot} \qquad \text{(Formula 1)}$$

are set to be different values between a portion close to feeding ends in a screen and a portion away therefrom.

In order to achieve the above-mentioned object, a second display element of the present invention includes: a plurality of pixel electrodes arranged in a matrix; switching elements connected thereto; scanning electrodes; video signal electrodes; common electrodes; a counter electrode; a display medium interposed between the pixel electrodes and the counter electrode; and storage capacitance formed between the pixel electrodes and either of the common electrodes, a plurality of the common electrodes that are connection destinations of the storage capacitance being connected to the pixel electrodes of a plurality of pixels belonging to one of the scanning electrodes, wherein, in a case where a scanning electrode-pixel electrode capacitance between the pixel electrodes and the scanning electrodes is represented by $C_{gd}$, a common electrode-pixel electrode capacitance between the pixel electrodes and the common electrodes is represented by $C_{st}$, and a total capacitance connected electrically to the pixel electrodes is represented by $C_{tot}$, $\alpha_{gd}$ and $\alpha_{st}$ represented by $$\alpha_{gd}=C_{gd}/C_{tot}, \alpha_{st}=C_{st}/C_{tot} \qquad \text{(Formula 1)}$$

are set to be different values between a portion close to feeding ends in a screen and a portion away therefrom.

In order to achieve the above-mentioned object, a third display element of the present invention includes: a plurality of pixel electrodes arranged in a matrix; switching elements connected thereto; scanning electrodes; video signal electrodes; common electrodes; a display medium interposed between the pixel electrodes and the common electrodes; and storage capacitance formed between electrodes, other than the common electrodes opposing the pixel electrodes via the display medium and the scanning electrodes of the stage concerned, and the pixel electrodes, wherein, in a case where a scanning electrode-pixel electrode capacitance between the pixel electrodes and the scanning electrodes is represented by $C_{gd}$, a common electrode-pixel electrode capacitance between the pixel electrodes and the common electrodes is represented by $C_{lc}$, and a total capacitance connected electrically to the pixel electrodes is represented by $C_{tot}$, $\alpha_{gd}$ and $\alpha_{lc}$ represented by $$\alpha_{gd}=C_{gd}/C_{tot}, \alpha_{lc}=C_{lc}/C_{tot} \qquad \text{(Formula 6)}$$

are set to be different values between a portion close to feeding ends in a screen and a portion away therefrom.

In order to achieve the above-mentioned object, a fourth display element of the present invention includes: a plurality of pixel electrodes arranged in a matrix; switching elements connected thereto; scanning electrodes; video signal electrodes; common electrodes; a display medium interposed between the pixel electrodes and the common electrodes; and storage capacitance formed between electrodes, other than the common electrodes opposing the pixel electrodes via the display medium and the scanning electrodes of the stage concerned, and the pixel electrodes, a plurality of the common electrodes opposing the pixel electrodes of a plurality of pixels belonging to one of the scanning electrodes via the display medium, wherein, in a case where a scanning electrode-pixel electrode capacitance between the pixel electrodes and the scanning electrodes is represented by $C_{gd}$, a common electrode-pixel electrode capacitance between the pixel electrodes and the common electrodes is represented by $C_{lc}$, and a total capacitance connected electrically to the pixel electrodes is represented by $C_{tot}$, $\alpha_{gd}$ and $\alpha_{lc}$ represented by $$\alpha_{gd}=C_{gd}/C_{tot}, \alpha_{lc}=C_{lc}/C_{tot} \qquad \text{(Formula 6)}$$

are set to be different values between a portion close to feeding ends in a screen and a portion away therefrom.

In order to achieve the above-mentioned object, a tenth display apparatus of the present invention includes: a plurality of pixel electrodes arranged in a matrix; switching elements connected thereto; scanning electrodes; video signal electrodes; common electrodes; a counter electrode; a display medium interposed between the pixel electrodes and the counter electrodes; and storage capacitance formed between the pixel electrodes and the common electrodes, the scanning electrodes being supplied with a power only from one side of a display region, a potential of the common electrodes being fixed at least on a side opposite to the side where the scanning electrodes are supplied with a power in the display region, wherein, in a case where a scanning electrode-pixel electrode capacitance between the pixel electrodes and the scanning electrodes is represented by $C_{gd}$, a common electrode-pixel electrode capacitance between the pixel electrodes and the common electrodes is represented by $C_{st}$, and a total capacitance connected electrically to the pixel electrodes is represented by $C_{tot}$, when a value of $\alpha_{gd}$ represented by $$\alpha_{gd}=C_{gd}/C_{tot} \qquad \text{(Formula 101)}$$

in a portion furthest from feeding ends of the scanning electrodes in a display region is $\alpha_{gd}(F)$, there is a position where the value of $\alpha_{gd}$ becomes larger than $\alpha_{gd}(F)$ between the portion furthest from the feeding ends of the scanning electrodes in the display region and a portion closest thereto.

In order to achieve the above-mentioned object, an eleventh display apparatus of the present invention includes: a plurality of pixel electrodes arranged in a matrix; switching elements connected thereto; scanning electrodes; video signal electrodes; common electrodes; a display medium interposed between the pixel electrodes and the common electrodes; and storage capacitance formed between electrodes, other than the common electrodes opposing the pixel electrodes via the display medium and the scanning electrodes of the stage concerned, and the pixel electrodes, the scanning electrodes being supplied with a power only from one side of a display region, a potential of the common electrodes being fixed at least on a side opposite to the side where the scanning electrodes are supplied with a power in the display region, wherein, in a case where a scanning electrode-pixel electrode capacitance between the pixel electrodes and the scanning electrodes is represented by $C_{gd}$, a common electrode-pixel electrode capacitance between the pixel electrodes and the common electrodes is represented by $C_{lc}$, and a total capacitance connected electrically to the pixel electrodes is represented by $C_{tot}$, when a value of $\alpha_{gd}$ represented by $$\alpha_{gd}=C_{gd}/C_{tot} \qquad \text{(Formula 101)}$$

in a portion furthest from feeding ends of the scanning electrodes in a display region is $\alpha_{gd}(F)$, there is a position where the value of $\alpha_{gd}$ becomes larger than $\alpha_{gd}(F)$ between the portion furthest from the feeding ends of the scanning electrodes in the display region and a portion closest thereto.

In the first to fourth display apparatuses, it is preferable that a common electrode potential is different between a retention period after the pixel electrodes are charged with a positive video signal and a retention period after the pixel electrodes are charged with a negative video signal.

Furthermore, in the first to fourth display apparatuses, it is preferable that the scanning signal driving circuit conducts writing to a plurality of lines simultaneously.

In this case, the display medium is liquid crystal of an OCB mode.

Furthermore, in the first to fourth display apparatuses, it is preferable that the scanning signal driving circuit and the common electrode potential control circuit are formed on the same substrate as that of the switching elements.

Furthermore, in the first to fourth display apparatuses, it is preferable that the display medium is composed of a medium whose optical state is controlled with a current and auxiliary switching elements.

In this case, the medium whose optical state is controlled with a current is an organic electroluminescence medium.

According to the above-mentioned configuration, flickering or a brightness gradient can be reduced substantially in an active matrix type liquid crystal display apparatus. Furthermore, the above-mentioned configuration enables a pixel configuration of a dot inversion/column inversion type to be adopted, which suppresses horizontal crosstalk.

Thus, the driving voltage/power consumption of a large liquid crystal display apparatus with high resolution is reduced to substantially enhance uniformity, so that an industrial value is very high.

BRIEF DESCRIPTION OF DRAWINGS

FIG. 6A is a waveform diagram of an odd-numbered frame, illustrating a method of driving the display apparatus of the second embodiment according to the present invention by dot inversion driving.

FIG. 6B is a waveform diagram of an even-numbered frame, illustrating a method of driving the display apparatus of the second embodiment according to the present invention by dot inversion driving.

FIG. 7A is a waveform diagram of an odd-numbered frame, illustrating a method of driving the display apparatus of the second embodiment according to the present invention by column inversion driving.

FIG. 7B is a waveform diagram of an even-numbered frame, illustrating a method of driving the display apparatus of the second embodiment according to the present invention by column inversion driving.

FIG. 16A shows a polarity pattern of pixels and a scanning signal waveform in a field inversion system.

FIG. 16B shows a polarity pattern of pixels and a scanning signal waveform in a line inversion system.

FIG. 16C shows a polarity pattern of pixels and a scanning signal waveform in a column inversion system.

FIG. 16D shows a polarity pattern of pixels and a scanning signal waveform in a dot inversion system.

FIG. 19A shows an example of a method for providing a distribution of $\beta$ in a screen.

FIG. 19B shows an example of a method for providing a distribution of $\beta$ in a screen.

FIG. 19C shows an example of a method for providing a distribution of $\beta$ in a screen.

FIG. 19D shows an example of a method for providing a distribution of $\beta$ in a screen.

FIG. 28A is a waveform diagram of an odd-numbered frame, illustrating a method for driving a display apparatus of another embodiment according to the present invention.

FIG. 28B is a waveform diagram of an even-numbered frame, illustrating a method for driving a display apparatus of another embodiment according to the present invention.

FIG. 29A is a waveform diagram of an odd-numbered frame, illustrating another method for driving a display apparatus of another embodiment according to the present invention.

FIG. 29B is a waveform diagram of an even-numbered frame, illustrating another method for driving a display apparatus of another embodiment according to the present invention.

FIG. 30 is a view illustrating a relationship in magnitude of a recharge voltage in a p-channel TFT.

BEST MODE FOR CARRYING OUT THE INVENTION (Analysis of the Problems of the Prior Art)

Before describing specific examples of the embodiments of the present invention, as described in the Background Art, the results of analyzing the causes of the first problem in which flickering and a brightness gradient become conspicuous along with an increase in a screen size will be described.

Hereinafter, unless otherwise specified, it is assumed that a scanning signal (driving signal applied to a scanning electrode) and a common electrode control signal are supplied from both sides of a screen. Portions close to feeding ends of scanning electrodes (and common electrodes) in a screen, i.e., both end portions of a screen, will be referred to as "portions close to feeding ends", and the center of the screen will be referred to as "a portion away from the feeding ends".

First, a phenomenon of a recharge that must be considered for discussing the problem will be described.

Figure 14:
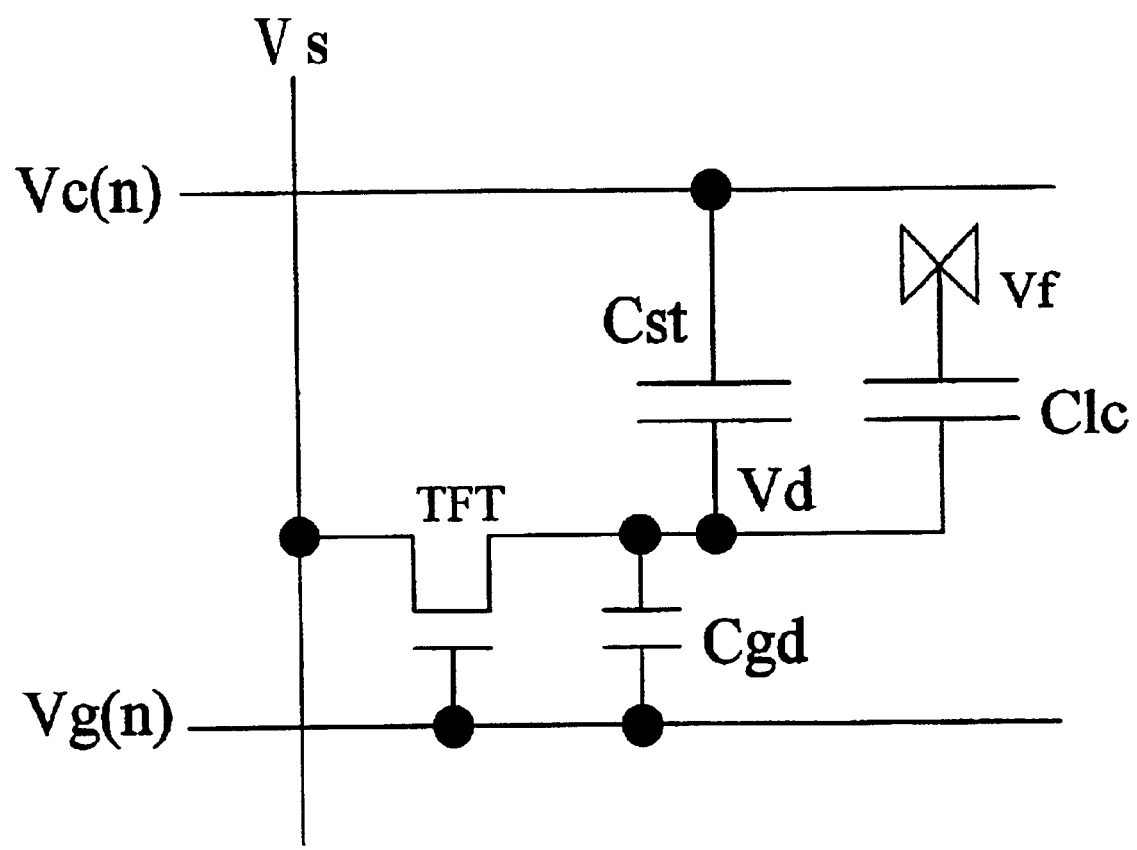
FIG. 14 is a circuit diagram of one pixel of a display apparatus of the prior art and that of the first embodiment according to the present invention.
Figure 15:
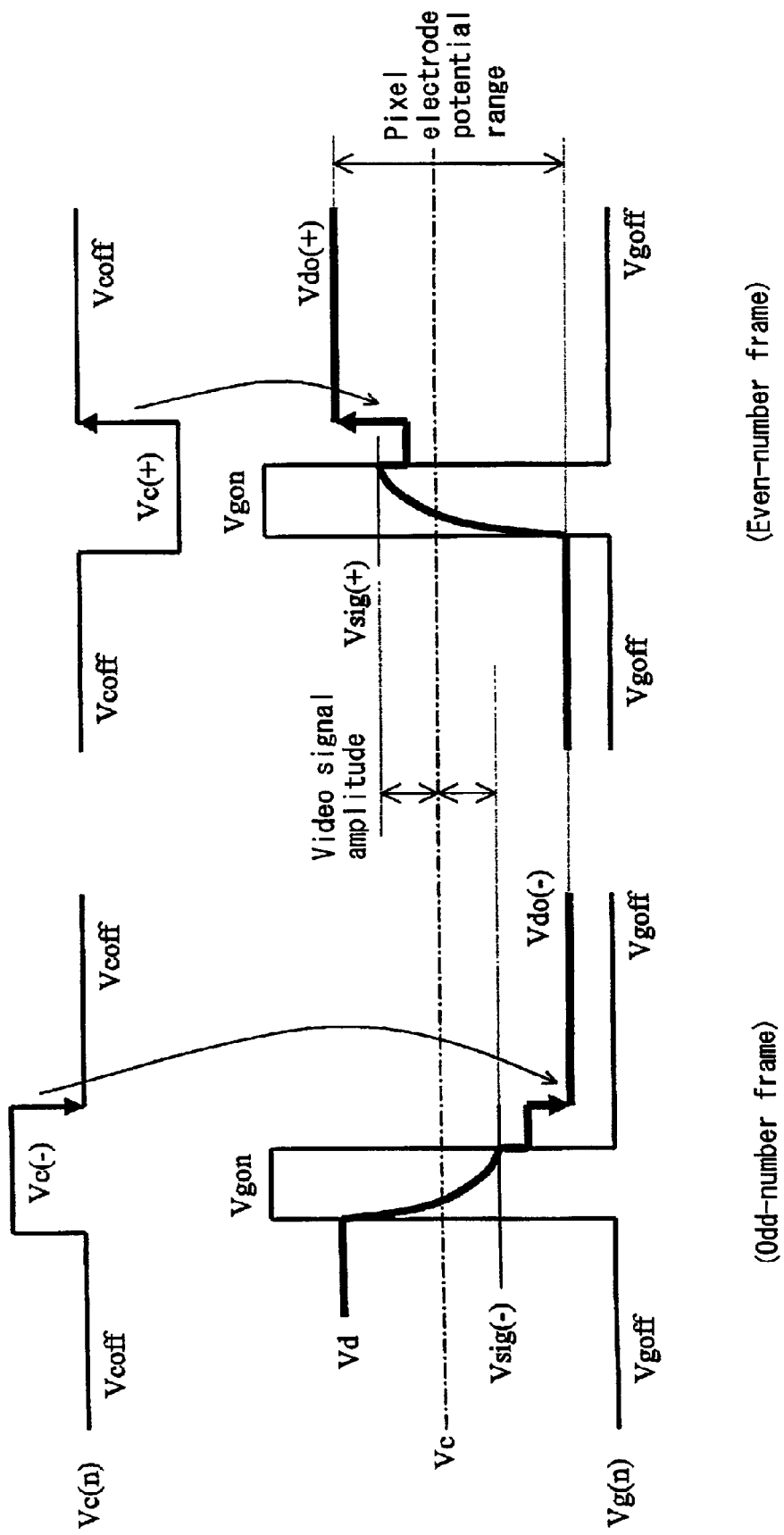
FIG. 15 is a waveform diagram illustrating a method for driving a display apparatus of the prior art and that of the first embodiment according to the present invention.
Figure 17:
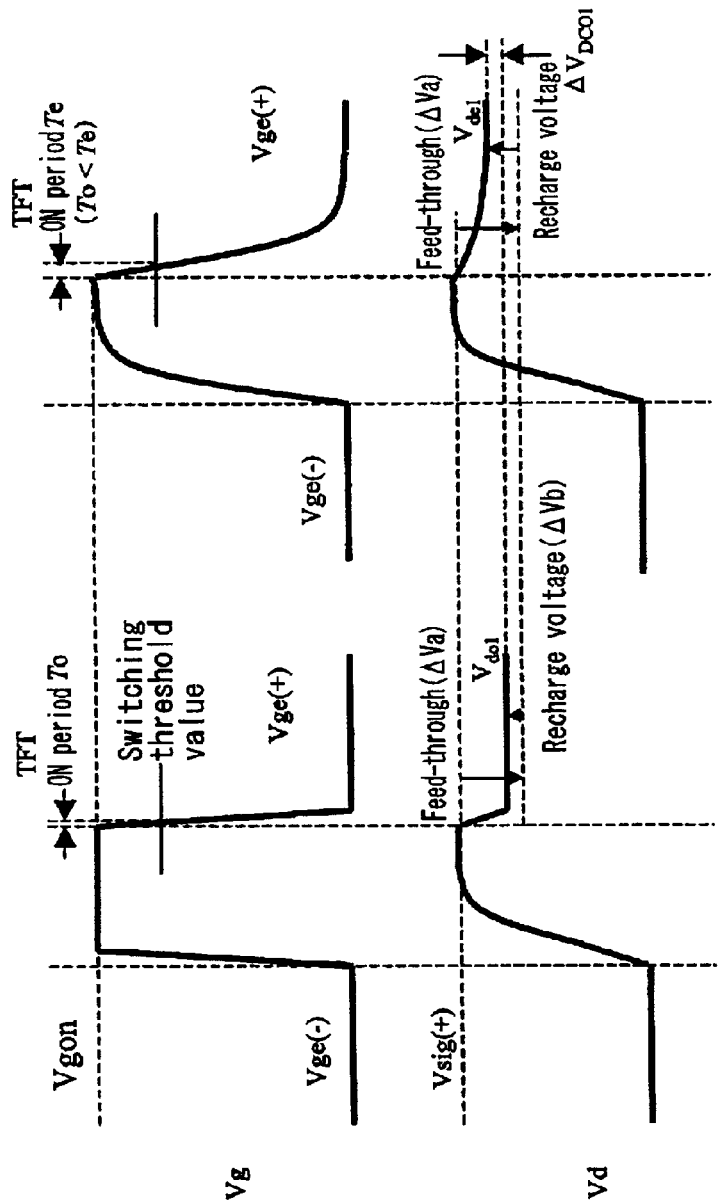
FIG. 17 is a waveform diagram illustrating that a recharge voltage is different between portions close to feeding ends and a portion away therefrom.

As an example, the case will be considered where a potential is shifted from $V_{gon}$ to $V_{goff}$ after a scanning electrode is selected in FIG. 15. In the portions close to the feeding ends, a voltage is changed rapidly, whereas in the portion away from the feeding ends, a waveform is distorted due to a CR time constant of the scanning electrode, and the movement of a potential becomes smooth (it is assumed that the movement of the potential of the scanning electrode will be completed substantially by the time $V_c$ changes from $V_c(\pm)$ to $V_{coff}$). The waveforms of the potential of the scanning electrode in the portions close to the feeding ends and the portion away therefrom are drawn as represented by $V_g$ in FIG. 17. The potential $V_d$ of a pixel electrode is substantially equal to a video signal voltage $V_{sig}(+)$ or $V_{sig}(-)$ at a time of completion of charging (FIG. 17 shows the case of $V_{sig}(+)$); however, the potential $V_d$ of the pixel electrode fluctuates along with changes in $V_g$ due to the capacitive coupling by $C_{gd}$ of the circuit in FIG. 14. A change amount $\Delta V_a$ of $V_d$ involved in capacitive coupling when $V_g$ changes from $V_{gon}$ to $V_{goff}$ is represented by the following Formula (15) irrespective of a distance from the feeding ends.

$$\Delta V_a = -(C_{gd}/C_{tot})(V_{gon}-V_{goff})$$

$$\text{where } C_{tot}=C_{gd}+C_{lc}+C_{st} \quad \text{(Formula 15)}$$

The voltage change amount $\Delta V_a$ will be referred to as a feedthrough. This voltage value is substantially the same value irrespective of the polarity of a video signal.

A TFT is not turned OFF immediately when the potential of the scanning electrode falls, and the TFT is turned OFF when the potential of the scanning electrode passes a switching threshold value (potential higher than the potential of the video signal electrode by a threshold voltage) (the TFT is turned OFF by the time when the potential of the video signal electrode starts shifting toward a scanning period voltage). Thus, a current flows through the TFT so as to compensate for the potential difference between the video signal electrode-pixel electrode (source-drain of the TFT) generated due to a feedthrough during a finite period (represented by $T_o$ or $T_e$ in FIG. 17) from a time when the scanning electrode potential starts falling to a time when the scanning electrode potential passes the switching threshold value. Therefore, the absolute value of an actual change amount of the pixel electrode potential becomes smaller than $|\Delta V_a|$. When the voltage difference caused by the flow of a current through the TFT is represented by $\Delta V_b$, the change amount of the pixel electrode potential becomes $\Delta V_a+\Delta V_b$. FIG. 17 also shows a state of a change in the pixel electrode potential $V_d$. The waveform of $V_g$ becomes smoother with increased distance from the feeding ends of the scanning signal driving circuit, and a time required for the TFT to be turned OFF becomes long. Therefore, $\Delta V_b$ is increased with a distance from the feeding ends. A current flowing through the TFT will be referred to as a recharge current, and a voltage difference $\Delta V_b$ caused by this will be referred to as a recharge voltage.

Figure 18:
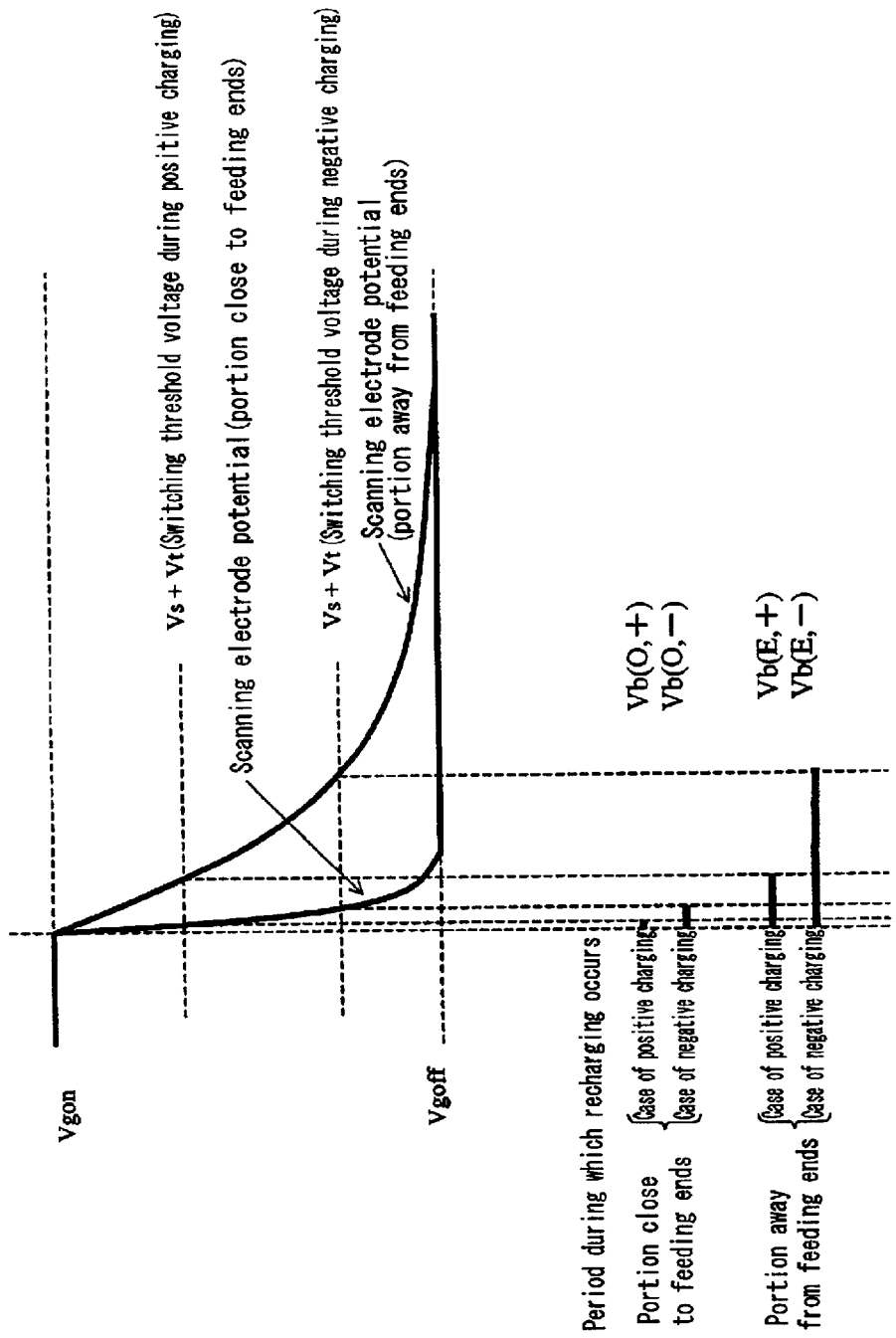
FIG. 18 is a view illustrating the relationship of the magnitude of a recharge voltage.

The above-mentioned switching threshold value becomes different between an even-numbered frame (the case where a video signal with a positive polarity is charged) and an odd-numbered frame (the case where a video signal with a negative polarity is charged). The level of the switching threshold value when the potential of the scanning electrode shifts from $V_{gon}$ to $V_{goff}$ is drawn with respect to a positive polarity and a negative polarity as shown in FIG. 18. Based on this, regarding the portions close to the feeding ends and the portion away therefrom, a time required for the TFT to be turned OFF, i.e., a period (corresponding to To or Te) for a recharge to be generated is represented for each polarity as in a bar graph. The length of a bar graph substantially corresponds to the magnitude of a recharge current, i.e., the magnitude of a recharge voltage. Therefore, assuming that recharge voltages in the case of a positive polarity and a negative polarity in the portions close to the feeding ends are represented by $\Delta V_b(O, +)$ and $\Delta V_b(O)$, and recharge voltages in the case of a positive polarity and a negative polarity in the portion away from the feeding ends are represented by $\Delta V_b(E, +)$ and $\Delta V_b(E)$, it is understood that there is the following (Formula 16) relationship.

$$\Delta V_b(O, +) < \Delta V_b(E, +)$$

$$\Delta V_b(O) < \Delta V_b(E)$$

$$\Delta V_b(O, +) - \Delta V_b(O) > \Delta V_b(E, +) - \Delta V_b(E) \qquad \text{(Formula 16)}$$

For the purpose of reference, although the falling waveform of the potential of the scanning electrode is set to be the same between the even-numbered frame and the odd-numbered frame for simplicity, the falling waveform may not necessarily be the same. In particular, considering non-linearity (a source-drain capacitance or a gate-drain capacitance when the TFT is in an ON state becomes larger than that when the TFT is in an OFF state), an apparent capacitance becomes larger when the video signal has a negative polarity. Thus, the CR time constant of the falling of the potential of the scanning electrode becomes large, and falling may become slow. However, even in such a case, the relationship of (Formula 16) still holds.

Next, the relationship between flickering and a brightness gradient, and a recharge voltage will be described mathematically. $V_{do}(O, +)$, $V_{do}(O)$, and $V_{do}(E, +)$, $V_{do}(E)$ of the retention potential of the pixel electrode in the portions close to and the portion away from the feeding ends can be represented by (Formula 17) with the above-mentioned effect of a recharge added to (Formula 12).

$$V_{do}(O, +) = V_{sig}(+) - \alpha_{st}\Delta V_c(+) - \alpha_{gd}\Delta V_{gon} + \Delta V_b(O, +)$$

$$V_{do}(O) = V_{sig}(-) - \alpha_{st}\Delta V_c(-) - \alpha_{gd}\Delta V_{gon} + \Delta V_b(O)$$

$$V_{do}(E, +) = V_{sig}(+) - \alpha_{st}\Delta V_c(+) - \alpha_{gd}\Delta V_{gon} + \Delta V_b(E, +)$$

$$V_{do}(E) = V_{sig}(-) - \alpha_{st}\Delta V_c(-) - \alpha_{gd}\Delta V_{gon} + \Delta V_b(E) \qquad \text{(Formula 17)}$$

When the DC average level $V_{dc}(O)$ and $V_{dc}(E)$ of the potential of the pixel electrode in the portions close to and the portion away from the feeding ends and the effective value of a voltage applied to liquid crystal $V_{eff}(O)$ and $V_{eff}(E)$ are calculated in (Formula 17), (Formula 18) is obtained.

$$V_{dc}(O) = [V_{do}(O, +) + V_{do}(O)]/2 \qquad \text{(Formula 18)}$$

$$= [V_{sig}(+) + V_{sig}(-)]/2 - \alpha_{st}\Delta V_{cc} -$$

$$\alpha_{gd}\Delta V_{gon} + [\Delta V_b(O, +) + \Delta V_b(O)]/2$$

-continued
$$V_{eff}(O) = [V_{do}(O, +) - V_{do}(O)]/2$$

$$= [V_{sig}(+) - V_{sig}(-)]/2 - \alpha_{st}V_{cp}/2 +$$

$$[\Delta V_b(O, +) - \Delta V_b(O)]/2$$

$$V_{dc}(E) = [V_{do}(E, +) + V_{do}(E)]/2$$

$$= [V_{sig}(+) + V_{sig}(-)]/2 - \alpha_{st}\Delta V_{cc} -$$

$$\alpha_{gd}\Delta_{gon} + [\Delta V_b(E, +) + \Delta V_b(E)]/2$$

$$V_{eff}(E) = [V_{do}(E, +) - V_{do}(E)]/2$$

$$= [V_{sig}(+) - V_{sig}(-)]/2 - \alpha_{st}V_{cp}/2 +$$

$$[\Delta V_b(E, +) - \Delta V_b(E)]/2$$

$\Delta V_{cc}$ and $V_{cp}$ are given by the following (Formula 19).

$$\Delta V_{cc} = [\Delta V_c(+) + \Delta V_c(-)]/2 \qquad \text{(Formula 19)}$$

$$= [Vc(+) + V_c(-)]/2 - V_{coff}$$

$$V_{cp} = \Delta V_c(+) - \Delta V_c(-)$$

$$= V_c(+) - V_c(-)$$

The DC average level $V_{dc}(O)$ and $V_{dc}(E)$ given by the first and third formulae of (Formula 18) represent voltage values that eliminate flickering. More specifically, if the potential of the counter electrode is matched with the voltage values represented by the first and third formulae of (Formula 18), a time average value of a voltage applied to liquid crystal becomes 0, whereby flickering is eliminated. However, because of (Formula 18) and (Formula 16), the relationship represented by the following (Formula 20) is obtained, and the DC average level has different values in a screen (the DC average level is larger in the portion away from the feeding ends than in the portions close thereto). Therefore, it is impossible to eliminate flickering simultaneously across the entire screen.

$$V_{dc}(E) - V_{dc}(O) = [\Delta V_b(E, +) + \Delta V_b(E)]/2 - [\Delta V_b(O, +) + \Delta V_b(O)]/2 > 0 \qquad \text{(Formula 20)}$$

On the other hand, $V_{eff}$ given by the second and fourth formulae of (Formula 17) corresponds to an effective value of a voltage applied to liquid crystal, and the liquid crystal exhibits a brightness (transmittance) corresponding to the effective value. However, because of (Formula 18) and (Formula 16), the relationship represented by the following (Formula 21) is obtained, and the effective value of a voltage applied to liquid crystal also has a distribution (gradient) (the effective value is smaller in the portion away from the feeding ends than in the portions close thereto) across a screen.

$$V_{eff}(E) - V_{eff}(O) = [\Delta V_b(E, +) - \Delta V_b(E)]/2 - [\Delta V_b(O, +) - \Delta V_b(O)]/2 < 0 \qquad \text{(Formula 21)}$$

The reasons for the occurrence of flickering and a brightness gradient due to the distribution of a recharge voltage in a screen have been described as above.

When a screen size becomes large, the distance from the feeding ends of the portion away therefrom becomes large naturally. Then, the difference in the above-mentioned recharge voltage $\Delta V_b$ between the portion away from the feeding ends and the portions close thereto becomes large, increasing flickering and a brightness gradient.

Furthermore, in the case where the screen size is large, an influence by the fluctuation in the potential of the common electrode is not negligible. More specifically, when the potential of the scanning electrode changes from $V_{gon}$ to $V_{goff}$, the potential of the pixel electrode decreases due to a feedthrough. Simultaneously with this, the potential of the common electrode also decreases due to the capacitive coupling between the scanning electrode and the common electrode created by $C_{gd}$ and $C_{st}$ in FIG. 14. The potential decrease is small in the portions close to the feeding ends of the common electrode, whereas it is large in the portion away from the feeding ends of the common electrode. When the potential of the common electrode decreases, the potential of the pixel electrode further decreases along therewith. Then, compared with the case where it is assumed that the potential of the common electrode does not change at all, a larger recharge current flows toward the pixel electrode. Thus, the retention potential of the pixel electrode in the portion away from the feeding ends becomes much larger than that in the portions close to the feeding ends, which makes the problems such as a brightness gradient and flickering more conspicuous.

(Description 1 of the Principle of the Present Invention: Principle of a Reduction in a Brightness Gradient/Flickering)

The above-mentioned analysis was conducted, and means for eliminating a brightness gradient and flickering was found. This is the content of the present invention, and the values of $\alpha_{st}$ and $\alpha_{gd}$ are allowed to have a gradient in a screen. Hereinafter, the principle thereof will be described.

Now, it is assumed that $\alpha_{st}$ and $\alpha_{gd}$ are not constant in a screen (more specifically, at least one of $C_{gd}$, $C_{st}$, and $C_{lc}$ is not constant). It is assumed that $\alpha_{st}$ and $\alpha_{gd}$ in portions close to the feeding ends are $\alpha_{st}(O)$ and $\alpha_{gd}(O)$, and $\alpha_{st}$ and $\alpha_{gd}$ in a portion away from the feeding ends are $\alpha_{st}(E)$ and $\alpha_{gd}(E)$. Herein, "O" denotes the portions close to the feeding ends, and "E" denotes a portion away from the feeding ends.

In the case where the portions close to the feeding ends and the portion away from the feeding ends are charged positively and negatively, when Formula 17 is applied, four formulae (Formula 22) are obtained.

$$V_{do}(O, +) = V_{sig}(+) - \alpha_{st}(O)\Delta V_c(+) - \alpha_{gd}(O)\Delta V_{gon} + \Delta V_b(O, +)$$
$$V_{do}(O, -) = V_{sig}(-) - \alpha_{st}(O)\Delta V_c(-) - \alpha_{gd}(O)\Delta V_{gon} + \Delta V_b(O, -)$$
$$V_{do}(E, +) = V_{sig}(+) - \alpha_{st}(E)\Delta V_c(+) - \alpha_{gd}(E)\Delta V_{gon} + \Delta V_b(E, +)$$
$$V_{do}(E, -) = V_{sig}(-) - \alpha_{st}(E)\Delta V_c(-) - \alpha_{gd}(E)\Delta V_{gon} + \Delta V_b(E, -)$$

(Formula 22)

Herein, for example, the notation of $V_{do}(j, \pm)(j=O$ or $E)$ refers to an amount during positive charge (+) or negative charge (−) at a position $j$ ($j=O\rightarrow$portions close to the feeding ends, $j=E\rightarrow$portion away from the feeding ends). This also applies to $V_{sig}(\pm)$ and $\Delta V_b(j, \pm)$.

In the case of the prior art, the value of $\Delta V_b$ varies between the portions close to the feeding ends and the portion away from the feeding ends. Therefore, $V_{do}$ also varies, which causes flickering and a brightness gradient. According to the present invention, by changing the two respective values of $\alpha_{st}$ and $\alpha_{gd}$ independently, it is attempted to correct the difference in the value of $\Delta V_b$. When DC average levels $V_{dc}(O)$ and $V_{dc}(E)$ and the liquid crystal application voltage effective value $V_{eff}(O)$ and $V_{eff}(E)$ are calculated by (Formula 22) in the same way as in (Formula 17) and (Formula 18), the following (Formula 23) holds.

$$V_{dc}(O) = [V_{do}(O, +) + V_{do}(O, -)]/2 \quad \text{(Formula 23)}$$
$$= [V_{sig}(+) + V_{sig}(-)]/2 - \alpha_{st}(O)\Delta V_{cc} -$$
$$\alpha_{gd}(O)\Delta V_{gon} + [\Delta V_b(O, +) + \Delta V_b(O, -)]/2$$
$$V_{eff}(O) = [V_{do}(O, +) - V_{do}(O, -)]/2$$
$$= [V_{sig}(+) - V_{sig}(-)]/2 - \alpha_{st}(O)$$
$$V_{cp}/2 + [\Delta V_b(O, +) - \Delta V_b(O, -)]/2$$
$$V_{dc}(E) = [V_{do}(E, +) + V_{do}(E, -)]/2$$
$$= [V_{sig}(+) + V_{sig}(-)]/2 - \alpha_{st}(E)\Delta V_{cc} -$$
$$\alpha_{gd}(E)\Delta V_{gon} + [\Delta V_b(E, +) + \Delta V_b(E, -)]/2$$
$$V_{eff}(E) = [V_{do}(E, +) - V_{do}(E, -)]/2$$
$$= [V_{sig}(+) - V_{sig}(-)]/2 - \alpha_{st}(E)$$
$$V_{cp}/2 + [\Delta V_b(E, +) - \Delta V_b(E, -)]/2$$

When the difference $\Delta V_{eff}$ of the liquid crystal application voltage effective value at the portions close to the feeding ends and the portion away from the feeding ends is calculated, (Formula 24) holds.

$$\Delta V_{eff} = V_{eff}(E) - V_{eff}(O) \quad \text{(Formula 24)}$$
$$= -[\alpha_{st}(E) - \alpha_{st}(O)]V_{cp}/2 + [\Delta V_b(E, +) -$$
$$\Delta V_b(E, -) - \Delta V_b(O, +) + \Delta V_b(O, -)]/2$$
$$= -[\gamma(E) - \gamma(O)] + [\Delta V_b(E, +) - \Delta V_b(E, -) -$$
$$\Delta V_b(O, +) + \Delta V_b(O, -)]/2$$

where $\gamma(O)$ and $\gamma(E)$ are given by the following (Formula 25):

$$\gamma(O)=\alpha_{st}(O)V_{cp}/2$$
$$\gamma(O)=\alpha_{st}(E)V_{cp}/2 \quad \text{(Formula 25)}$$

When the difference $\Delta V_{dc}$ of the DC average levels is calculated, the following (Formula 26) holds.

$$\Delta V_{dc} = V_{DC}(E) - V_{DC}(O) \quad \text{(Formula 26)}$$
$$= -[\alpha_{st}(E) - \alpha_{st}(O)]V_{cc} - [\alpha_{gd}(E) -$$
$$\alpha_{gd}(O)]\Delta V_{gon} + [\Delta V_b(E, +) + \Delta V_b(E, -) -$$
$$\Delta V_b(O, +) - \Delta V_b(O, -)]/2$$
$$= -[\beta(E) - \beta(O)]\Delta V_{gon} + [\Delta V_b(E, +) +$$
$$\Delta V_b(E, -) - \Delta V_b(O, +) - \Delta V_b(O, -)]/2$$

where $\beta(O)$ and $\beta(E)$ are given by the following (Formula 27):

$$\beta(O)=\alpha_{gd}(O)+\alpha_{st}(O)(\Delta V_{cc}/\Delta V_{gon})$$
$$\beta(E)=\alpha_{gd}(E)+\alpha_{st}(E)(\Delta V_{cc}/\Delta V_{gon}) \quad \text{(Formula 27)}$$

In order to eliminate a brightness gradient completely, $\Delta V_{eff}=0$ only needs to be satisfied in (Formula 24), and the relationship between $\gamma(O)$ and $\gamma(E)$ may be selected so as to satisfy the following (Formula 28):

$$\gamma(E)-\gamma(O)=[\Delta V_b(E, +)-\Delta V_b(E, -)-\Delta V_b(O, +)+\Delta V_b(O, -)]/2 \quad \text{(Formula 28)}$$

According to the third formula of (Formula 16), the right side of (Formula 28) is negative, so that the relationship between γ(O) and γ(E) may be as represented by (Formula 29).

$$\gamma(O) > \gamma(E) \quad \text{(Formula 29)}$$

In order to eliminate flickering completely, $\Delta V_{dc}=0$ only needs to be satisfied in (Formula 26), and the relationship between β(O) and β(E) only needs to be selected so as to satisfy the following Formula 30):

$$[\beta(E)-\beta(O)]\Delta V_{gon}=[\Delta V_b(E, +)+\Delta V_b(E, -)-\Delta V_b(O, +)-\Delta V_b(O, -)]/2 \quad \text{(Formula 30)}$$

According to the first and second formulae of (Formula 16), the right side of (Formula 28) is positive, and $\Delta V_{gon}$ also is positive. Therefore, the relationship between β(O) and β(E) only needs to satisfy the following (Formula 31):

$$\beta(O) < \beta(E) \quad \text{(Formula 31)}$$

By selecting γ and β conveniently as described above, flickering and a brightness gradient can be eliminated.

In summary, the conditions for eliminating a brightness gradient and flickering with an array configuration as shown in FIG. 14 can be described as follows:

[1] Necessary conditions for eliminating a brightness gradient:

The value of γ is smaller in the portion away from the feeding ends in a screen, compared with the portions close thereto.

[2] Necessary conditions for eliminating flickering]

The value of β is larger in the portion away from the feeding ends in a screen, compared with the portions close thereto.

In the above, suffixes O and E are omitted.

It may be possible that only the necessary conditions [1] are satisfied, and the necessary conditions [2] are not satisfied. In the case of this configuration, although a brightness gradient is eliminated, flickering is not eliminated. As a method for eliminating flickering actively under these conditions, it is considered to correct ahead of time the video signal generated in a video signal driving circuit. This means that an excess signal processing circuit is added, which increases cost.

In contrast, it also may be possible that only the necessary conditions [2] are satisfied and the necessary conditions [1] are not satisfied. In the case of this configuration, although flickering is eliminated, a brightness gradient is not eliminated. As a method for eliminating a brightness gradient actively under these conditions, it is considered to correct ahead of time a video signal generated in a video signal driving signal. This case also means that an excess signal processing circuit is added, which increases cost.

Most desirably, both the necessary conditions [1] and [2] are satisfied. In this case, a video of high quality without flickering and a brightness gradient can be obtained without adding an excess signal processing circuit for correcting a video signal ahead of time, so that both low cost and high quality can be satisfied.

In the case where β and γ (or $\alpha_{st}$ and $\alpha_{gd}$) are set to be different values between the portions close to the feeding ends and the portion away therefrom, it is required to change these values independently. Therefore, it is desirable that $\alpha_{st}$ and $\alpha_{gd}$ are varied by setting at least two of capacitance values $C_{st}$, $C_{gd}$, and $C_{lc}$ (in other words, capacitance values constituting $C_{tot}$) contributing to $\alpha_{st}$ and $\alpha_{gd}$ between the portions close to the feeding ends and the portion away therefrom.

Actually, for example, in the case where $C_{gd}$ and $C_{lc}$ are set to be constant, and only $C_{st}$ is set to have different values between the portions close to the feeding ends (the value of $C_{st}$ is assumed to be $C_{st}(O)$) and the portion away therefrom (the value of $C_{st}$ is assumed to be $C_{st}(E)$) to satisfy $C_{st}(O) < C_{st}(E)$, $\alpha_{gd}(O) > \alpha_{gd}(E)$ and $\alpha_{st}(O) < \alpha_{st}(E)$ are satisfied according to (Formula 14). Under this condition, in the case where $V_{cp} < 0$ and $\Delta V_{cc} < 0$ (it will be described later as a supplement that these conditions are desirable), γ(O)>γ(E) is obtained from (Formula 25), and β(O)>β(E) is obtained from (Formula 27). In this case, although (Formula 29) is satisfied, (Formula 31) is not satisfied. Thus, although a brightness gradient reduction effect is obtained, a flickering reduction effect cannot be obtained.

In contrast, in the case of $C_{st}(O) > C_{st}(E)$, the relationships γ(O)<γ(E) and β(O)<β(E) are obtained. More specifically, although (Formula 31) is satisfied, (Formula 29) is not satisfied. Thus, although a flickering reduction effect is obtained, a brightness gradient reduction effect cannot be obtained. Furthermore, this also applies to, for example, the case where $C_{st}$ and $C_{lc}$ are set to be constant, and only $C_{gd}$ is varied. There is no problem when $C_{st}$ and $C_{gd}$ are set to be constant, and only $C_{lc}$ is varied.

Figure 32:
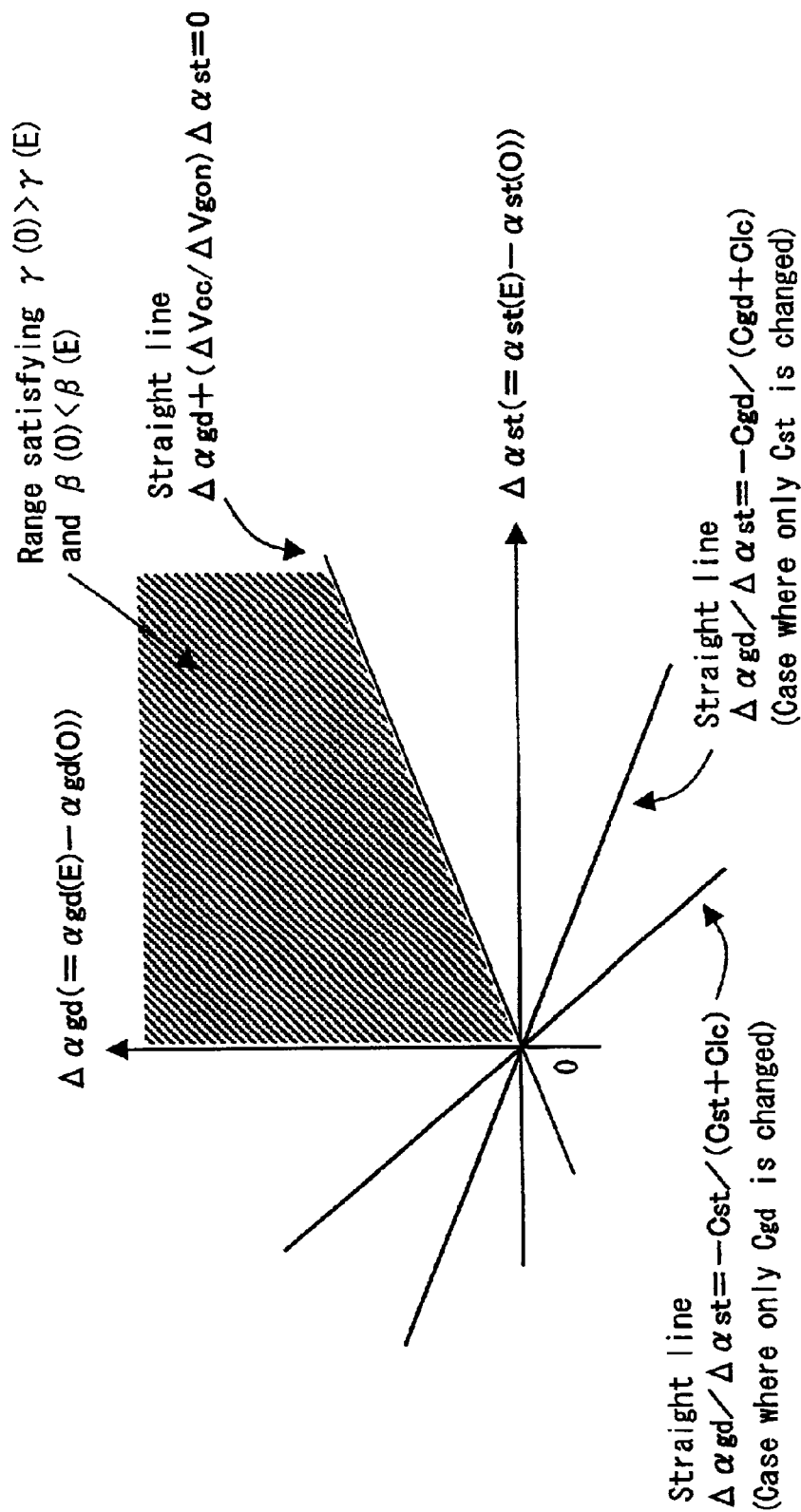
FIG. 32 is a view showing a range of $\Delta\alpha_{gd}$ and $\Delta\alpha_{st}$ capable of reducing a brightness gradient and flickering in the case where $\Delta\alpha_{gd}=\alpha_{gd}(E)-\alpha_{gd}(O)$ and $\Delta_{st}=\alpha_{st}(E)-\alpha_{st}(O)$.

A more detailed description will be provided regarding the above. Now, assuming that $\Delta\alpha_{gd}=\alpha_{gd}(E)-\alpha_{gd}(O)$, and $\Delta\alpha_{st}=\alpha_{st}(E)-\alpha_{st}(O)$, the range of $\Delta\alpha_{gd}$ and $\Delta\alpha_{st}$ satisfying both (Formula 29) and (Formula 31) can be represented by a hatched portion in FIG. 32 (assuming the case of $V_{cp}<0$, $\Delta V_{cc}<0$). In contrast, in the case where $C_{gd}$ and $C_{lc}$ are set to be constant, and only $C_{st}$ is varied between the portion away from the feeding ends and the portions close thereto ($C_{st}(O) \neq C_{st}(E)$), $\Delta\alpha_{gd}$ and $\Delta\alpha_{st}$ can be represented by (Formula 46).

$$\Delta\alpha_{gd} = \alpha_{gd}(E) - \alpha_{gd}(O) \quad \text{(Formula 46)}$$
$$= C_{gd}/(C_{gd}+C_{lc}+C_{st}(E)) -$$
$$\quad C_{gd}/(C_{gd}+C_{lc}+C_{st}(O))$$
$$= -C_{gd}[C_{st}(E)-C_{st}(O)]/[C_{gd}+$$
$$\quad C_{lc}+C_{st}(E))(C_{gd}+C_{lc}+C_{st}(O))]$$
$$\Delta\alpha_{st} = \alpha_{st}(E) - \alpha_{st}(O)$$
$$= C_{st}(E)/(C_{gd}+C_{lc}+C_{st}(E)) -$$
$$\quad C_{st}(O)/(C_{gd}+C_{lc}+C_{st}(O))$$
$$= (C_{gd}+C_{lc})[C_{st}(E)-C_{st}(O)]/[C_{gd}+$$
$$\quad C_{lc}+C_{st}(E))(C_{gd}+C_{lc}+C_{st}(O))]$$

Thus, it is understood that there is a relationship of (Formula 47) between $\Delta\alpha_{gd}$ and $\Delta\alpha_{st}$.

$$\Delta\alpha_{gd}/\Delta\alpha_{st} = -C_{gd}/(C_{gd}+C_{lc}) \quad \text{(Formula 47)}$$

Furthermore, in the case where $C_{st}$ and $C_{lc}$ are set to be constant, and only $C_{gd}$ is varied between the portion away from the feeding ends and the portions away therefrom ($C_{gd}(O) \neq C_{gd}(E)$), a relationship of (Formula 48) can be obtained similarly.

$$\Delta\alpha_{gd}/\Delta\alpha_{st} = -C_{st}/(C_{st}+C_{lc}) \quad \text{(Formula 48)}$$

The right sides of (Formula 47) and (Formula 48) have negative values. Therefore, when these relationships are added to FIG. 32, a straight line passing through an origin and having a negative slope can be obtained (excluding an origin) in both cases. Therefore, the straight line of (Formula 47) or (Formula 47) does not have a portion in common with the hatched region. More specifically, this shows that in the case of varying only $C_{st}$ or only $C_{gd}$, both a flickering reduction effect and a brightness gradient reduction effect cannot be satisfied.

(Principle 2 of the Present Invention: Optimum Distribution of β and γ)

Figure 20B:
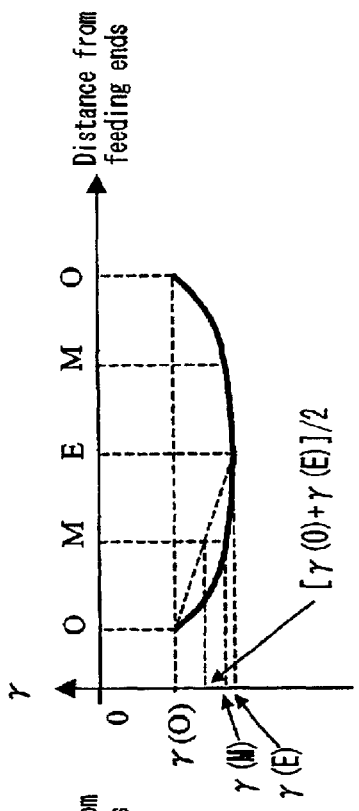
FIG. 20B shows an example of a method for providing a distribution of $\gamma$ in a screen.
Figure 20D:
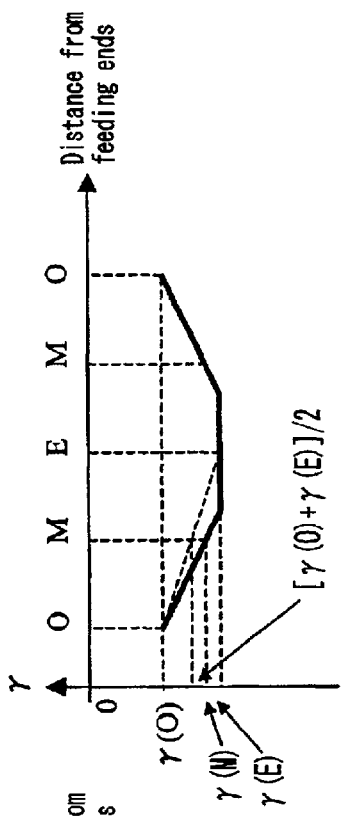
FIG. 20D shows an example of a method for providing a distribution of $\gamma$ in a screen.
Figure 20A:
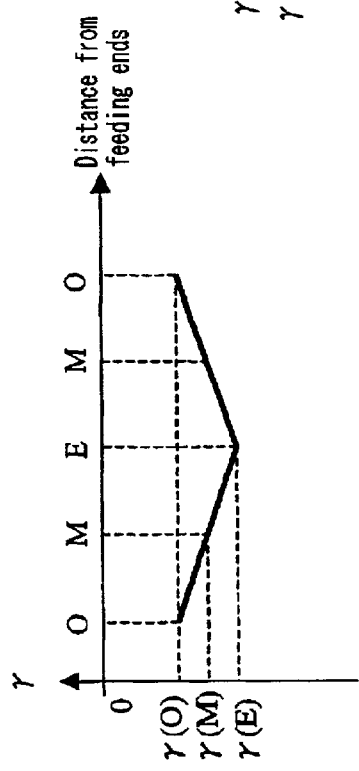
FIG. 20A shows an example of a method for providing a distribution of $\gamma$ in a screen.
Figure 20C:
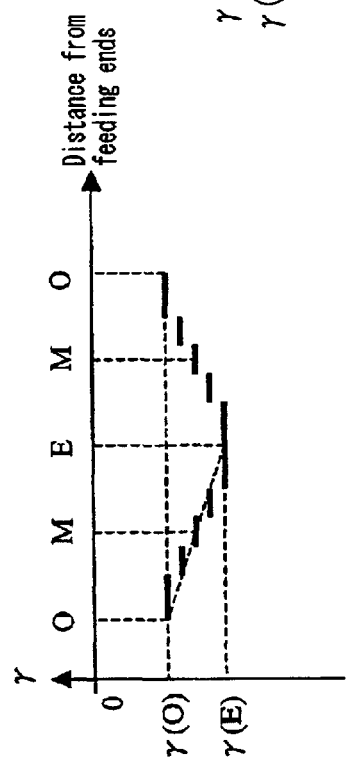
FIG. 20C shows an example of a method for providing a distribution of $\gamma$ in a screen.

The portions close to the feeding ends and the portion away therefrom have been used as representative points in the above. However, various change patterns of γ and β can be considered at each position across a screen. FIG. 19 shows some examples regarding β, and FIG. 20 shows some examples regarding γ. In each graph, the horizontal axis represents a horizontal position in a screen, and the vertical axis represents a value of β or γ. O, E, and M on the horizontal axis represent a portion close to the feeding ends, a portion away from the feeding ends, and a portion in the middle therebetween in terms of distance, respectively. As shown in FIG. 19A or 20A, a pattern that changes linearly can be considered most easily. Furthermore, as shown in FIG. 19B or 20B, a non-linear change also may be considered. Alternatively, as shown in FIG. 19C or 20C, a change in stages also may be considered. Alternatively, as shown in FIG. 19D or 20D, a combination of a constant portion and a portion with a slope also may be considered. In any case, the values of β and γ in the portion close to the feeding ends and in the portion away from the feeding ends satisfy (Formula 31) and (Formula 29). Thus, in any case, the effects of the present invention can be obtained.

In particular, as shown in FIGS. 19B, 19D, 20B, and 20D, it is desirable that β represents an upward convex trend between the portion close to the feeding ends and the portion away therefrom, and γ represents a downward convex trend between the portion close to the feeding ends and the portion away therefrom. The reason for this will be described below.

Figure 21:
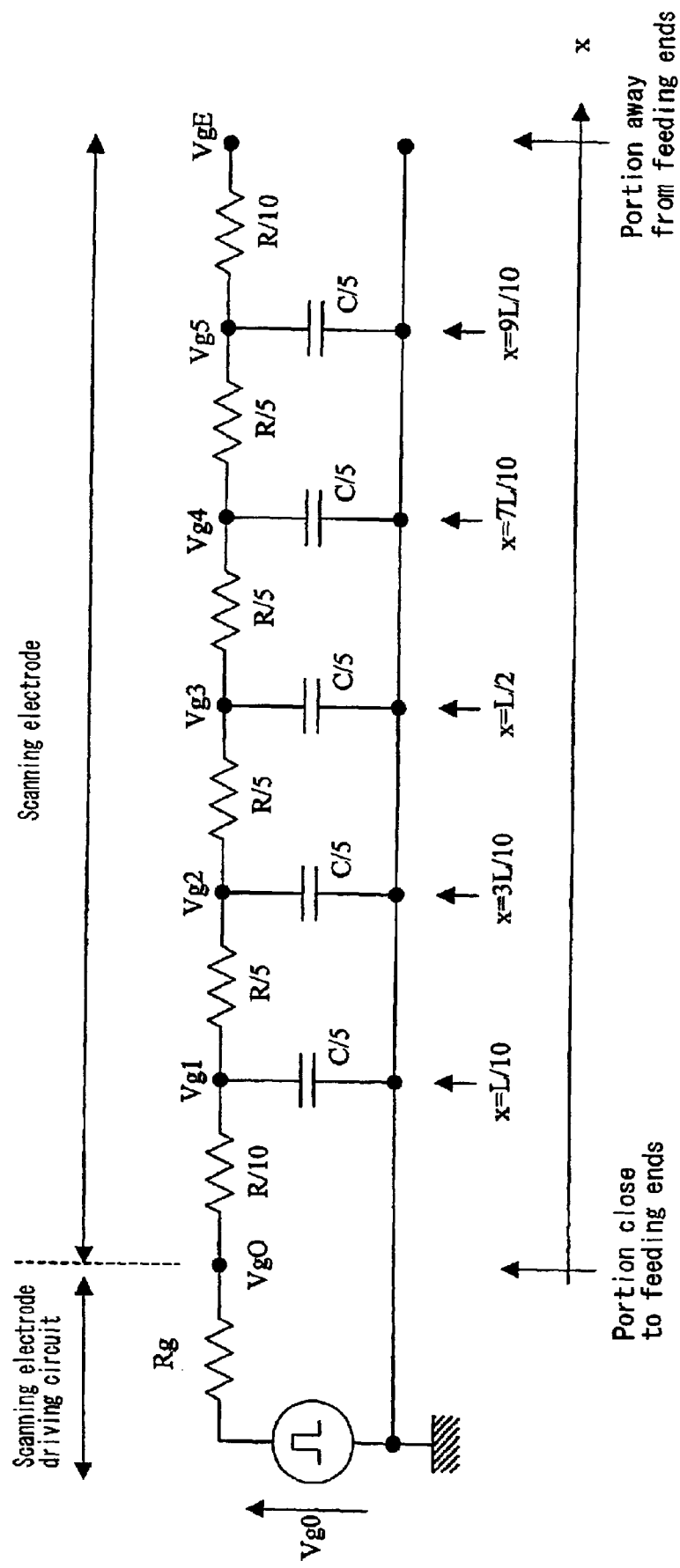
FIG. 21 is a model circuit diagram for considering the optimum distribution of $\beta$ and $\gamma$.
Figure 22:
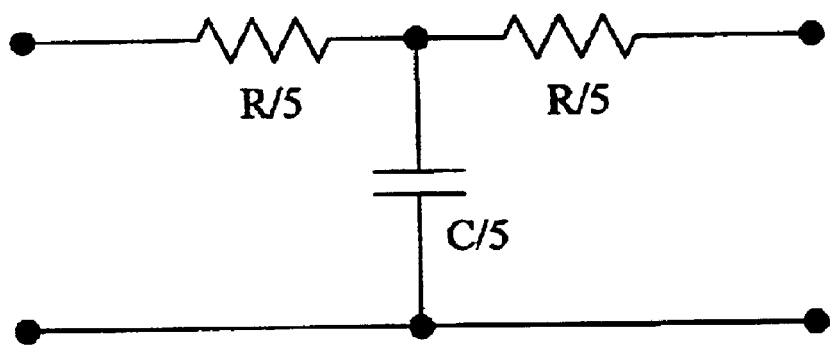
FIG. 22 is a circuit diagram of the model circuit in FIG. 21 on a constituent element level.

Scanning electrodes can be considered as wires having an RC distribution circuit constant. FIG. 21 shows scanning electrodes schematically, using 5-stage RC circuits, where the total capacitance between the portion close to the feeding ends and the portion away therefrom is represented as C, and the resistance thereof is represented as R. This assumes that a region between the portion close to the feeding ends of the scanning electrodes and the portion away therefrom is divided equally into five sections, and each of the sections represented by a unit RC circuit as shown in FIG. 22 is connected to each other. Assuming that the length between the portion close to the feeding ends of the scanning electrodes and the portion away therefrom is L, node potentials $V_g 0$, $V_g 1$, $V_g 2$, $V_g 3$, $V_g 4$, $V_g 5$, from the feeding ends of 0 (portion close to the feeding ends), L/10, 3L/10, L/2, 7L/10, 9L/10, and L (portion away from the feeding ends). The portion close to the feeding ends is supplied with a voltage by a scanning signal driving circuit. In FIG. 21, $V_g 0$ is a supply voltage of the scanning signal driving circuit, and $R_g$ is an internal impedance of the scanning signal driving circuit.

FIGS. 19 and 20 show the case assuming that a voltage is supplied from both sides. Since the graphs in FIGS. 19 and 20 are symmetrical, only the left half or right half may be considered. In the case of the circuit model in FIG. 21, only the left half of FIG. 19 or 20 is considered.

Figure 23:
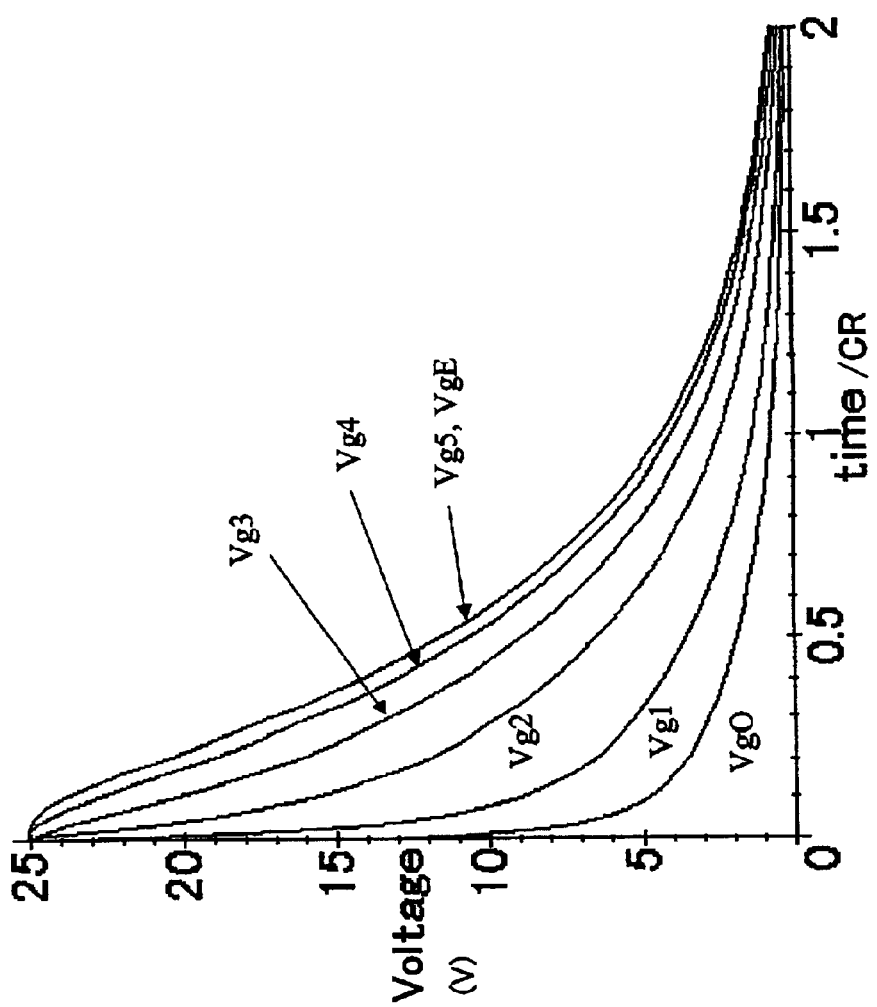
FIG. 23 is a graph showing changes in a voltage with time at each nodal point in the model circuit in FIG. 21.

A change with time in each node potential when the potential of the scanning electrodes in the above-mentioned circuit falls (i.e., when $V_g 0$ changes in the form of steps from an ON-level $V_{gon}$ to an OFF-level $V_{goff}$) can be solved by a circuit equation. FIG. 23 shows the results obtained by actually conducting calculation of numerical values. Herein, it is assumed that the potential of the scanning electrodes $V_g 0$ shifts from $V_{gon}$ to $V_{goff}$ at a time t=0, and as an example, calculation is conducted with respect to the case of $R_g$=R/9, $V_{gon}$=25 V, and $V_{goff}$=0 V. The horizontal axis is normalized with CR.

Next, as in the prior art, assuming that the capacitance of $C_{gd}$, $C_{st}$, $C_{lc}$, and the like are constant irrespective of a position, how $\Delta V_b$ changes with a position will be considered. The pixel configuration at each point is shown by the circuit in FIG. 14, so that a change with time in a pixel electrode potential $V_d$ when the above-mentioned $V_g 0$, $V_g 1$, $v_g 2$, ... are applied as $V_g(n)$ only needs to be tracked. When $V_c(n)$, $V_p$, and $V_s$ are assumed to be constant potentials in such a circuit, a change with time in $V_d$ is represented by (Formula 32).

$$I_{ds} + C_{tot} \cdot dV_d/dt - C_{gd} \cdot dV_g(n)/dt = 0 \quad \text{(Formula 32)}$$

Herein, $C_{tot} = C_{gd} + C_{gs} + C_{lc}$. Furthermore, $I_{ds}$ is a source-drain current of a TFT, which is represented by (Formula 33) when ideal MOS characteristics are assumed.

$$I_{ds} = k[\{V_g(n) - V_s - V_t\}^2 - \{V_g(n) - V_d - V_t\}^2] \quad \text{(Formula 33)}$$

(where $V_g(n) - V_s \geq V_t$, $V_g(n) - V_d \geq V_t$)

$$I_{ds} = k\{V_g(n) - V_s - V_t\}^2$$

(where $V_g(n) - V_s \geq V_t$, $V_g(n) - V_d < V_t$)

$$I_{ds} = -k\{V_g(n) - V_d - V_t\}^2$$

(where $V_g(n) - V_s < V_t$, $V_g(n) - V_d \geq V_t$)

$$I_{ds} = 0$$

(where $V_g(n) - V_s < V_t$, $V_g(n) - V_d < V_t$)

Figure 24:
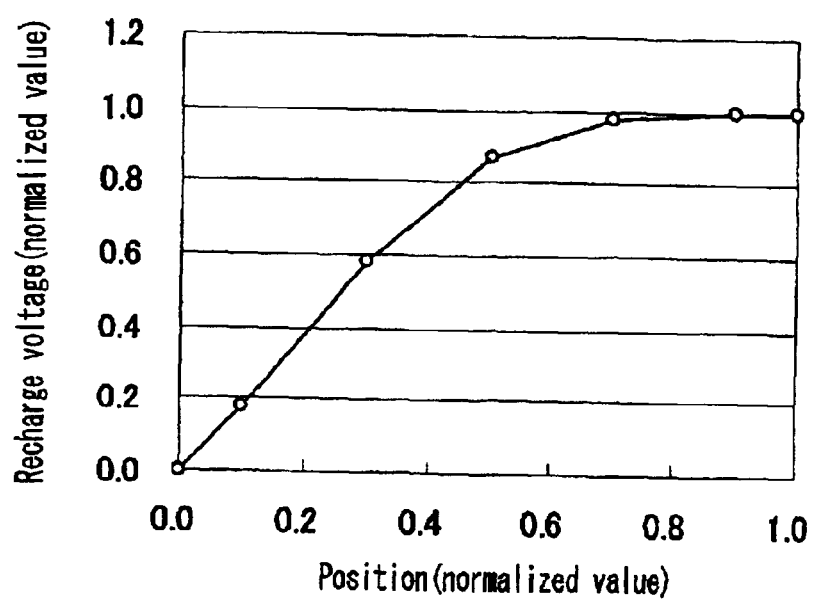
FIG. 24 is a graph showing a distribution of a recharge voltage in a screen obtained by model calculation.

Herein, k is a constant representing a charge ability of a TFT, and $V_t$ represents a threshold voltage of a TFT. The initial conditions of (Formula 32) are $V_d = V_s$, $V_g(n) = V_{gon}$ at t=0. Furthermore, after a sufficient time elapses (t=∞), $V_g(n) = V_{goff}$, a TFT is in an OFF state, and $I_{ds}$=0 (in the case of the fourth formula of (Formula 33)). Therefore, $V_d$ becomes a constant value ($dV_d/dt=0(t=\infty)$ is obtained from (Formula 32)). The difference between the value of a final plateau $V_{do}$ of $V_d$ obtained by numerical calculation and the value of a final plateau $V_{do}$ of $V_d$ in the absence of recharge, i.e., the value of $V_{do}$ when $I_{ds}$=0 always is satisfied in (Formula 32), i.e., $V_{do} = V_s - (C_{gd}/C_{tot})(V_{gon} - V_{goff})$, corresponds to a recharge voltage $\Delta V_b$. FIG. 24 shows the results obtained by actually calculating the value of $\Delta V_b$, assuming that $V_t$=2 V, $V_s$=6 $V_{gd}/C_{tot}$=0.05, and k=b 6×10⁻⁹ A/V², as an example. In this graph, a horizontal axis shows values normalized assuming that the portion close to the feeding ends is "0", and the portion away from the feeding ends is "1". A vertical axis also shows values normalized assuming that $\Delta V_b$ at the portion away from the feeding ends is "1". As is understood from this graph, a distribution of a recharge voltage has an upward convex shape.

When there is such a distribution of a recharge voltage, the distribution of a DC average level of a pixel electrode and a liquid crystal application voltage effective value generated by the distribution of the recharge voltage also has a shape as shown in FIG. 24 (in the liquid crystal application voltage effective value, as is presumed from the fact that the right side of (Formula 21) becomes negative, a graph of FIG. 24 inverted upside down can be obtained. In the DC average level, the right side of (Formula 20) is positive, so that a graph is not inverted upside down). Thus, it is desirable that the distributions of β and γ for correcting flickering (caused by the distribution of a DC average level) and a brightness gradient (caused by the distribution of a liquid crystal application voltage effective value) has a shape similar to that in FIG. 24. More specifically, it is desirable that β is set to be as shown in FIG. 19B, and γ is set to be as shown in FIG. 20B (FIGS. 19D and 20D may be possible).

The above description will be considered paying attention to a position (hereinafter, simply referred to as an intermediate position) in the middle in terms of a distance between the portion close to the feeding ends and the portion away therefrom. Assuming that values of β and γ at the portion close to the feeding ends are β(O) and γ(O), the values thereof at the portion away from the feeding ends are β(E) and γ(E), and the values thereof at an intermediate position are β(M) and γ(M), as shown in FIGS. 19A and 20A, the values of β and γ at the intermediate position in the case where a linear slope is provided are given by β(M)=[β(O)+β(E)]/2 and γ(M)=[γ(O)+γ(E)]/2. Compared with this, in the case where the effects of reduction of flickering and a brightness gradient are obtained effectively, i.e., in the case as shown in FIGS. 19B, 20B, 19D, and 20D, the following relationship of (Formula 34) is satisfied.

$$\beta(M) > [\beta(O)+\beta(E)]/2$$

$$\gamma(M) < [\gamma(O)+\gamma(E)]/2 \quad \text{(Formula 34)}$$

The first formula of (Formula 34) is a conditional expression regarding flickering, and the second formula is a conditional expression regarding a brightness gradient.

Figures 25A, 25B:
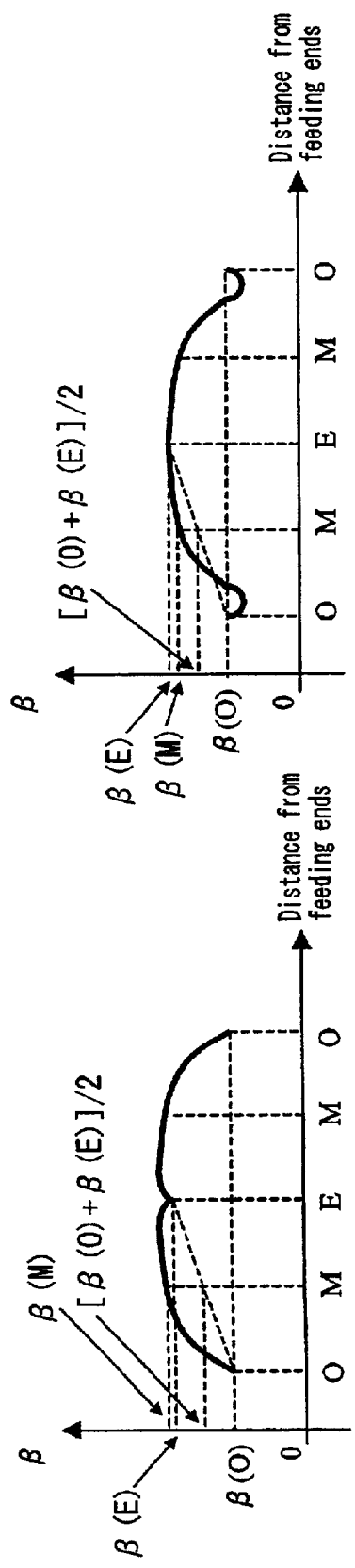
FIG. 25A is a graph showing another example of a method for providing a distribution of β in a screen.
FIG. 25B is a graph showing another example of a method for providing a distribution of β in a screen.

If only (Formula 34) is satisfied when (Formula 29) and (Formula 31) are satisfied, the above-mentioned effects of a reduction in flickering and a brightness gradient can be obtained sufficiently. For example, as shown in FIGS. 25A and 25B, β may not always increase monotonically with respect to a distance from the feeding ends, and in a more extreme case, as shown in FIG. 25A, β(M) may exceed β(E). However, even in these cases, the effects of a reduction in flickering and a brightness gradient can be obtained. This also applies to γ.

(Supplementary Item 1 Regarding the Principle: $V_{cp}$ and $\Delta V_{cc}$)

A supplementary description will be made with respect to $V_{cp}$ of (Formula 19). If the third term regarding recharge is ignored since it is very small, and $\alpha_{st}V_{cp}$ is assumed to be negative in the formula regarding $V_{eff}$ of (Formula 18) and (Formula 23), an effective value of a voltage applied to liquid crystal becomes a value larger than a video signal amplitude $[V_{sig}(+)-V_{sig}(-)]/2$. This corresponds to the following: an advantage in which a voltage (e.g., 10 to 15 V) equal to or higher than a withstand voltage can be applied to liquid crystal, using a video signal driving IC with a low withstand voltage (e.g., about 5 V), as described in the Background Art. Therefore, it is desirable that $\alpha_{st}V_{cp}$ is negative. Since $\alpha_{st}$ is a capacitance ratio and is always positive, it is desirable that $V_{cp}$ is negative.

Furthermore, a supplementary description will be made with respect to $\Delta V_{cc}$ c of (Formula 19). If the third term regarding recharge is ignored since it is very small in (Formula 18) and (Formula 23) regarding $V_{dc}$, by satisfying the following (Formula 35), a DC average level $[V_{sig}(+)+V_{sig}(-)]/2$ of a video signal can be matched with a DC average level $V_{dc}(O)$ or $V_{dc}(E)$ of a pixel electrode.

$$\Delta V_{cc} = -(\alpha_{gd}/\alpha_{st})\Delta V_{gon} \quad \text{(Formula 35)}$$

Because of the above, a d.c. voltage component is not supplied between a video signal electrode and a pixel electrode, and unnecessary ions can be suppressed from being generated in liquid crystal and an insulating film. Therefore, stability with time can be enhanced. Since $\Delta V_{gon}$, $\alpha_{gd}$, and $\alpha_{st}$ are positive, it is desirable that $\Delta V_{cc}$ is negative. Even if (Formula 35) is not satisfied, if at least $\Delta V_{cc}$ is negative, a voltage difference between a DC average level $[V_{sig}(+)+V_{sig}(-)]/2$ of a video signal and a DC average level $V_{dc}(O)$ or $V_{dc}(E)$ of a pixel electrode can be reduced, and the above-mentioned effects can be obtained to some degree.

(Supplementary Item 2 Regarding the Principle: Method for Supplying A Power of Scanning Electrodes and Common Electrodes)

Next, a supplementary description will be made with respect to a method for supplying a power of scanning electrodes and common electrodes. In (analysis of the problems of the prior art), it is described that a recharge current (recharge voltage) increases due to the fluctuation in a potential of common electrodes. It also is described that this influence is small in the portions close to the feeding ends of the common electrodes, whereas it is large in the portion away from the feeding ends. Thus, the in-plane distribution of a recharge voltage depends slightly on a method for supplying a power of the common electrodes, as well as a method for supplying a power of the scanning electrodes. Now, for example, the following five combinations of methods for supplying power by the scanning electrodes and the common electrodes are considered.

(A) The scanning electrodes and the common electrodes supply power from both sides (in the above description, this case is assumed).

(B) The scanning electrodes supply power from both sides, and the common electrodes supply a power from one side.

(C) The scanning electrodes supply power from one side, and the common electrodes supply a power from both sides.

(D) The scanning electrodes and the common electrodes supply power from one side (from the same side).

(E) The scanning electrodes and the common electrodes supply power from one side (from different sides).

(In addition, for example, power may be supplied alternately from both sides of every other line, and power may be supplied from the left side in the upper half of a screen and from the right side in the lower half thereof. These cases are applicable to any of the above-mentioned (A) to (E), if one line is considered.)

Figure 26A:
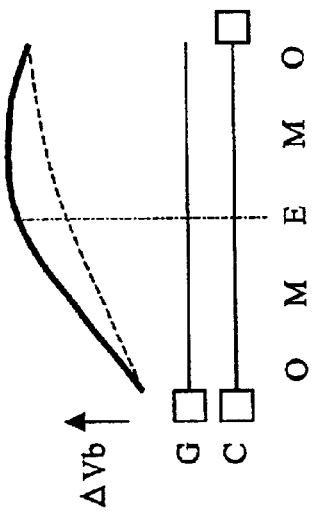
FIG. 26A is a view showing a relationship between an example of a method for feeding a scanning electrode and a common electrode and a recharge voltage.
Figure 26B:
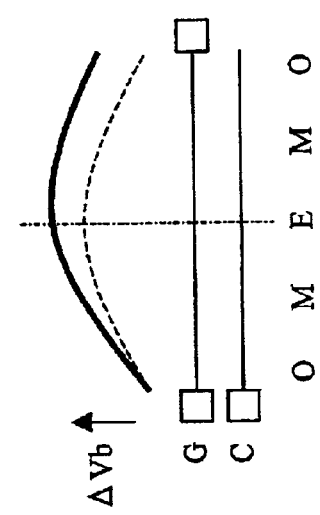
FIG. 26B is a view showing a relationship between an example of a method for feeding a scanning electrode and a common electrode and a recharge voltage.
Figure 26C:
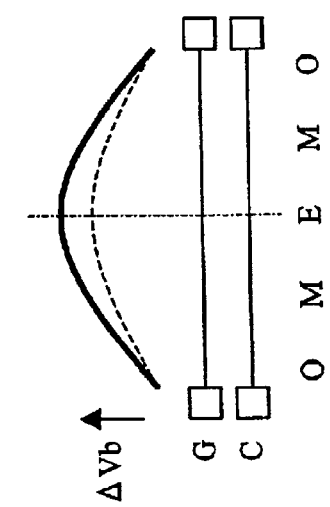
FIG. 26C is a view showing a relationship between an example of a method for feeding a scanning electrode and a common electrode and a recharge voltage.
Figure 26D:
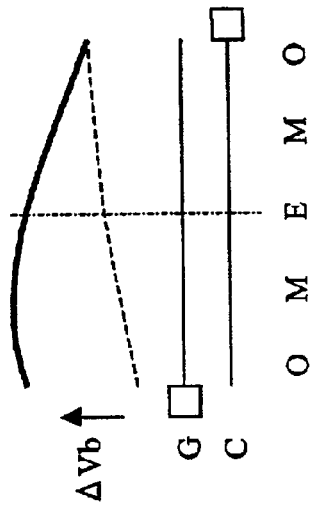
FIG. 26D is a view showing a relationship between an example of a method for feeding a scanning electrode and a common electrode and a recharge voltage.
Figure 26E:
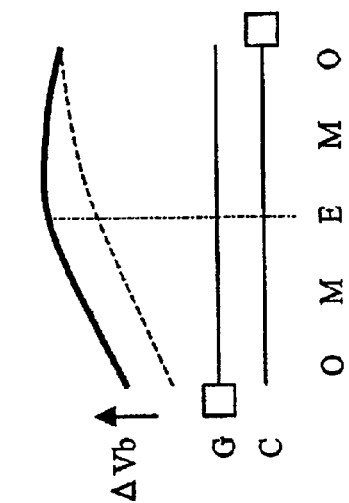
FIG. 26E is a view showing a relationship between an example of a method for feeding a scanning electrode and a common electrode and a recharge voltage.
Figure 26E:
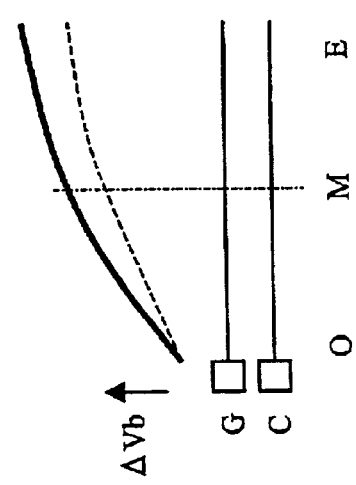

Regarding the above-mentioned (A) to (E), FIGS. 26A to 26E show a predicted in-plane distribution (distribution in a horizontal direction) representing how a recharge voltage $\Delta V_b$ is generated. In these figures, G represents a scanning electrode, and C represents a common electrode. A portion with a square mark (□) represents a feeding end. A curve represented by a broken line shows a recharge voltage in the case where fluctuations in a potential of the common electrode are not considered, and a curve represented by a solid line shows a recharge voltage in the case where fluctuations in a potential of the common electrode are considered. In the case where the fluctuations in a potential of the common electrode are not considered, a recharge voltage exhibits an arched curve when the scanning electrode is supplied with a power from both sides ((A), (B)), and exhibits a semi-arched curve when the scanning electrode is supplied with a power from one side ((C), (D), (E)). When the fluctuations in a potential of the common electrode are considered, $\Delta V_b$ is loaded by the corresponding amount. The loaded amount at this time becomes small at the portion close to the feeding ends of the common electrode, and becomes large at the portion away from the feeding ends. In the case of (E), due to the $\Delta V_b$ distribution generated only by the scanning electrode and the amount loaded depending upon the effect of fluctuations in a potential of the common electrode, as shown in FIG. 26E, there may be the case in which ΔVb is smaller in the feeding ends of the scanning electrode, compared with the feeding ends of the common electrode, and the case in which ΔVb is smaller in the feeding ends of the common electrode, compared with the feeding ends of the scanning electrode as shown in FIG. 26E'.

In order to obtain the effect of reduction in a brightness gradient and flickering according to the present invention most effectively, it is most desirable to provide a distribution to β and γ (more exactly, |γ|) in accordance with the shape of $\Delta V_b$ in FIGS. 26A to 26E (more specifically, so that a brightness gradient and flickering generated by $\Delta V_b$ are corrected). However, it is not necessarily required to provide such a distribution over the entire screen.

Hereinafter, regarding each case of (A) to (E), the relationship with respect to the expression of the present invention will be described. First, in (A) to (E), end portions of a screen to which at least one of a scanning electrode and a common electrode is supplied with a power will be referred to as "portions close to the feeding ends). More specifically, in all the cases excluding (D), both ends of the screen become "portions close to the feeding ends" (represented by a mark "O" in FIG. 26). In only (D), only one end portion becomes a "portion close to the feeding ends". In the cases other than (D), the vicinity of the center of the screen will be referred to as a "portion away from the feeding ends (represented by a mark "E"). In the case of (D), the end portion not supplied with a power becomes a "portion away from the feeding ends". The position represented by a mark "M" in the figure is a portion corresponding to the middle between the "portion close to the feeding ends" and the "portion away from the feeding ends" in terms of a distance.

In the cases other than (D), there are two "portions close to the feeding ends". When a certain value ($\alpha_{gd}$, $\alpha_{st}$, etc.) has different values between the portion close to the feeding ends and the portion away from the feeding ends, this means that a value of at least one of a plurality of "portions close to the feeding ends" is different from a value of a "portion away from the feeding ends". Furthermore, when a certain value (β, γ, etc.) is "larger (smaller) in a portion away from the feeding ends, compared with the portions dose to the feeding ends", this means that a value of the "portion away from the feeding ends" is larger (smaller) than the value of at least one of a plurality of "portions close to the feeding ends".

Based on the above-mentioned interpretation, it is understood from FIGS. 26A to 26E' that the relationship of (Formula 16) holds in any case. Therefore, what is described in (Description 1 of the principle of the present invention: Principle of a reduction in a brightness gradient/flickering) is fully applicable.

The first and second formulae of (Formula 16) can be understood easily if $V_b(O, +)$, $V_b(O, -)$, and $V_b(E, +)$, $V_b(E, -)$ are replaced by $V_b$ in FIGS. 26A to 26 E'. Regarding the third formula, as is understood from FIG. 18, if it is considered that a recharge voltage is much larger in the case of negative charge than in the case of positive charge, a magnitude correlation between $V_b(O, +)-V_b(O, -)$ and $V_b(E, +)-V_b(E, -)$ may be considered to be the same as that between $-V_b(O, -)$ and $-V_b(E, -)$. It is considered that the third formula also holds since the second formula holds.

Furthermore, curves of $\Delta V_b$ in FIGS. 26A to 26E' have an upward convex shape. Therefore, what is described in (Principle 2 of the present invention: Optimum distribution of β and γ) is fully applicable.

(Supplementary Item 3 Regarding the Principle: Another Circuit Configuration)

Figure 27:
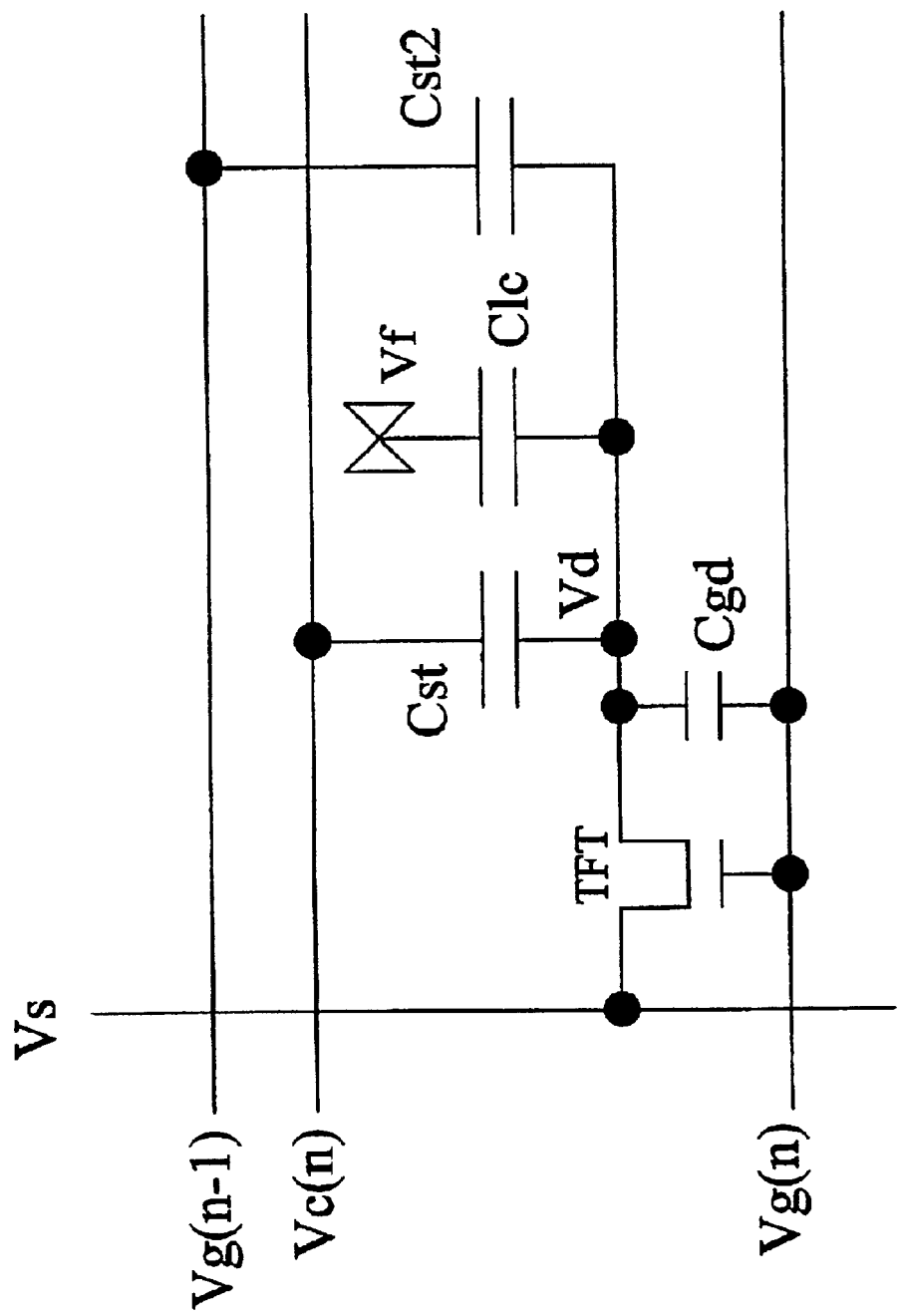
FIG. 27 is a circuit diagram of one pixel in another example of a display apparatus of the present invention.

The above description is predicated on each pixel having the configuration in FIG. 14. However, the storage capacitance of each pixel also is connected to wiring other than a common electrode. For example, as shown in FIG. 27, the storage capacitance may be connected to a scanning electrode (in this figure, an example of the previous stage) other than the stage concerned. In this case, if the potential of a scanning electrode of the previous stage is $V_g(n-1)$, and storage capacitance connected thereto is $C_{st}2$, the formula of conservation of charge corresponding to (Formula 11) is given by (Formula 36).

$$C_{gd}(V_{sig}(-) - V_{gon}) + C_{st}(V_{sig}(-) - V_c(-)) + \\ C_{lc}(V_{sig}(-) - V_f) + C_{st}2(V_{sig}(-) - V_{goff}) = \\ C_{gd}(V_{do}(-) - V_{goff}) + C_{st}(V_{do}(-) - V_{coff}) + \\ C_{lc}(V_{do}(-) - V_f) + C_{st}2(V_{do}(-) - V_{goff}) \\ C_{gd}(V_{sig}(+) - V_{gon}) + C_{st}(V_{sig}(+) - V_c(+)) + \\ C_{lc}(V_{sig}(+) - V_f) + C_{st}2(V_{sig}(+) - V_{goff}) = \\ C_{gd}(V_{do}(+) - V_{goff}) + C_{st}(V_{do}(+) - V_{coff}) + \\ C_{lc}(V_{do}(+) - V_f) + C_{st}2(V_{do}(+) - V_{goff})$$

(Formula 36)

Herein, when a scanning electrode $V_g(n)$ is selected, $V_g(n-1)$ has already been selected. Therefore, the potential is $V_{goff}$. When (Formula 36) is modified, (Formula 37) is obtained.

$$V_{do}(-) = V_{sig}(-) - \alpha_{st}\Delta V_c(-) - \alpha_{gd}\Delta V_{gon}$$
$$V_{do}(+) = V_{sig}(+) - \alpha_{st}\Delta V_c(+) - \alpha_{gd}\Delta V_{gon}$$

(Formula 37)

Herein, $\Delta V_{gon}$, $\Delta V_c(+)$, and $\Delta V_c(-)$ are represented by (Formula 13), and $\alpha_{gd}$ and $\alpha_{st}$ are represented by the following (Formula 38):

$$\alpha_{gd} = C_{gd}/C_{tot}$$
$$\alpha_{st} = C_{st}/C_{tot}$$
$$C_{tot} = C_{gd} + C_{lc} + C_{st} + C_{st}2$$

(Formula 38)

When the above-mentioned results are compared with Formulae 12 to 14 in the circuit of FIG. 14, there is only a difference in that $C_{st}2$ is added to the formula of $C_{tot}$. Therefore, as long as consideration is given to the fact that $C_{tot}$ is different, the principle and supplementary items of the present invention described in the above are fully applicable.

Depending upon the case, the following also may be considered: the values of $\alpha_{st}$ and $\alpha_{gd}$ are made different by making the value of $C_{st}2$ different between the portion close to the feeding ends and the portion away from the feeding ends, whereby the effects of the present invention are obtained.

Even if the connection destination of $C_{st}2$ is a scanning electrode in the previous stage, that in a second from the previous stage, that in a third from the previous stage, that in a second from the subsequent stage, that in a third from the subsequent stage, or the like, the same effects can be obtained.

If $C_{tot}$ is further generalized and considered to be a "total of the entire capacitance connected electrically to pixel electrodes", including FIGS. 14 and 27, the description and supplementary items regarding the principle of the present invention are all applicable.

Hereinafter, a display apparatus constituted by using the above-mentioned principle will be described with reference to the drawings.

(Embodiment 1)

Figure 1:
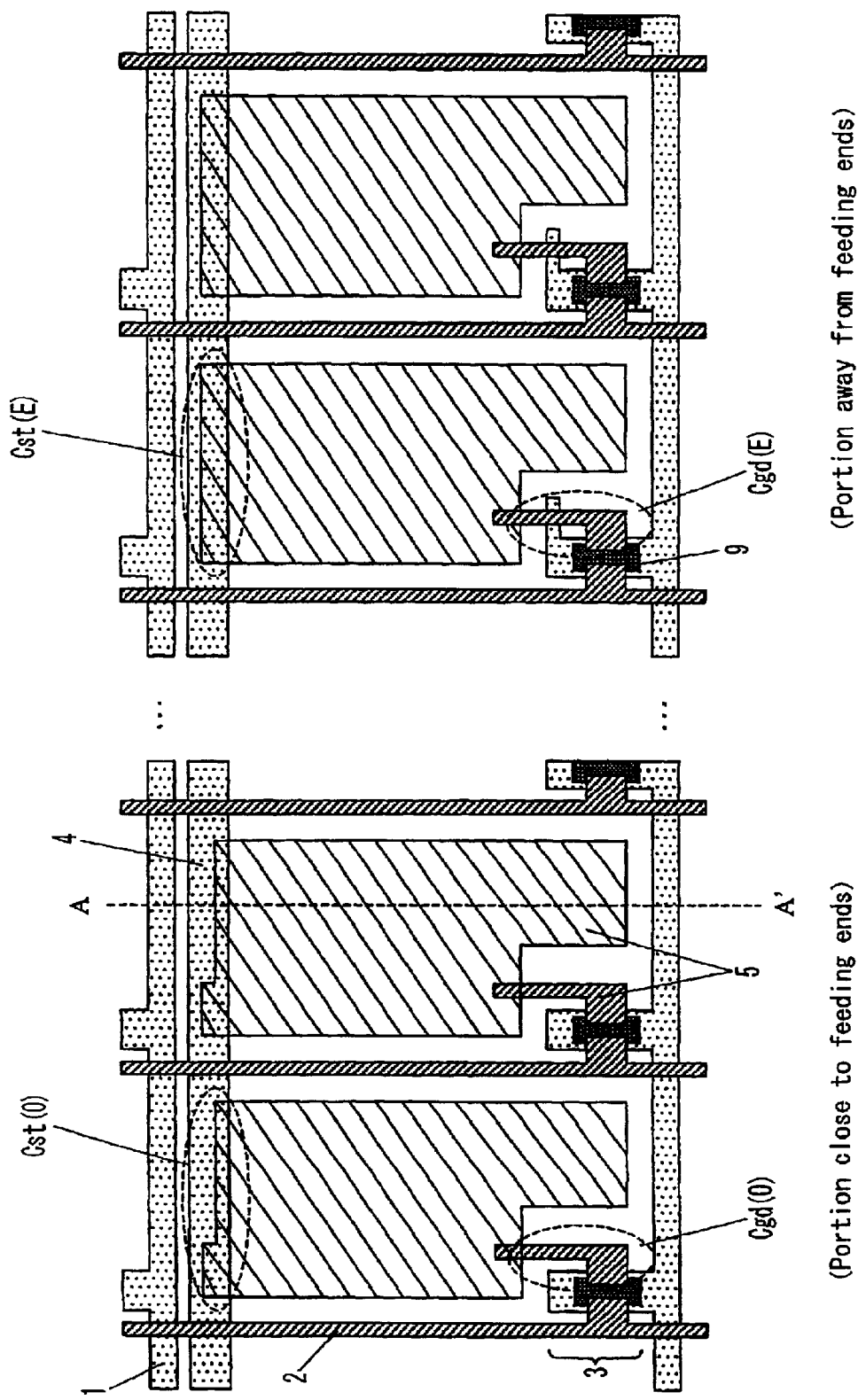
FIG. 1 shows plan views of a pixel layout of a display apparatus of a first embodiment according to the present invention.
Figure 2:
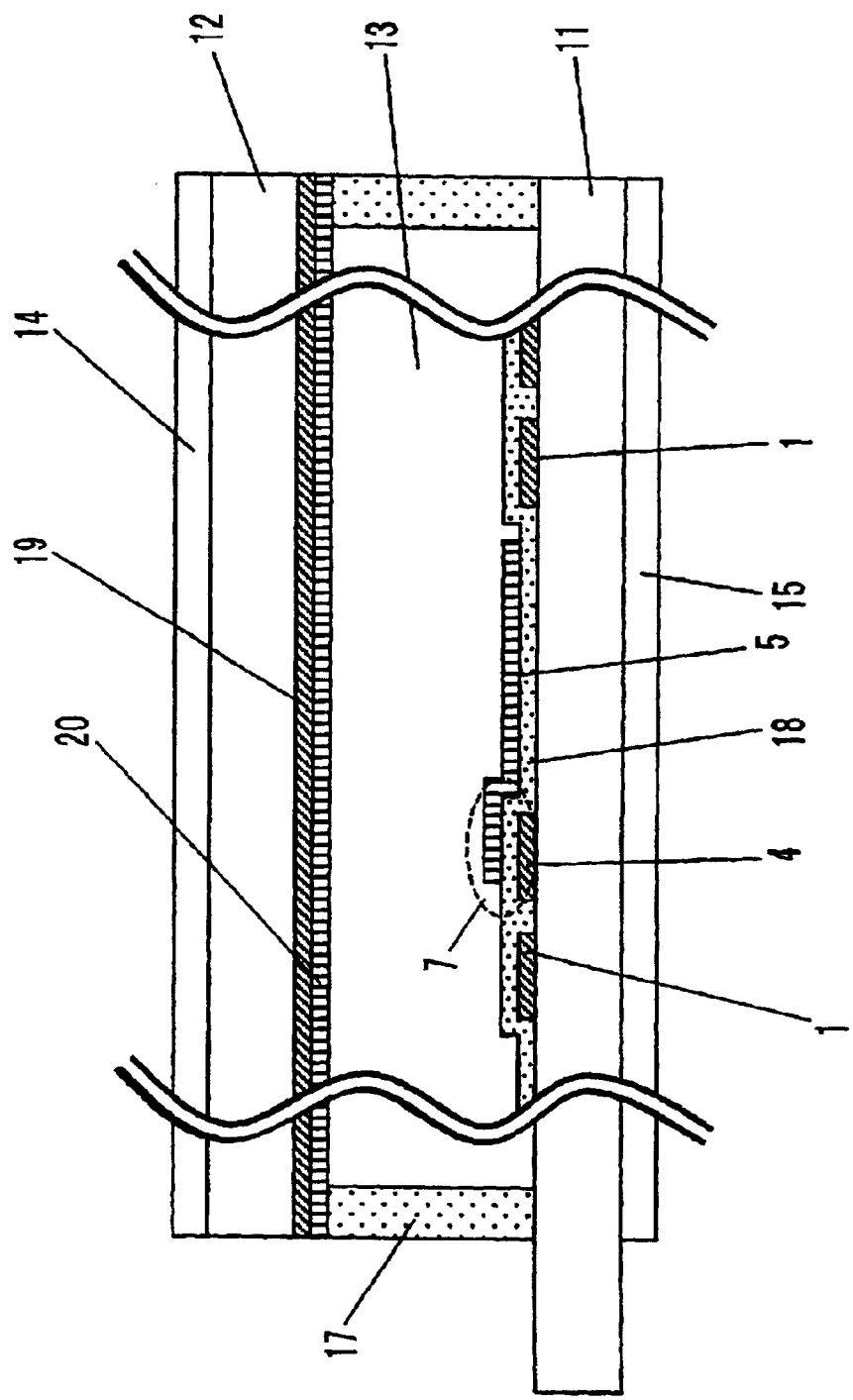
FIG. 2 is a cross-sectional view taken along a line A–A' in FIG. 1.

FIG. 1 is a plan view showing a pixel layout of a display apparatus of the first embodiment according to the present invention. FIG. 2 is a cross-sectional view taken along a line A–A' in FIG. 1.

In FIGS. 1 and 2, reference numerals 11 and 12 denote substrates made of glass or the like. Reference numeral 11 denotes an array substrate on which thin film transistors 3 (also called TFTs or switching elements) and electrodes connected thereto are formed, and reference numeral 12 denotes a counter substrate opposing the array substrate. Liquid crystal 13 is interposed between two substrates as a display medium, and both ends of the substrates are sealed with a seal 17. Reference numerals 14 and 15 denote polarizing plates for conducting a polarization display, and 19 denotes a color filter for conducting a color display. Although the color filter 19 is formed on the counter substrate 12 side, it may be formed on the array substrate 11 side.

Scanning electrodes 1 and common electrodes 4 are formed of a first conductive layer on the array substrate 11, and an insulating film 18 covers these electrodes. A pixel electrode 5 is formed of a second conductive layer on the insulating film 18. As shown in FIG. 2, a part of the pixel electrode overlaps the common electrode 4. An overlapping portion with the common electrode 4 constitutes a storage capacitor 7 (i.e., common electrode-pixel electrode capacitance $C_{st}$). Furthermore, an overlapping portion of the pixel electrode 5 and the scanning electrode 1 constitutes a scanning electrode-pixel electrode capacitance $C_{gd}$.

As shown in FIG. 2, a transparent electrode 20 is formed on the counter substrate 12. The transparent electrode 20 and the pixel electrode 5 oppose each other via liquid crystal 13 as a display medium, thereby forming a liquid crystal capacitance $C_{lc}$. Herein, it is assumed that liquid crystal is TN (twisted nematic) liquid crystal.

The thin film transistor 3 is composed of a semiconductor portion 9 and three electrodes. Gate electrodes are connected to the scanning electrodes 1, source electrodes are connected to video signal electrodes 2, and drain electrodes are connected to pixel electrodes 5.

Figure 3:
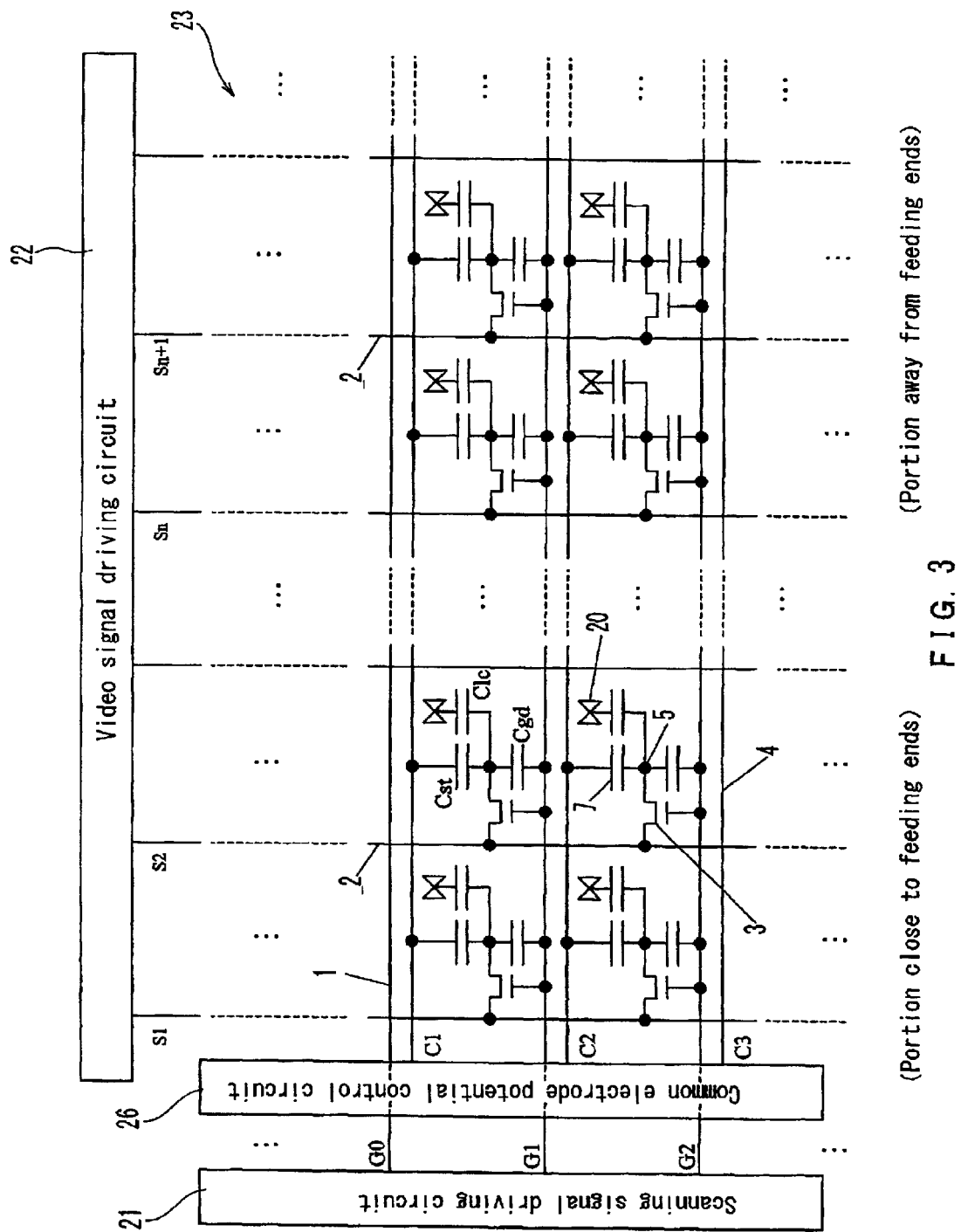
FIG. 3 is a circuit configuration diagram of the display apparatus of the first embodiment according to the present invention.

FIG. 3 is a circuit configuration diagram of a display apparatus of the first embodiment according to the present invention. There are provided a common electrode-pixel electrode capacitance $C_{st}$, a scanning electrode-pixel electrode capacitance $C_{gd}$, and a liquid crystal capacitance $C_{lc}$ in one pixel so as to correspond to FIGS. 1 and 2. When one pixel alone is considered, the circuit configuration in FIG. 3 is the same as that in FIG. 14. Such pixels are arranged in a matrix, whereby a display apparatus is constituted. Furthermore, in the display apparatus, the video signal electrodes 2 are connected to a video signal driving circuit 22, the scanning electrodes 1 are connected to the scanning signal driving circuit 21, and the common electrodes 4 are connected to a common electrode potential control circuit 26. Reference numeral 23 denotes a display element excluding the driving circuits.

In FIG. 3, portions close to feeding ends and a portion away from the feeding ends are shown. A pixel layout in each portion is as shown in FIG. 1. The display apparatus of the present embodiment is characterized in that $C_{st}$ and $C_{gd}$ have different shapes between the portion close to the feeding ends and the portion away therefrom, and a capacitance value itself also is different (area of the capacitor is different). Because of this, as described in (Description 1 of the principle of the present invention: Principle of a reduction in a brightness gradient/flickering), a brightness gradient and flickering can be reduced.

The effects of the present invention can be obtained most conspicuously when the following three conditions are satisfied:

(1) The video signal driving circuit is capable of applying two kinds of video signals with different polarities (i.e., positive and negative video signals based on the potential of the counter electrode, corresponding to $V_{sig}(+)$ and $V_{sig}(-)$ in FIG. 15) to video signal electrodes in accordance with a display period.

(2) The scanning signal driving circuit is capable of applying an output potential level with at least two values ($V_{gon}$ and $V_{goff}$ in FIG. 15).

(3) The common electrode potential control circuit is capable of applying an output potential level with at least two values ($V_c(+)$ and $V_c(-)$ in FIG. 15).

In (FIG. 1), $C_{gd}(O)<C_{gd}(E)$, $C_{st}(O)<C_{st}(E)$ (this relationship is obtained from the relationship in magnitude of an area of an overlapping portion). However, as an example, assuming that $C_{gd}(O)=0.020$ pF, $C_{st}(O)=0.100$ pF, $C_{lc}(O)=0.100$ pF, $C_{gd}(E)=0.030$ pF, $C_{st}(E)=0.130$ pF, and $C_{lc}(E)=0.100$ pF, the above-mentioned conditions can be satisfied (the capacitance may be calculated from an area, a film thickness, and a dielectric constant, or may be obtained by actual measurement).

In this case, when $\alpha_{gd}(O)$, $\alpha_{st}(O)$, and $\alpha_{gd}(E)$, $\alpha_{st}(E)$ are calculated by (Formula 14), $\alpha_{gd}(O)=0.091$, $\alpha_{st}(O)=0.455$, $\alpha_{gd}(E)=0.115$, $\alpha_{st}(E)=0.500$. Assuming that driving conditions are $\Delta V_{gon}=20$ V, $\Delta V_{cc}=-3$ V, and $V_{cp}=-10$ V, $\gamma(O)$, $\gamma(E)$, and $\beta(O)$, $\beta(E)$ are obtained by (Formula 25) and (Formula 27), and $\gamma(O)=-2.275$ V, $\gamma(E)=-2.5$ V, and $\beta(O)=0.023$, $\beta(E)=0.040$ are obtained, respectively. More specifically, it is understood that (Formula 29) and (Formula 31) are satisfied, and the effect of reduction in a brightness gradient and flickering can be obtained.

Needless to say, what is described in (Principle 2 of the present invention: Optimum distribution of $\beta$ and $\gamma$), (Supplementary item 1 regarding the principle: $V_{cp}$ and $\Delta V_{cc}$), (Supplementary item 2 regarding the principle: method for supplying a power of scanning electrodes and common electrodes), and (Supplementary item 3 regarding the principle: Another circuit configuration), as well as ((Description 1 of the principle of the present invention: Principle of a reduction in a brightness gradient/flickering) is all applicable.

For reference, the results obtained from simulation conducted by applying specific numerical values to parameters such as a capacitance in the present embodiment are shown in FIGS. 33A to 33D. In this simulation, an equivalent circuit of the entire display region is composed with a circuit simulator, and a DC average level ($V_{dc}$) and a liquid crystal application voltage effective value ($V_{eff}$) at each position in the display region are calculated. The driving voltage conditions are $V_{gon}=10$ V, $V_{goff}=-15$ V, $\Delta V_c(+)=-7.5$ V, $\Delta V_c(-)=2.5$ V, $V_{sig}(+)=2.5$ V, $V_{sig}(-)=-2.5$ V (therefore, $V_{cp}<0$, $\Delta V_{cc}<0$ are satisfied), and it is assumed that a power is supplied only from the left side of a display region in both the scanning signal driving circuit and the common electrode potential control circuit.

Figure 33A:
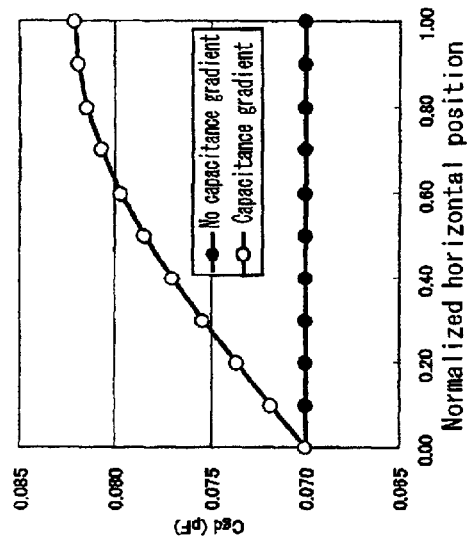
FIG. 33A is a view showing an optimum distribution of $C_{st}$ and $C_{gd}$ in a display region obtained by simulation.
Figure 33B:
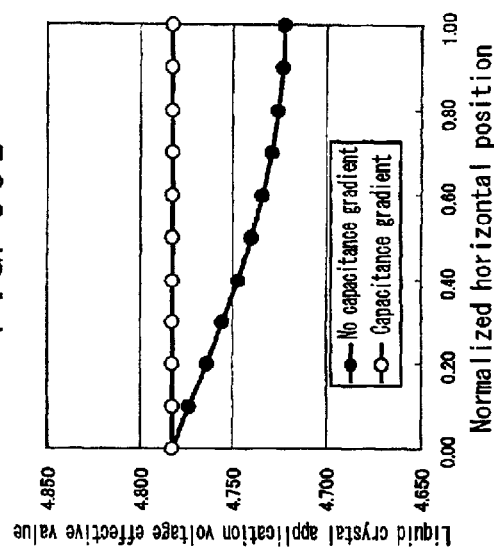
FIG. 33B is a view showing an optimum distribution of $C_{st}$ and $C_{gd}$ in a display region obtained by simulation.
Figure 33C:
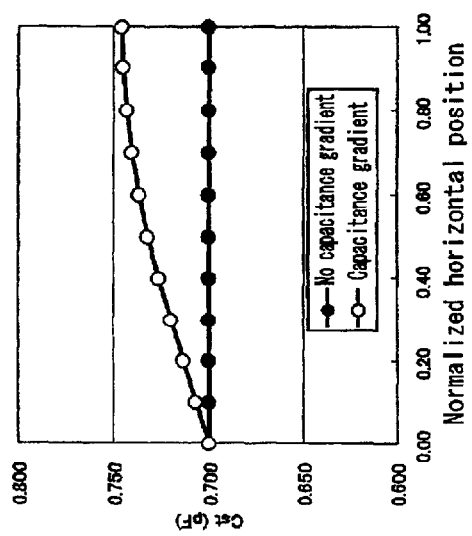
FIG. 33C is a view showing an optimum distribution of $C_{st}$ and $C_{gd}$ in a display region obtained by simulation.
Figure 33D:
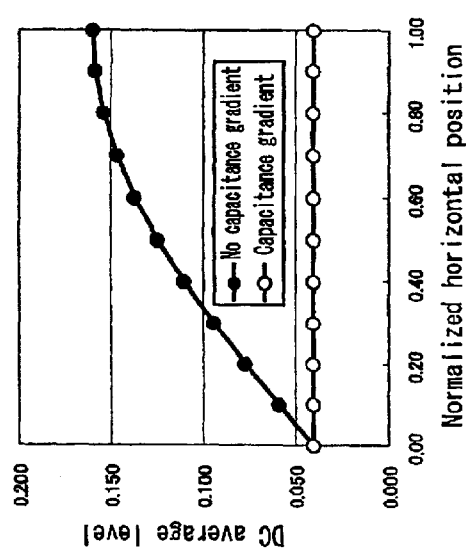
FIG. 33D is view showing an optimum distribution of $C_{st}$ and $C_{gd}$ in a display region obtained by simulation.

First, a curve marked with "no capacitance gradient" in each figure represents calculated results in the case where a distribution in a display region is not given to $C_{st}$, $C_{gd}$, or $C_{lc}$. Herein, $C_{st}=0.7$ pF, $C_{gd}=0.07$ pF, and $C_{lc}=0.75$ pF over the entire display region. FIG. 33A shows a state of distribution of $C_{st}$, and FIG. 33B shows a state of distribution of $C_{gd}$ ("normalized horizontal position" on the horizontal axis refers to a value obtained by normalizing a distance from the left end of a display region by a display region width, and the left end and the right end correspond to "0" and "1"). FIGS. 33C and 33D show the results for a DC average level and a liquid crystal application voltage effective value. A DC average level is larger in the portion away from the feeding ends (normalized horizontal position=1), compared with the portions close to the feeding ends (normalized horizontal position=0). A liquid crystal application voltage effective value is smaller in the portion way from the feeding ends (normalized horizontal position=1), compared with the portions close to the feeding ends (normalized horizontal position=0). These results are as shown by (Formula 20) and (Formula 21). Furthermore, the shapes in FIGS. 33C and 33D are similar to that in FIG. 24.

Next, the case where a DC average level and a liquid crystal application voltage effective value are uniform in a plane by giving an optimum distribution in a display region to $C_{st}$ and $C_{gd}$ (making $C_{lc}$ constant) will be shown as "capacitance gradient" in each figure. Herein, $C_{st}$ and $C_{gd}$ are selected so as to be matched with the values in the case of "no capacitance gradient) on the left end (normalized horizontal position=0). It is understood that if the value of $C_{st}$ is allowed to have a gradient of 0.7 pF (left end) to 0.745 pF (right end) as in FIG. 33A, and the value of $C_{gd}$ is allowed to have a gradient of 0.070 pF (eft end) to 0.082 pF (right end) as in FIG. 33B, a DC average level and a liquid crystal application voltage effective value become almost flat as in FIG. 33C or 33D (a distribution width is within 10 mV in any case).

If (Formula 25), (Formula 27), and the like are used at this time, $\beta(O)=0<\beta(E)=0.0048$, $\gamma(O)=-2.303$ V$>\gamma(E)=-2.363$ V are obtained, which shows that the conditions of (Formula 29) and (Formula 31) are satisfied. Furthermore, capacitance values in the middle (normalized horizontal position=0.5) between the portion close to the feeding ends and the portion away therefrom are read to be $C_{st}=0.732$ pF and $C_{gd}=0.0785$ pF, respectively, from FIGS. 33A and 33B. If $\beta(M)$ and $\gamma(M)$ described in (Principle 2 of the present invention: Optimum distribution of $\beta$ and $\gamma$) are determined from the above capacitance values, $\beta(M)=0.0034$ and $\gamma(M)=-2.345$ V are obtained, which shows that the condition of (Formula 34) also is satisfied.

(Embodiment 2)

In Embodiment 2 of the present invention, the configuration that reduces horizontal crosstalk and lowers a voltage of a video signal driving circuit IC will be described with reference to FIGS. 4 and 5.

Figure 4:
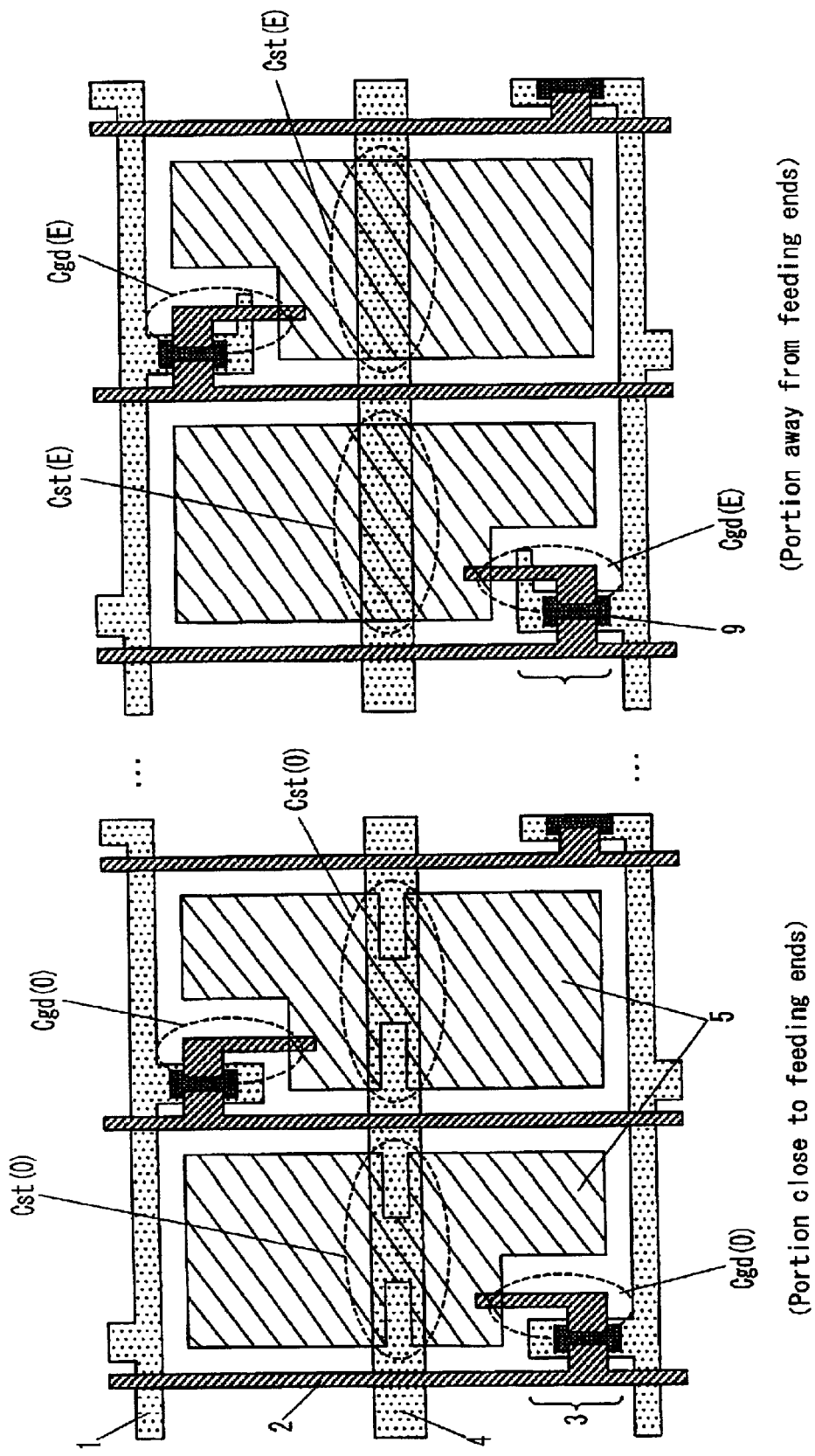
FIG. 4 shows plan views of a pixel layout of a display apparatus of a second embodiment according to the present invention.

FIG. 4 is a plan view showing a pixel layout of a display apparatus of the second embodiment according to the present invention. The configuration in FIG. 4 basically follows the pixel layout in FIG. 1. In FIG. 4, pixels are inverted in the vertical direction per column. In this layout, in order not to disturb the symmetry in the vertical direction, a common electrode 4 is disposed in the middle between two scanning electrodes 1. An insulating film 18 (not shown) is interposed between the pixel electrode and the common electrode to form a storage capacitor 7 ($C_{st}$).

Figure 5:
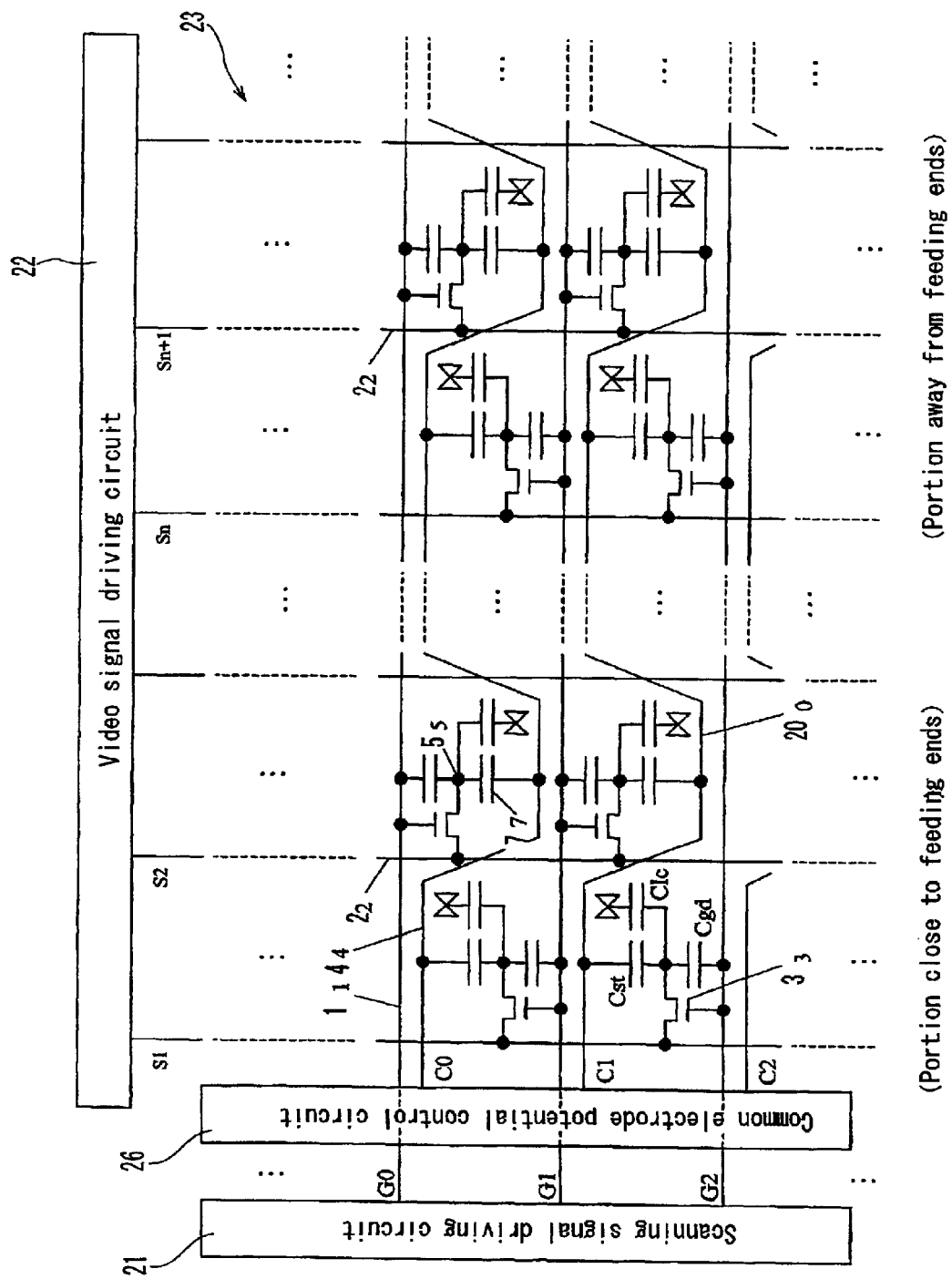
FIG. 5 is a circuit configuration diagram of the display apparatus of the second embodiment according to the present invention.

FIG. 5 is a circuit configuration diagram of a display apparatus of the second Embodiment according to the present invention. Basically, this also is the same as that in FIG. 3. However, pixels are inverted in the vertical direction per column, corresponding to the layout in FIG. 4. What is important here is that storage capacitance connected to (a plurality of) pixel electrodes of pixels belonging to one scanning electrode (e.g., $G_1$), (ON/OFF of which is controlled by the scanning electrode $G_1$), are connected to two common electrodes ($C_0$ and $C_1$) that are the other connection destinations. Furthermore, the circuit configuration of the second embodiment also is characterized in that pixels belonging to one scanning electrode (e.g., $G_1$) are present in different stages between the even-number column and the odd-numbered column (note: this is not necessarily a required configuration of the present invention).

When such a configuration is used, dot inversion driving and column inversion driving also can be adopted, as well as line inversion driving (in the first embodiment, only line inversion or field inversion is adopted). This will be described with reference to FIGS. 5, 6A, and 6B, exemplifying dot inversion.

FIGS. 6A and 6B are waveform diagrams of an odd-number frame and an even-number frame for illustrating a method for driving a display apparatus of the second embodiment according to the present invention by dot inversion driving. The case will be considered in which signals with different polarities are applied to video signal electrodes $S_1$ (and $S_3$, $S_5$, ..., $S_n$, ...) and $S_2$ (and $S_4$, $S_6$, ..., $S_{n+1}$, ...) in an odd-number frame as shown in FIG. 6A. Now, for example, in a horizontal scanning period (1H period) in which the scanning electrode $G_1$ is selected, a positive signal $V_{sig}(+)$ and a negative signal $V_{sig}(-)$ are applied to $S_1$ and $S_2$ in FIG. 5, respectively. At this time, in a column belonging to $S_1$ (more exactly, a column belonging to a video signal electrode including $S_1$ to which a positive video signal is applied), an upper pixel of $G_1$ (referred to as a "pixel P") is in an ON state, and in a column belonging to $S_2$ (more exactly, a column belonging to a video signal electrode including $S_2$ to which a negative video signal is applied), a lower pixel of $G_1$ (referred to as a "pixel Q") is in an ON state.

Herein, the common electrodes that are connection destinations of storage capacitance of the pixels P and Q are $C_0$ and $C_1$, respectively (these electrodes will be referred to as the first common electrode and the second common electrode, based on $G_1$). These electrodes are separate ones, so that they can be set at different potentials, i.e, $C_0$ (first common electrode) is set to be $V_c(+)$ (corresponding to the state where the pixel P is charged positively), and $C_1$ (second common electrode) is set to be $V_c(-)$ (corresponding to the state where the pixel P is charged negatively). When the pixel P or Q is seen alone, the relationship of potentials among a video signal electrode, a scanning electrode, and a common electrode is the same as that in FIG. 15, which shows that the effect of an increase in an amplitude of a pixel electrode potential as described in the Background Art with reference to FIGS. 14 and 15 can be obtained. Herein, the case has been described in which $G_1$ is selected. However, if the case where $G_0$ or $G_2$ is selected is considered similarly, it is understood that the potential waveform of each common electrode should be set as shown in FIG. 6A. This also applies to the even-numbered frame shown in FIG. 6B, in which only the polarities of signals of a video signal electrode and a common electrode are reversed.

The above description also applies to the case of column inversion. When considered in the same way as in FIGS. 6A and 6B, it is understood that by setting the potential waveform of a common electrode as shown in FIGS. 7A and 7B, the effect of an increase in an amplitude of a pixel electrode potential as described in the Background Art with reference to FIGS. 14 and 15 can be obtained.

As described above, in the present embodiment, dot inversion or column inversion driving, which is a driving method advantageous with respect to horizontal crosstalk, is adopted, and the effect of an increase in an amplitude of a pixel electrode retention potential can be obtained. Thus, the reduction in horizontal crosstalk and the decrease in a voltage of a video signal driving circuit IC can be achieved. More specifically, the second object among the previously described two objects can be achieved.

It should be noted that the above-mentioned effect (reduction in horizontal crosstalk and decrease in a voltage of a video signal driving circuit IC) can be obtained irrespective of the provision of a distribution of $\alpha_{st}$ and $\alpha_{gd}$ in a screen as described in (Description 1 of the principle of the present invention: Principle of a reduction in a brightness gradient/flickering).

(Embodiment 3)

According to the above-mentioned second embodiment, the effect of an increase in an amplitude of a pixel electrode retention potential as described in JP 5(1993)-143021 can be obtained with dot inversion driving or column inversion driving in the configurations of FIGS. 4 and 5. If this is allowed to proceed further, it is apparent that what is described in (Description 1 of the principle of the present invention: Principle of a reduction in a brightness gradient/flickering), (Principle 2 of the present invention: Optimum distribution of β and γ), (Supplementary item 1 regarding the principle: $V_{cp}$ and $\Delta V_{cc}$), (Supplementary item 2 regarding the principle: method for supplying a power of scanning electrodes and common electrodes), and (Supplementary item 3 regarding the principle: Another circuit configuration) is adopted as it is, and predetermined effects such as a reduction in flickering, a decrease in a brightness gradient, and the like can be obtained.

Actually, the layout in FIG. 4 shows the case where $C_{st}(O)<C_{st}(E)$ and $C_{gd}(O)<C_{gd}(E)$.

As a postscript, it is desirable that the video signal driving circuit be designed for dot inversion or column inversion. More specifically, it is desirable that two kinds of video signals with different polarities can be applied simultaneously to a plurality of video signal electrodes, and for each video signal electrode, two kinds of video signals with different polarities can be applied in accordance with a display period (depending upon whether a frame is an odd-number frame or an even-number frame).

Furthermore, regarding common electrodes, based on a certain scanning electrode, the number of common electrodes that are the other connection destinations of storage capacitance connected to pixel electrodes belonging to the scanning electrode is two (first and second common electrodes in the above description). The number of common electrodes to be connected is not necessarily two, and it may be three or more. However, if there are provided two common electrodes in accordance with the polarity of a video signal, driving can be conducted most effectively at timings in FIGS. 6A and 6B, or FIGS. 7A and 7B, which is desirable.

In FIG. 4, pixels in an even-number column and pixels in an odd-number column are completely symmetrical. However, considering the influence of a shift of mask alignment and asymmetry regarding a scanning direction, capacitance values ($C_{gd}$, $C_{st}$, and the like) of these pixels may be made different between the even-number column and the odd-number column.

In the case where signals with two polarities are applied simultaneously to a plurality of scanning electrodes, signals with opposite polarities are applied alternately on the column basis (more specifically, alternately between an even-number column and an odd-number column) in dot inversion and column inversion. However, this is not necessarily required. For example, each polarity may be arranged at every other columns or at random.

In FIGS. 4 and 5, pixels corresponding to two polarities are inverted in the vertical direction. However, the present invention is not limited thereto. More specifically, there may be a method for changing only the connection destinations (common electrodes) of storage capacitance in accordance with the polarity of a video signal electrode in the configuration shown in FIG. 1 or 3. In this case, in addition to the problem of asymmetry of the configuration, wiring for connecting storage capacitance crosses other scanning electrodes in a layout, which generates an excess capacitance, leading to crosstalk. Thus, this is not desirable.

(Embodiment 4)

In the fourth embodiment of the present invention, a display apparatus using liquid crystal in an In Plane Switching (IPS) mode will be described with reference to FIGS. 9 and 10.

Figure 9:
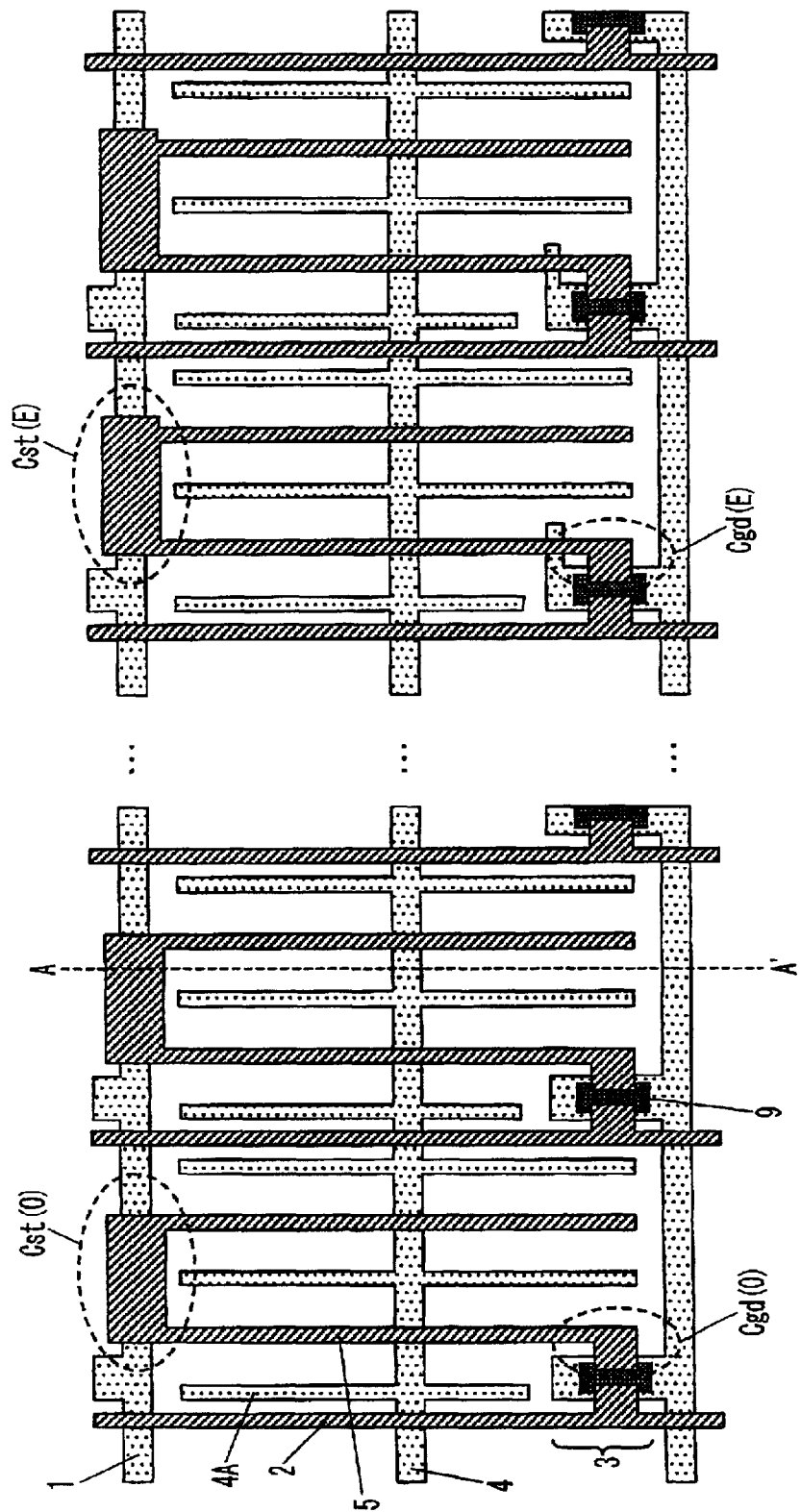
FIG. 9 shows plan views of a pixel layout of the display apparatus of the fourth embodiment according to the present invention.

FIG. 9 is a plan view showing a pixel layout of a display apparatus of the fourth embodiment according to the present invention. FIG. 10 is a cross-sectional view taken along a line A–A' in FIG. 1.

Figure 10:
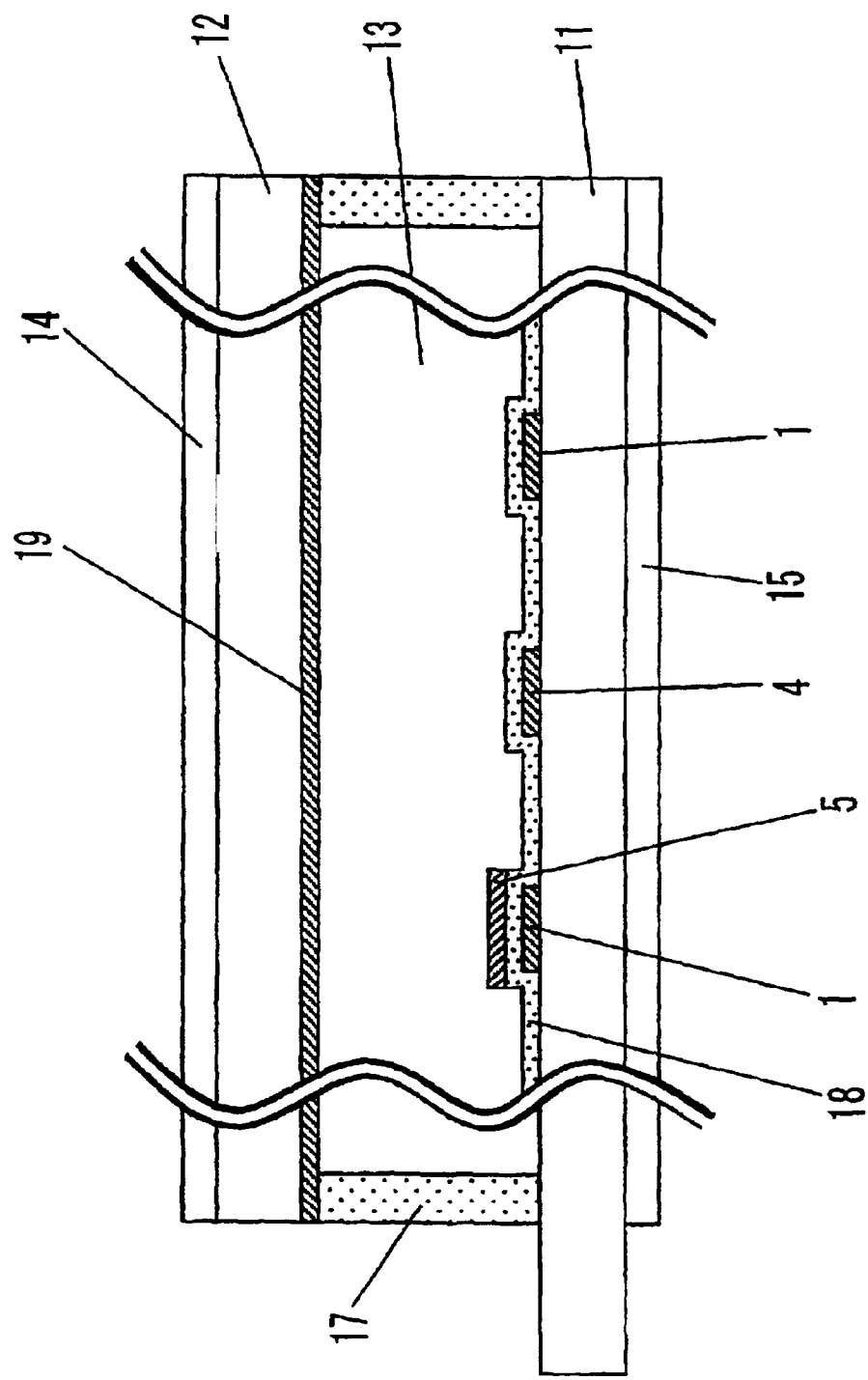
FIG. 10 is a cross-sectional view taken along a line A–A' in FIG. 9.

In FIGS. 9 and 10, reference numerals 11 and 12 denote substrates made of glass or the like. Reference numeral 11 denotes an array substrate on which thin film transistors and electrodes connected thereto are formed, and reference numeral 12 denotes a counter substrate opposing the array substrate. Liquid crystal 13 is interposed between two substrates, and both ends thereof are sealed with a seal 17. Reference numerals 14 and 15 denote polarizing plates for conducting a polarization display, and 19 denotes a color filter for conducting a color display. Although the color filter is formed on the counter substrate 12 side, it may be formed on the array substrate 11 side.

On the array substrate 11, scanning electrodes 1 and common electrodes 4 are formed of a first conductive layer, and an insulating film 18 covers these electrodes. A pixel electrode 5 is formed of a second conductive layer on the insulating film 18. As shown in FIG. 10, the pixel electrode 5 overlaps the scanning electrode 1 of the previous stage. The overlapping portion with the scanning electrode 1 constitutes a storage capacitor 7 ($C_{st}$). Furthermore, the overlapping portion of the pixel electrode 5 and the scanning electrode 1 of the stage concerned constitutes a scanning electrode-pixel electrode capacitance $C_{gd}$.

As shown in FIG. 9, the common electrode 4 is provided with a branched portion 4A. The branched portion 4A opposes the pixel electrode 5 in parallel, and works as a counter electrode for applying an electric field to a liquid crystal layer. The capacitance between the pixel electrode 5 and the common electrode 4 constitutes a common electrode-pixel electrode capacitance $C_{lc}$. The capacitance between the pixel electrode 5 and the common electrode 4 includes both a capacitance via the liquid crystal layer and a capacitance formed by both electrodes that overlap each other geometrically. Although it is difficult to calculate the capacitance via the liquid crystal layer by using a mathematical formula or the like, it may be obtained by actual measurement or simulation.

The thin film transistor 3 is composed of a semiconductor portion 9 and three electrodes. Gate electrodes are connected to the scanning electrodes 1, source electrodes are connected to video signal electrodes 2, and drain electrodes are connected to pixel electrodes 5.

Figure 8:
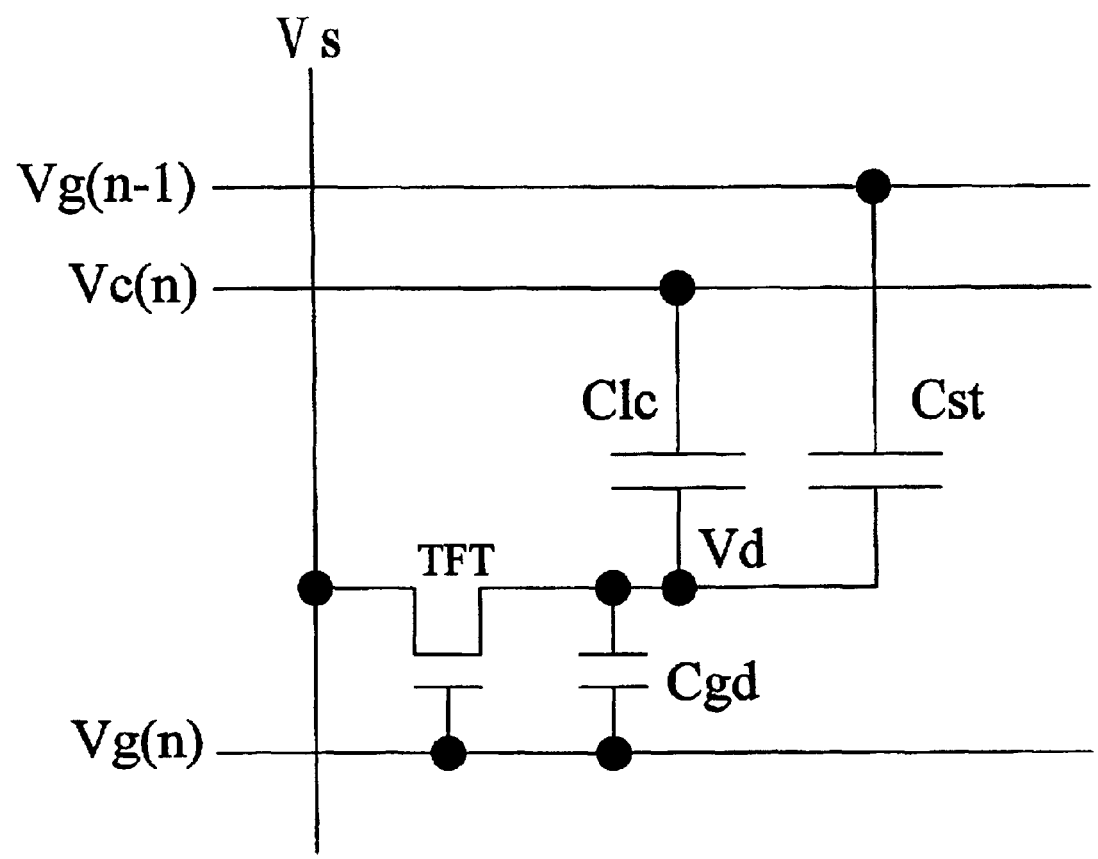
FIG. 8 is a circuit diagram of one pixel of a display apparatus of a fourth embodiment according to the present invention.
Figure 11:
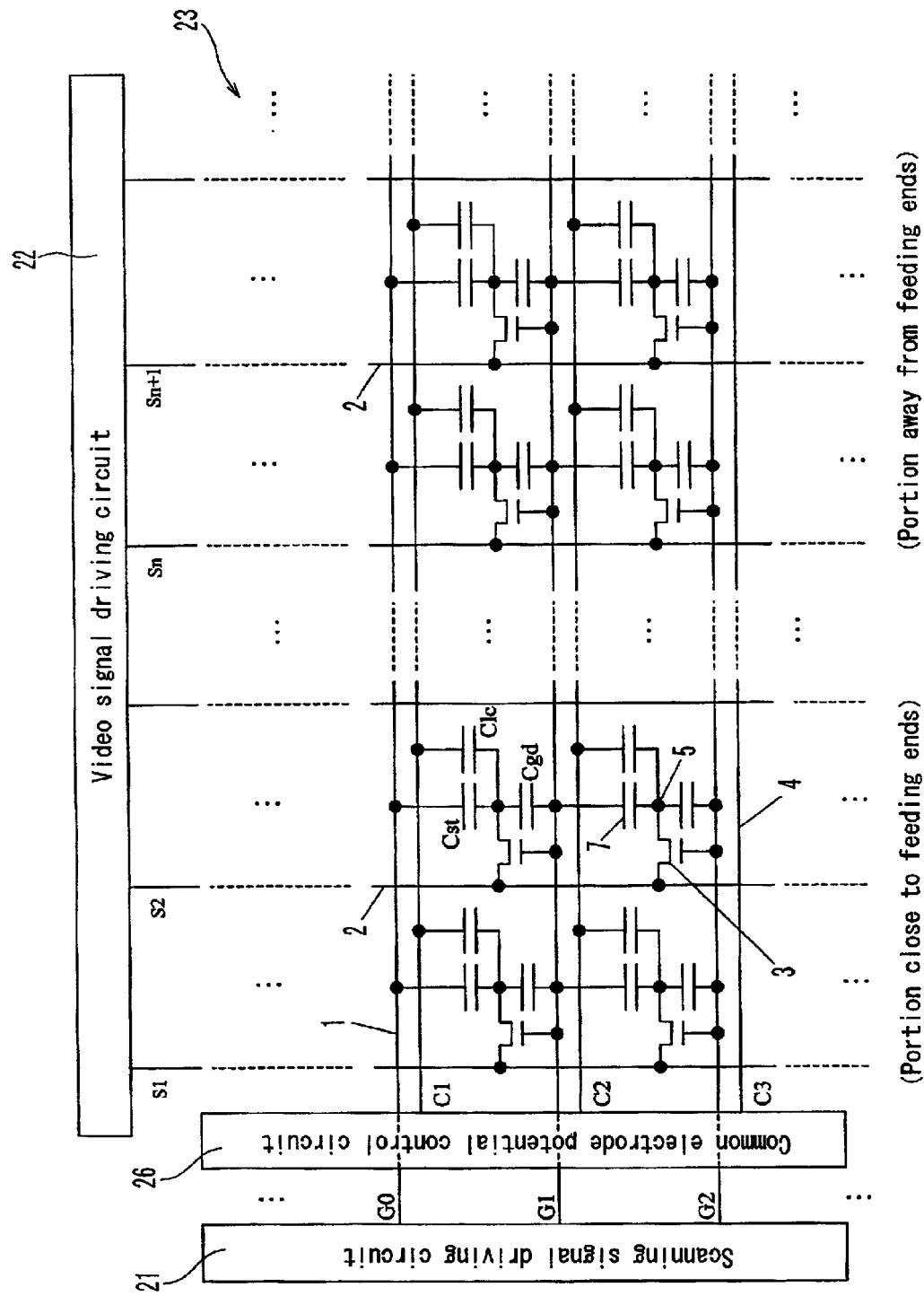
FIG. 11 is a circuit configuration diagram of the display apparatus of the fourth embodiment according to the present invention.

FIG. 11 shows a circuit configuration of a display apparatus of the present embodiment using liquid crystal in an IPS mode. In FIG. 11, a unit pixel configuration shown in FIG. 8 are arranged in an array. The scanning electrodes 1 are supplied with power from a scanning signal driving circuit 21, and the video signal electrodes 2 are supplied with power from a video signal driving circuit 22.

Now, the case will be considered where, in the circuit configuration of FIG. 11, driving is conducted with a waveform as shown in FIG. 15 in the same way as in the case of the circuit configuration (FIG. 13) in the first embodiment. When FIG. 3 (one pixel is shown in FIG. 14) is compared with FIG. 11 (one pixel is shown in FIG. 8), the capacitance between the common electrode ($V_c(n)$) and the pixel electrode ($V_d$) is $C_{st}$ in the former case, whereas the capacitance between the common electrode ($V_c(n)$) and the pixel electrode ($V_d$) is $C_{lc}$ in the latter case. Therefore, a formula corresponding to the conservation of charge (Formula 11) in the case of FIG. 3 is given by the following (Formula 39):

$$C_{gd}(V_{sig}(-) - V_{gon}) + \quad \text{(Formula 39)}$$
$$C_{lc}(V_{sig}(-) - V_c(-)) + C_{st}(V_{sig}(-) - V_{goff}) =$$
$$C_{gd}(V_{do}(-) - V_{goff}) + C_{lc}(V_{do}(-) - V_{coff}) +$$
$$C_{st}(V_{do}(-) - V_{goff})C_{gd}(V_{sig}(+) - V_{gon}) +$$
$$C_{lc}(V_{sig}(+) - V_c(+)) + C_{st}(V_{sig}(+) - V_{goff}) =$$
$$C_{gd}(V_{do}(+) - V_{goff}) + C_{lc}(V_{do}(+) - V_{coff}) +$$
$$C_{st}(V_{do}(+) - V_{goff})$$

Herein, the following is taken into consideration: when a scanning electrode ($V_g(n)$) is selected, a scanning electrode ($V_g(n-1)$) of the previous stage has been selected, and the potential has become $V_{goff}$. When (Formula 39) is modified, (Formula 40) is obtained.

$$V_{do}(-) = V_{sig}(-) - \alpha_{lc}\Delta V_c(-) - \alpha_{gd}\Delta V_{gon} \quad \text{(Formula 40)}$$
$$V_{do}(+) = V_{sig}(+) - \alpha_{lc}\Delta V_c(+) - \alpha_{gd}\Delta V_{gon}$$

where $\Delta V_{gon}$, $\Delta V_c(+)$, and $\Delta V_c(-)$ are the same as those in (Formula 13), and $\alpha_{gd}$ and $\alpha_{lc}$ are represented by (Formula 41):

$$\alpha_{gd} = C_{gd}/C_{tot}$$
$$\alpha_{lc} = C_{lc}/C_{tot}$$
$$\alpha C_{tot} = C_{gd} + C_{lc} + C_{st} \quad \text{(Formula 41)}$$

When the above-mentioned results are compared with the case ((Formula 12) to (Formula 14)) of the circuit configuration in FIG. 3, the only difference lies in that suffixes "st" and "lc" are opposite. This shows that what is described in the Background Art, (Analysis of the problems of the prior art), (Description 1 of the principle of the present invention: Principle of a reduction in a brightness gradient/flickering), (Principle 2 of the present invention: Optimum distribution of β and γ), (Supplementary item 1 regarding the principle: $V_{cp}$ p and $\Delta V_{cc}$), (Supplementary item 2 regarding the principle: method for supplying a power of scanning electrodes and common electrodes), and (Supplementary item 3 regarding the principle: Another circuit configuration) is applicable as it is to the case (FIG. 11) of the present configuration, if $C_{st}$ (storage capacitance)→$C_{lc}$, $C_{lc}$→$C_{st}$, and $\alpha_{st}$→$\alpha_{lc}$. More specifically, it is apparent that predetermined effects such as a reduction in flickering and a brightness gradient, and the like are obtained in the same way as in the circuit in FIG. 3.

It is understood that, in FIG. 11 (and FIG. 8), a scanning electrode of the previous stage corresponds to the counter electrode ($V_f$) in FIG. 3 (and FIG. 14), if it is considered that $C_{st}$ is replaced by $C_{lc}$. The scanning electrode of the previous stage has a potential $V_{goff}$ in a non-selection state, when the scanning electrode of the stage concerned is selected. Therefore, it is possible to consider that the scanning electrode of the previous stage is the same as the counter electrode in FIG. 3. In other words, any electrode having the same potential both during a selection period of the scanning electrode of the stage concerned and during a retention period can be used as a connection destination of $C_{st}$. Such an electrode may be any electrode excluding a common electrode opposing a pixel electrode via a display medium (liquid crystal: capacitance $C_{lc}$) and a scanning electrode of the stage concerned. Among them, a scanning electrode (which may be of the subsequent stage) excluding the scanning electrode of the stage concerned, or a common electrode other than those opposing via $C_{lc}$ is particularly desirable.

(Embodiment 5)

Figure 12:
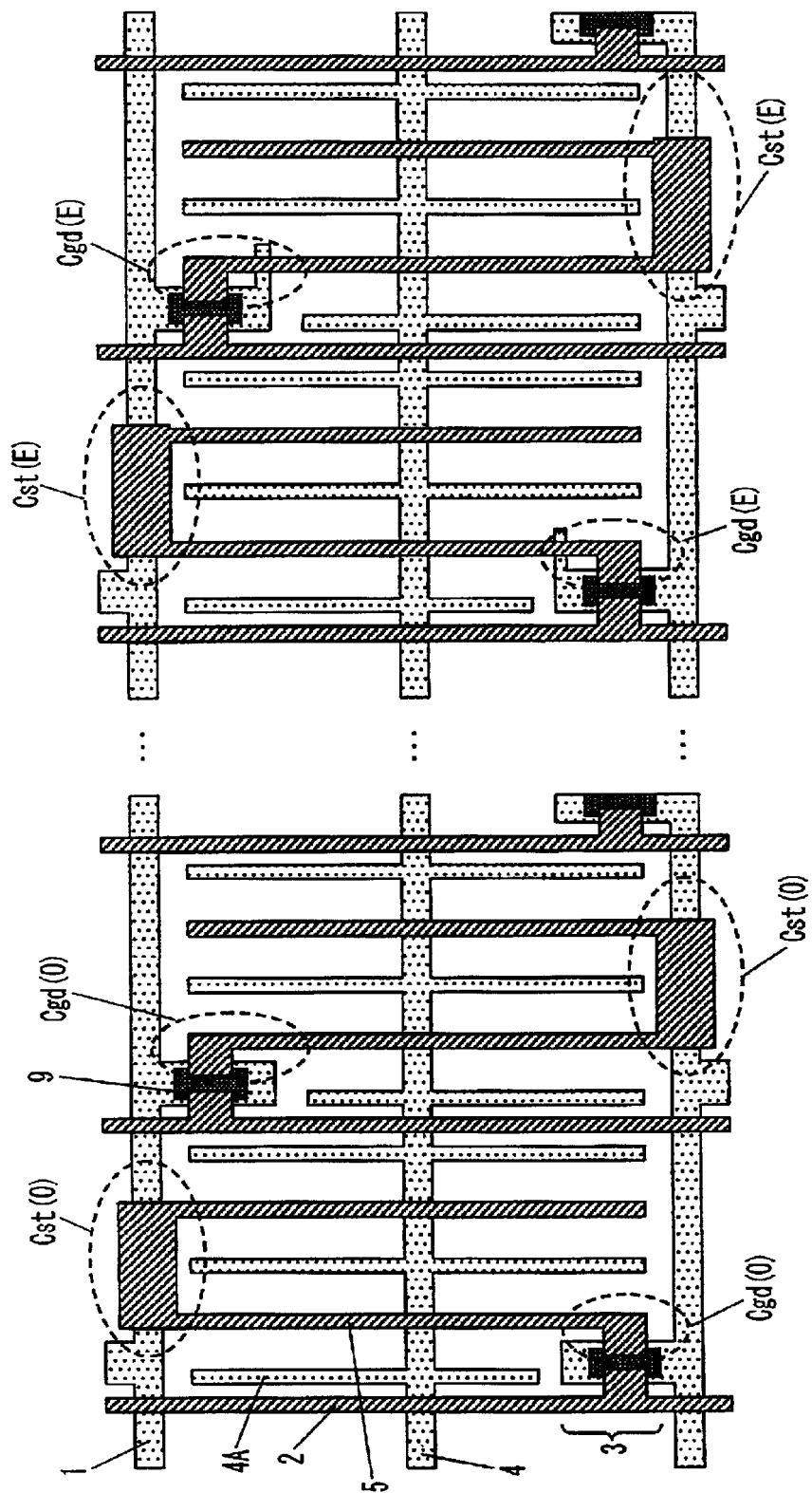
FIG. 12 shows plan views of a pixel layout of a display apparatus of a fifth embodiment according to the present invention.

FIG. 12 is a plan view showing a pixel layout of a display apparatus of the fifth embodiment according to the present invention. In this pixel layout, regarding liquid crystal in an IPS mode as in the fourth embodiment, a layout is inverted in the vertical direction on the column basis, in the same way as in the second embodiment in which a reduction in horizontal crosstalk and a decrease in a voltage of a video signal driving circuit IC are realized.

Figure 13:
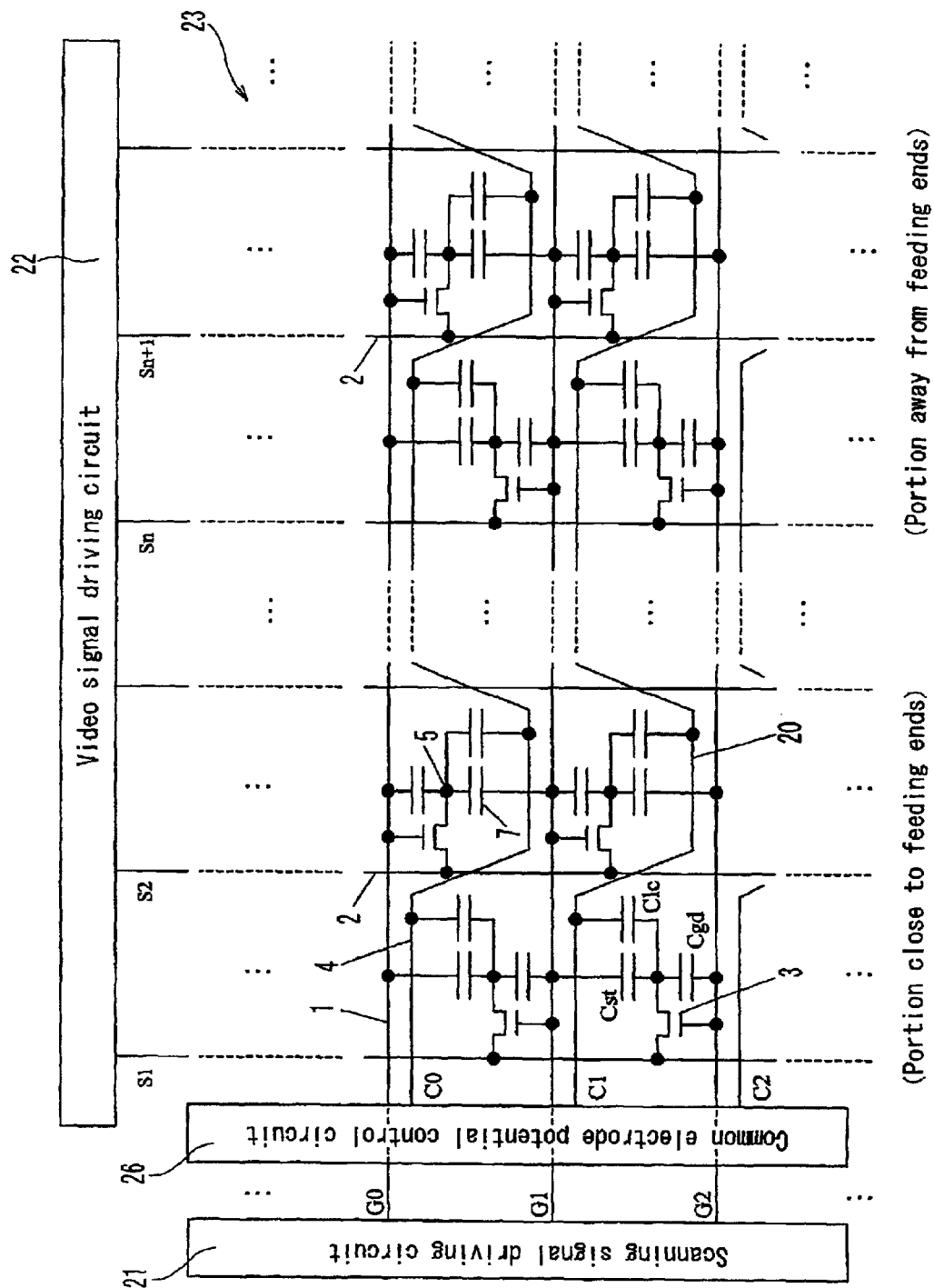
FIG. 13 is a circuit configuration diagram of the display apparatus of the fifth embodiment according to the present invention.

FIG. 13 is a circuit configuration diagram of the display apparatus of the fifth embodiment according to the present invention. This corresponds to the case where TN liquid crystal is used (i.e., FIG. 5 showing the circuit configuration of the second embodiment).

When these are compared, it also can be considered that only suffixes "st" and "lc" are replaced. Thus, as described in the second embodiment, the effect of realizing dot inversion driving or column inversion driving, and a decrease in a voltage of a video signal can be obtained.

(Embodiment 6)

In the above-mentioned fifth embodiment, the effect of an increase in amplitude of a pixel electrode retention potential is obtained as described in JP 5(1993)-143021 with dot inversion driving or column inversion driving in the IPS-type configuration. If this is allowed to proceed further, it is apparent that what is described in (Description 1 of the principle of the present invention: Principle of a reduction in a brightness gradient/flickering), (Principle 2 of the present invention: Optimum distribution of β and γ), (Supplementary item 1 regarding the principle: $V_{cp}$ and $\Delta V_{cc}$), (Supplementary item 2 regarding the principle: method for supplying a power of scanning electrodes and common electrodes), and (Supplementary item 3 regarding the principle: Another circuit configuration) is adopted as it is, and predetermined effects such as a reduction in flickering, a decrease in a brightness gradient, and the like can be obtained (herein, it may be considered that $C_{st}$ (storage capacitance)→$C_{lc}$, $C_{lc}$→$C_{st}$, $\alpha_{st}$→$\alpha_{lc}$). Furthermore, if the similar replacement is conducted with respect to the postscript in the third embodiment, the entire configuration of the sixth embodiment is established.

Hereinafter, other embodiments of the present invention will be described.

(Exemplary Configuration in the Case where a Common Electrode Potential is Not Controlled)

The case will be considered where a common electrode potential is not controlled, and a constant potential always is supplied. In this case, a common electrode potential control circuit is not required. This corresponds to the case where $V_c(+) = V_c(-) = V_{coff}$ in the present invention. According to (Formula 19), $\Delta V_{cc} = 0$ and $V_{cp} = 0$. In this case, $\gamma(O) = \gamma(E) = 0$ from (Formula 25). Therefore, (Formula 29) is not satisfied, and the effect of enhancement of a brightness gradient cannot be obtained. However, since $\beta(O)=\alpha_{gd}(O)$, $\beta(E)=\alpha_{gd}(E)$ from (Formula 27), it is possible to suppress flickering so as to satisfy (Formula 31) i.e., $\alpha_{gd}(O)<\alpha_{gd}(E)$.

In particular, the case will be considered where scanning electrodes are supplied with a power from one side, and the potential of common electrodes is fixed on both sides (more specifically, a constant voltage is supplied). In this case, a recharge voltage is generated as shown in FIG. 26C. In this manner, a recharge voltage is not increased with distance from feeding ends of scanning electrodes, but there is a tendency that a recharge voltage has a local maximum value at a certain position, and decreases thereafter. Thus, it is desirable that the correction of $\alpha_{gd}$ should follow this. More specifically, for example, in the case where $\alpha_{gd}$ in a portion farthest from the feeding ends of scanning electrodes is assumed to be $\alpha_{gd}(F)$, it is desirable that there is a position having a value of $\alpha_{gd}$ larger than $\alpha_{gd}(F)$ between the portion furthest from the feeding ends of the scanning electrodes and the portion close thereto. This also applies to the case where scanning electrodes are supplied with a power from one side, and the potential of the common electrodes is fixed only on the opposite side, as in FIG. 26E.

(Exemplary Driving Method with Another Driving Waveform)

Exemplary voltage waveforms in the driving method of the present invention are shown in FIGS. 6A and 6B, FIGS. 7A and 7B, or FIG. 15. In addition to these, for example, it also is possible to use driving waveforms as in FIGS. 28A, 28B, 29A, and 29B.

FIGS. 28A and 28B show driving waveforms in the case of driving the circuit with the configuration shown in FIG. 3 or 11. In FIG. 15, a common electrode potential during a retention period is only one value, i.e., $V_{coff}$; however, in the driving waveforms in FIGS. 28A and 28B, a common electrode potential during a retention period is not necessarily one kind, and has two kinds of values, i.e., $V_c(+)$ and $V_c(-)$.

Now, the case of the circuit configuration in FIG. 3 is considered. For example, when a scanning electrode $G_1$ is selected, and pixel electrodes are charged with a negative signal (in the case of an odd-number frame in FIG. 28A), the potential of a common electrode $C_{lc}$ connected via storage capacitance is $V_c(-)$; however, the potential becomes $V_c(+)$ during the subsequent retention period. Furthermore, when a scanning electrode $G_1$ is selected, and a pixel electrode is charged with a positive signal (in the case of an even-number frame in FIG. 28B), the potential of a common electrode $C_1$ is $V_c(+)$; however, it becomes $V_c(-)$ during the subsequent retention period. This also applies to other scanning electrodes, for example, $G_0$ and $G_2$.

In this case, when conservation of charge is considered in the same way as described with respect to (Formula 11) in the Background Art, (Formula 42) is obtained.

$$C_{gd}(V_{sig}(-) - V_{gon}) + \qquad \text{(Formula 42)}$$
$$C_{st}(V_{sig}(-) - V_c(-)) + C_{lc}(V_{sig}(-) - V_f) =$$
$$C_{gd}(V_{do}(-) - V_{goff}) + C_{st}(V_{do}(-) - V_c(+)) +$$
$$C_{lc}(V_{do}(-) - V_f)C_{gd}(V_{sig}(+) - V_{gon}) +$$
$$C_{st}(V_{sig}(+) - V_c(+)) + C_{lc}(V_{sig}(+) - V_f) =$$
$$C_{gd}(V_{do}(+) - V_{goff}) + C_{st}(V_{do}(+) - V_c(-)) +$$
$$C_{lc}(V_{do}(+) - V_f)$$

This is the formula obtained by changing $V_{coff}$ of the second term (the term including $C_{st}$) of the right side to $V_c(-)$ or $V_c(+)$ in the second formula of (Formula 11). If the following (Formula 43) is used in place of (Formula 13), (Formula 12) holds as it is.

$$\Delta V_{gon} = V_{gon} - V_{goff}$$
$$\Delta V_c(+) = V_c(+) - V_c(-)$$
$$\Delta V_c(-) = V_c(-) - V_c(+) \qquad \text{(Formula 43)}$$

More specifically, if $\Delta V_c(+)$ and $\Delta V_c(-)$ are read as in (Formula 43), the following discussion (the principles and the like described in (Analysis of the problems of the prior art), (Description 1 of the principle of the present invention: Principle of a reduction in a brightness gradient/flickering), (Principle 2 of the present invention: Optimum distribution of β and γ), (Supplementary item 1 regarding the principle: $V_{cp}$ and $\Delta V_{cc}$), (Supplementary item 2 regarding the principle: method for supplying a power of scanning electrodes and common electrodes), (Supplementary item 3 regarding the principle: Another circuit configuration), and the like) are all applicable.

The formula type of (Formula 43) is different from that of (Formula 13). However, $\Delta V_c(+)$ or $\Delta V_c(-)$ also is a value of a potential (in this case, $V_c(+)$ or $V_c(-)$) of a common electrode to which storage capacitance is connected, at a moment when a pixel is charged, based on a potential (in this case, $V_{coff}$) in a retention state.

Even in the case using FIG. 11, the above description applies similarly if $C_{st}$ (storage capacitance)→$C_{lc}$, $C_{lc}$→$C_{st}$, $\alpha_{st}$→$\alpha_{lc}$.

FIGS. 29A and 29B show driving waveforms in the case of driving a circuit with the configuration in FIG. 5 or 13. These driving waveforms are to be compared with those in FIGS. 6A and 6B. Also in this case, a common electrode potential during a retention period is not necessarily one kind, and has two kinds of values, i.e., $V_c(+)$ and $V_c(-)$.

Now, it is assumed that, in the circuit configuration in FIG. 5, for example, a scanning electrode $G_1$ is selected, and pixel electrodes belonging to a video signal electrode $S_1$ are charged with a positive signal, and pixel electrodes belonging to a video signal electrode $S_2$ are charged with a negative signal (the case of an odd-number frame in FIG. 29A). In this case, the potentials of common electrodes $C_0$ and $C_1$ connected via storage capacitance are $V_c(+)$ and $V_c(-)$, respectively; however, they are $V_c(-)$ and $V_c(+)$, respectively, during a retention period. In contrast, when a scanning electrode $G_1$ is selected, and pixel electrodes belonging to a video signal electrode $S_1$ are charged with a negative signal, and pixel electrodes belonging to a video signal electrode $S_2$ are charged with a positive signal (the case of an even-number frame in FIG. 29B), the potentials of common electrodes $C_0$ and $C_1$ are $V_c(-)$ and $V_c(+)$, respectively; however, they are $V_c(+)$ and $V_c(-)$, respectively, during a retention period. This also applies to other scanning electrodes, for example, $G_0$ and $G_2$.

More specifically, regarding any pixel electrode, when it is charged with a positive signal, the potential of a common electrode that is a connection destination of storage capacitance always is $V_c(+)$ and becomes $V_c(-)$ during a retention period. When a pixel electrode is charged with a negative signal, the potential of a common electrode of a connection destination of storage capacitance always is $V_c(-)$ and becomes $V_c(+)$ during a retention period. Therefore, the same conservation of storage as that of (Formula 42) holds, and by only reading $\Delta V_c(+)$ and $\Delta V_c(-)$ as in (Formula 43), what is described in (Analysis of the problems of the prior art), (Description 1 of the principle of the present invention:

Principle of a reduction in a brightness gradient/flickering), (Principle 2 of the present invention: Optimum distribution of β and γ), (Supplementary item 1 regarding the principle: $V_{cp}$ and $\Delta V_{cc}$), (Supplementary item 2 regarding the principle: method for supplying a power of scanning electrodes and common electrodes), (Supplementary item 3 regarding the principle: Another circuit configuration), and the like is all applicable.

In the case of using the driving method in FIGS. 6A and 6B, FIGS. 7A and 7B, or FIG. 15, three potential levels are required in a common electrode potential control circuit. However, in the case of the present embodiment, only two potential levels are required. Thus, compared with the driving method in FIGS. 6A and 6B, FIGS. 7A and 7B, or FIG. 15, the configuration of the common electrode potential control circuit can be simplified, and cost can be reduced.

(Case Where a Switching Element is Formed of a P-channel TFT)

Hitherto, an n-channel thin film transistor (which is turned on when a gate potential is larger than a threshold voltage, and turned off when a gate potential is smaller than a threshold voltage) has been assumed as a switching element. However, the above description also applies to the case of a switching element of a p-channel TFT (which is turned off when a gate potential is larger than a threshold voltage, and turned on when a gate potential is smaller than a threshold voltage). What is described in (Analysis of the problems of the prior art), (Description 1 of the principle of the present invention: Principle of a reduction in a brightness gradient/flickering), (Principle 2 of the present invention: Optimum distribution of β and γ), (Supplementary item 1 regarding the principle: $V_{cp}$ and $\Delta V_{cc}$), (Supplementary item 2 regarding the principle: method for supplying a power of scanning electrodes and common electrodes), (Supplementary item 3 regarding the principle: Another circuit configuration), and the like is all applicable. This is because the relationship formula of conservation of charge of (basic Formula 11) (or (Formula 42)) holds irrespective of whether a switching element is of an n-channel type or a p-channel type.

However, it should be noted that, in the case of a p-channel thin film transistor, the relationship in magnitude between $V_{gon}$ and $V_{goff}$ generally is inverted, compared with the case of an n-channel thin film transistor. FIG. 30 shows a relationship in magnitude of a recharge voltage corresponding to FIG. 18. Therefore, a relationship in magnitude of a recharge voltage corresponding to (Formula 16) is represented by (Formula 44):

$$|\Delta V_b(O, +)| < |\Delta V_b(E, +)|$$

$$|\Delta V_b(O, -)| < |\Delta V_b(E, -)|$$

$$|\Delta V_b(O, +)| - |\Delta V_b(O, -)|$$

$$< |\Delta V_b(E, +)| - |\Delta V_b(E, -)| \qquad \text{(Formula 44)}$$

In the case of a p-channel thin film transistor, a feedthrough voltage becomes positive, and a recharge voltage becomes negative. Therefore, in the above-mentioned formula, absolute value marks are provided. If the absolute value marks are removed, (Formula 45) is obtained.

$$\Delta V_b(O, +) > \Delta V_b(E, +)$$

$$\Delta V_b(O, -) > \Delta V_b(E, -)$$

$$\Delta V_b(O, +) - \Delta V_b(O, -)$$

$$> \Delta V_b(E, +) - \Delta V_b(E, -) \qquad \text{(Formula 45)}$$

When (Formula 45) is compared with (Formula 16), the third formulae are the same, whereas the direction of inequality signs is opposite in the first and second formulae. Then, (Formula 21) holds as it is, whereas the direction of an inequality sign becomes opposite in (Formula 20).

The conditions for eliminating a brightness gradient and flickering in this case will be considered. First, as the condition for eliminating a brightness gradient, the same relationship as that of (Formula 29) is obtained from (Formula 28) and the third formula of (Formula 45). Furthermore, as the condition for eliminating flickering, the right side of (Formula 30) becomes negative from the first and second formulae of (Formula 45). However, $\Delta V_{gon}$ also is negative, and the same relationship as that of (Formula 31) can be obtained. More specifically, the condition for eliminating a brightness gradient and the condition for eliminating flickering are represented by the same formula, irrespective of whether a thin film transistor is an n-channel type or a p-channel type, and the configuration of the present invention is all applicable.

(Case of the Configuration in which a Plurality of Lines are Scanned Simultaneously)

When liquid crystal is driven, one pixel may be charged twice or more in one frame (display period). For example, the following may be conducted: a video signal for conducting a black display is written after a video signal is written in one frame, whereby blurring with respect to animation is improved (generally, after 50 to 99% of a time in one frame has passed after a video signal is written, a video signal for conducting a black display often may be written). Alternatively, particularly in the case where OCB (optically compensated bend)-mode liquid crystal (which also may be called bend nematic LCD) is used, a video signal for conducting a black display may be written for the purpose of preventing reverse transition. Alternatively, a video signal may be written for the purpose of conducting preliminary charging 1H to 2H (1H is a horizontal period) before charging of a pixel is conducted.

In these cases, a video signal may be written to a plurality of lines simultaneously (more specifically, the potential of scanning electrodes in a plurality of lines is made $V_{gon}$ simultaneously). For example, this corresponds to the case where a black signal is written to a plurality of lines simultaneously when a black display is conducted. Alternatively, preliminary charging may be conducted simultaneously with main charging of the other pixels.

Even in the above-mentioned cases, if the potential of a common electrode to which each scanning electrode, which is to be $V_{gon}$ simultaneously, is connected via storage capacitance (for example, in FIG. 3, $C_1$ with respect to $G_1$, and $C_2$ with respect to $G_2$) is varied in accordance with the polarity of a video signal to be written, the effect of an increase in a signal amplitude can be obtained with respect to each writing (charging). Thus, driving without inconsistency can be conducted.

(Supplemental Remarks with Respect to Cost of a Driving Circuit)

In the case of the present invention, since it is required to provide a scanning signal driving circuit and a common electrode potential control circuit (in the case of a general driving method in which the potential of a common electrode is kept constant, a common electrode potential control circuit is not required), there may be apprehension that cost is increased. However, if these driving circuits and pixel switching elements are designed on the same layout in the stage of mask layout design, extra processes do not result in the course of actual production, so that cost is not increased. In order to produce a scanning electrode driving circuit and a common electrode potential control circuit in the same substrate together with switching elements, it is desirable to use polycrystalline Si, single crystal Si, or SOI (silicon-on-insulator) type thin film transistor (or MOSFET). The reason for this is as follows. In the case of using these semiconductor substrates, either a p-channel thin film transistor or an n-channel thin film transistor can be produced, so that a degree of freedom for design of a driving circuit is enhanced.

(Case of a Current Driving Element)

Figure 31:
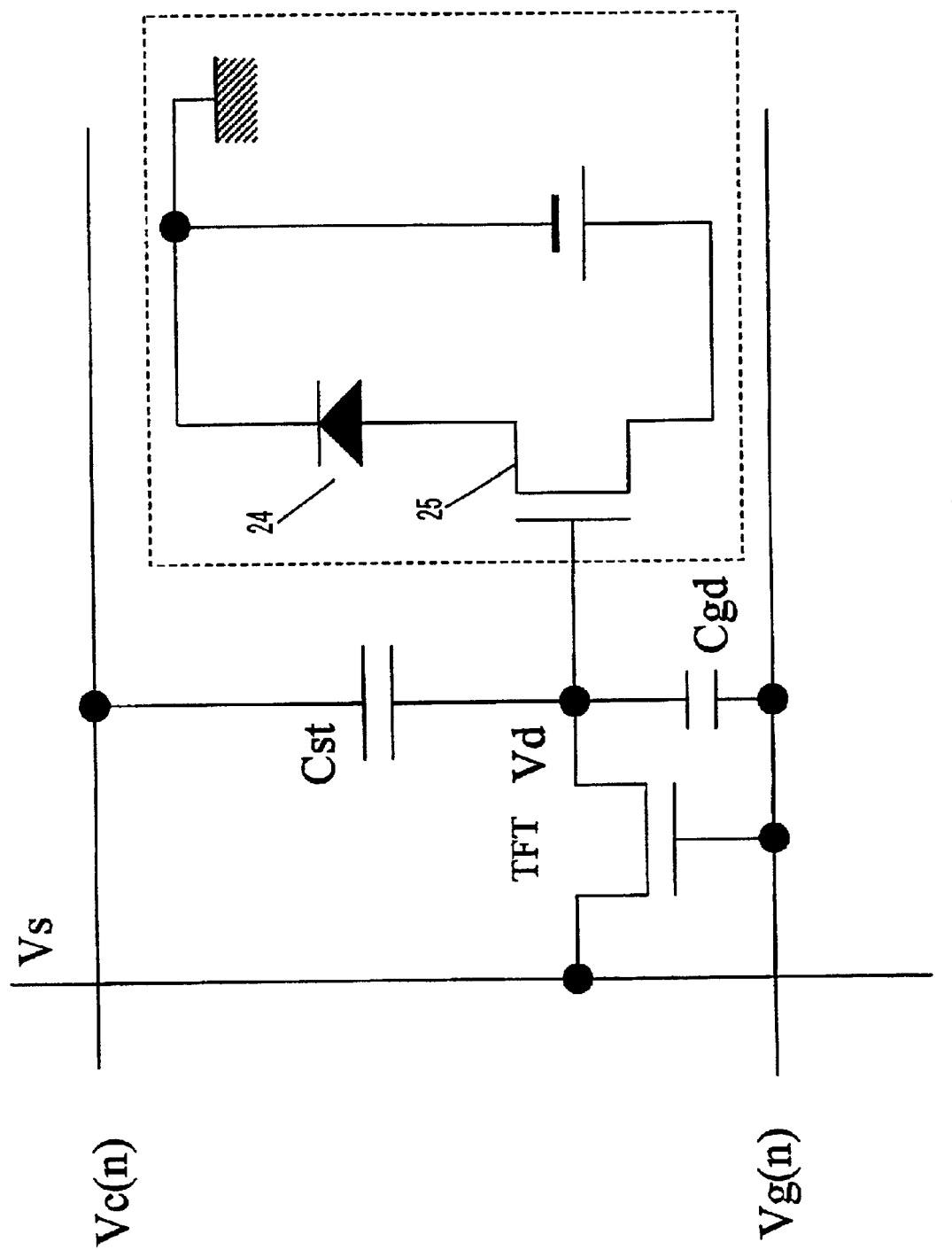
FIG. 31 is a pixel constituent diagram in the case where the present invention is applied to a display apparatus using an organic electroluminescence element.

An optical state of liquid crystal is controlled with an applied voltage (driving with a voltage), whereas an optical state of a self-emitting type diode, laser, electroluminescence material generally is controlled with a current (driving with a current). However, for example as shown in FIG. 31, if a pixel configuration is obtained in which a pixel TFT controls a gate potential of another auxiliary TFT 25 (also referred to as an auxiliary switching element), whereby a current flowing into an organic electroluminescence element 24 is controlled, active matrix type driving is made possible.

In this case, if the portion surrounded by a broken line is dealt with collectively, this can be considered as if it is a display medium whose optical state is controlled with a voltage. Therefore, the configuration of the present invention is applicable. In this case, the sum of a gate-source capacitance and a gate-drain capacitance of the auxiliary TFT 25 may be considered to be $C_{lc}$.

In such an element, it is not necessarily required to apply voltages with positive and negative polarities (i.e., a.c. driving) to a gate of the auxiliary TFT 25. However, even in the case of d.c. driving, when a gate potential (potential of a portion represented by $V_g(n)$ in FIG. 31) falls, a distribution in a display region is caused in the potential $V_d$ due to the distribution of a recharge voltage in a display region. The reason for this is as follows. For example, when the first and third formulae (or second and fourth formulae) among four formulae of (Formula 17) are compared with each other, a difference is caused between $\Delta V_b(O, +)$ and $\Delta V_b(E, +)$, whereby the value of $V_{do}(O, +)$ is different from the value $V_{do}(E, +)$. If a distribution is given to $\alpha_{st}$ or $\alpha_{gd}$ in a display region so as to shorten the distance between $V_{do}(O, +)$ and $V_{do}(E, +)$, a brightness gradient can be eliminated.

As described above, the effect of eliminating a brightness gradient cannot be obtained when $\gamma=\alpha_{st}V_{cp}/2$ is a constant value in a display region. In other words, by setting the value of $\gamma$ not to be constant in a display region, the effect of eliminating a brightness gradient can be obtained. As is understood from the descriptions of (Formula 12) to (Formula 14), $\gamma$ refers to a difference in a capacitive coupling voltage superimposed on pixel electrodes from common electrodes between the case where the polarity of a video signal is positive and the case where the polarity of a video signal is negative (in other words, a difference between the application of a positive voltage to a display medium and the application of a negative voltage thereto). More specifically, the following also can be considered: a distribution of a capacitive coupling voltage is varied in a display region between the application of a positive voltage to a display medium and the application of a negative voltage thereto, whereby the effect of eliminating a brightness gradient is obtained.

A capacitive coupling voltage superimposed on the pixel electrodes is not necessarily from common electrodes. However, in order to adjust the potential freely in synchronization with the scanning electrodes, it is desirable to use common electrodes.

A method for changing a value in a screen in the present invention basically is realized by setting such a layout intentionally (more specifically, by setting a design mask figure intentionally). However, even if a design mask figure is created as in the prior art (more specifically, layouts of a pixel P and a pixel Q are designed to be uniform in a screen without giving a difference therebetween), for example, by intentionally shifting mask alignment in the course of production, the effects of the present invention also can be obtained.

In order to change a capacitance value, it is easiest to change an overlapping area of two conductive layers (or semiconductor layers) in a capacitance formed by allowing two conductive layers (or semiconductor layers) to sandwich an insulating layer. However, the following also may be possible: a gap between two conductive layers on a layout is changed by utilizing a capacitance caused by two conductive layers (or semiconductor layers) that are not overlapped with each other in a plane but are close to each other. Furthermore, it may be possible to vary a capacitance by changing the thickness of an insulating layer or changing a dielectric constant in some cases.

In the above, correction of an in-plane distribution of a recharge voltage has been described. However, it also is appreciated that flickering and a brightness gradient caused by an error in a production process (size shift and non-uniformity caused by alignment, omission, leaving, and the like) can be corrected by the same method as that of the present invention.

In order to correct inconsistency of generation of a recharge voltage on the line basis, caused by a difference in the distance of a wiring portion from a scanning signal driving circuit to a screen end portion in respective lines, and a recharge voltage difference between the central portion and the upper and lower portions, caused by a fixed potential at an upper end or a lower end of the counter electrode particularly in the case of the configuration in FIG. 2, $\alpha_{st}$ and $\alpha_{gd}$ may be changed for each line.

In the above, the scanning signal driving circuit supplies a power from the upper side. However, it may supply a power from the lower side, or from upper and lower sides. Furthermore, the scanning signal driving circuit may supply a power alternately to every other column.

In the above, a scanning signal is supplied from the left (or right) side, and a video signal is supplied from the upper (or lower) side. However, the present invention is applicable to a display apparatus in which a scanning signal is supplied from the upper (or lower) side, and a video signal is supplied from the left (or right) side.

In the above-mentioned embodiments, a display apparatus has been described, which refers to the entire apparatus including a scanning signal driving circuit and a video signal driving circuit. In contrast, a portion at least including an array substrate, a counter substrate, and liquid crystal, without including a driving circuit, particularly is referred to as a "display element". The effects of the present invention can be obtained both in a display apparatus and a display element.

As the liquid crystal, a liquid crystal other than the above-mentioned TN liquid crystal and IPS liquid crystal may be used. VA (vertical alignment) liquid crystal having relatively high response speed and a high contrast may be used. Alternatively, MVA (multi-domain VA) liquid crystal or other liquid crystal may be used. For example, TN (twisted nematic) liquid crystal, STN (super twisted nematic) liquid crystal, ECB (electric field control birefringence) type liquid crystal including VA liquid crystal (vertical alignment liquid crystal or homeotropic liquid crystal), homogeneous alignment liquid crystal, and the like, bent liquid crystal, IPS (in-plane switching) liquid crystal, GH (guest-host) liquid crystal, polymer dispersion type liquid crystal, ferroelectric liquid crystal, antiferroelectric liquid crystal, OCB liquid crystal, discotic liquid crystal, and other various modes can be used. Liquid crystal may be of a normally white type (a transmittance is decreased with an increase in an applied voltage) or a normally black type (a transmittance is increased with an increase in an applied voltage. Furthermore, in addition to liquid crystal, a material whose optical characteristics are changed with an applied voltage may be used. For example, electrooptical liquid crystal such as BSO (bismuth silicon oxide) and the like can be used. Furthermore, an electrochromic material, a self-emitting diode, laser, electroluminescence material, and the like may be used. Alternatively, a DMD (deformable mirror device) and the like may be used. Since liquid crystal is least expensive, it is desirable to use liquid crystal.

In the above-mentioned embodiments, a direct-vision type liquid crystal display panel has been described mainly. However, the present invention also is applicable to a liquid crystal element (including a polycrystalline Si type, a single crystal Si type, SOI (silicon-on-insulator) type, and the like) used in a liquid crystal projector.

In the first to third embodiments, a display apparatus of a TN type configuration (more generally, a configuration in which a pixel electrode and a counter electrode form a parallel plate capacitance with a liquid crystal layer interposed therebetween) has been described. In the fourth to sixth embodiments, a display apparatus with an IPS type configuration (more generally, a configuration in which a common electrode and a pixel electrode are formed on the same substrate, and liquid crystal is operated with an electric field parallel to the substrate) has been described.

However, the first to third embodiments, i.e., the unit pixel circuit configuration in FIG. 14 may be implemented with an IPS type configuration. For example, a common electrode (potential $V_c(n)$) and a counter electrode (potential $V_f$) only need to be produced separately on a substrate (the counter electrode may be separated on the line basis or column basis).

Furthermore, the fourth to sixth embodiments, i.e., the unit pixel circuit configuration in FIG. 8 may be implemented with a TN-type configuration. In this case, a counter electrode formed on a substrate on a counter side plays a role as a common electrode. Generally, a counter electrode is one electrode formed over the entire surface of a display region. Therefore, it is required that the potential takes either $V_c(+)$ or $V_c(-)$ while the entire screen is scanned. However, the effects of the present invention are obtained similarly. In this case, $V_{coff}$ may be considered to be an average value, i.e., $[V_c(+)+V_c(-)]/2$ (in this case, according to (Formula 19), $\Delta V_{cc}=0$, so that the effect of enhancement of stability with time described in (Supplementary item 1 regarding the principle: $V_{cp}$ and $\Delta V_{cc}$) cannot be expected).

Needless to say, if a counter electrode is insulated on the line basis with a TN-type configuration, the potential of the counter electrode in each line can be set separately, and the fourth to sixth embodiments can be implemented as they are.

As a modified driving method of the present invention, there is a method for varying while keeping common electrodes or a counter electrode at the same potential, for example, in the unit pixel circuit configuration in FIGS. 8 and 14 (synchro gate driving method). For example, in FIG. 14, in the case where a video signal given by a video signal electrode is positive, a counter electrode potential $V_f$ and a common electrode potential $V_c(n)$ are set to be a first potential, and in the case where the video signal is negative, these potentials are set to be a second potential. In this case, the connection destinations (more specifically, $V_c(n)$ and $V_f$) of $C_{st}$ and $C_{lc}$ in FIG. 14 have the same potentials. Therefore, $C_{st}$ and $C_{lc}$ can be considered merely as a parallel capacitance, and $C_{st}+C_{lc}$ can be considered to be equivalent to $C_{lc}$ in FIG. 8 ($C_{st}$ in FIG. 8 may be 0).

Furthermore, the above-mentioned first potential may be considered to be $V_c(+)$, the second potential may be considered to be $V_c(-)$, and $V_{coff}$ may be considered to be an average value thereof, i.e., $[V_c(+)+V_c(-)]/2$ (in this case, according to (Formula 19), $\Delta V_{cc}=0$, so that the effect of enhancement of stability with time described in (Supplementary item 1 regarding the principle: $V_{cp}$ and $\Delta V_{cc}$) cannot be expected).

What is claimed is:

1. A display apparatus, comprising: a plurality of pixel electrodes arranged in a matrix; switching elements connected thereto; scanning electrodes; video signal electrodes; common electrodes; a counter electrode; a display medium interposed between the pixel electrodes and the counter electrode; and storage capacitance formed between the pixel electrodes and the common electrodes, wherein, in a case where a scanning electrode-pixel electrode capacitance between the pixel electrodes and the scanning electrodes is represented by $C_{gd}$, a common electrode-pixel electrode capacitance between the pixel electrodes and the common electrodes is represented by $C_{st}$, and a total capacitance connected electrically to the pixel electrodes is represented by $C_{tot}$, $\alpha_{gd}$ and $\alpha_{st}$ represented by $$\alpha_{gd}=C_{gd}/C_{tot}, \alpha_{st}=C_{st}/C_{tot} \quad \text{(Formula 1)}$$

are set to be different values between a portion close to feeding ends in a screen and a portion away therefrom, and an area of overlapping portions between the scanning electrodes and the pixel electrodes, and an area of overlapping portions between the common electrodes and the pixel electrodes are set to be larger in a screen center portion farthest from the feeding ends than in a screen end portion closest to the feeding ends, so that $\alpha_{gd}$ and $\alpha_{st}$ are both larger in the screen center portion farthest from the feeding ends than in the screen end portion closest to the feeding ends.

2. A display apparatus according to claim 1, comprising a video signal driving circuit for applying two kinds of video signals having different polarities to video signal electrodes in accordance with a display period.

3. A display apparatus according to claim 2, comprising a common electrode potential control circuit for applying a voltage signal to a plurality of common electrodes and a scanning signal driving circuit for applying a voltage signal to a plurality of scanning electrodes, the common electrode potential control circuit has output potential levels of at least two values, and the scanning signal driving circuit has output potential levels of at least two values.

4. A display apparatus according to claim 3, wherein the scanning signal driving circuit conducts writing to a plurality of lines simultaneously.

5. A display apparatus according to claim 4, wherein the display medium is liquid crystal of an OCB mode.

6. A display apparatus according to claim 3, wherein the scanning signal driving circuit and the common electrode potential control circuit are formed on the same substrate as that of the switching elements.

7. A display apparatus according to claim 1, wherein the display medium is liquid crystal.

8. A display apparatus according to claim 7, which has a configuration forming a parallel plate capacitance in which a liquid crystal layer is interposed between the pixel electrodes and the counter electrode.

9. A display apparatus according to claim 1, wherein at least one of capacitances forming $C_{tot}$ includes a capacitance formed by two conductive layers or semiconductor layers sandwiching an insulating layer therebetween, and an overlapping area of the two conductive layers or semiconductor layers is made different between the portion close to the feeding ends in the screen and the portion away therefrom, whereby $\alpha_{st}$ or $\alpha_{lc}$, and $\alpha_{gd}$ are allowed to have different values between the portion close to the feeding ends in the screen and the portion away therefrom.

10. A method for driving the display apparatus of claim 1, wherein after a potential is written to the pixel electrodes via the switching elements, a voltage is superimposed via $C_{st}$ and has a value different between the portion close to the feeding ends in the screen and the portion away therefrom.

11. A method for driving a display apparatus according to claim 10, wherein, when a scanning electrode is selected, a first potential level $V_c(+)$ is applied to common electrodes that are connection destinations of storage capacitance connected to pixel electrodes of a plurality of pixels belonging to the scanning electrode in a case where a polarity of a video signal is positive, and a second potential level $V_c(-)$ is applied thereto in a case where a polarity of the video signal is negative.

12. A display apparatus according to claim 1, wherein the display medium is composed of a medium whose optical state is controlled with a current and auxiliary switching elements.

13. A display apparatus according to claim 12, wherein the medium whose optical state is controlled with a current is an organic electroluminescence medium.

14. A display apparatus, comprising:
a plurality of pixel electrodes arranged in a matrix;
switching elements connected thereto;
scanning electrodes;
video signal electrodes;
common electrodes;
a counter electrode;
a display medium interposed between the pixel electrodes and the counter electrode;
storage capacitance formed between the pixel electrodes and the common electrodes;
a video signal driving circuit for applying two kinds of video signals having different polarities to video signal electrodes in accordance with a display period; and
a common electrode potential control circuit for applying a voltage signal to a plurality of common electrodes and a scanning signal driving circuit for applying a voltage signal to a plurality of scanning electrodes, the common electrode potential control circuit has output potential levels of at least two values, and the scanning signal driving circuit has output potential levels of at least two values,
wherein, in a vase where a scanning electrode-pixel electrode capacitance between the pixel electrodes and the scanning electrodes is represented by $C_{gd}$, a common electrode-pixel electrode capacitance between the pixel electrodes and the common electrodes is represented by $C_{st}$, and a total capacitance connected electrically to the pixel electrodes is represented by $C_{tot}$, $\alpha_{gd}$ and $\alpha_{st}$ represented by $$\alpha_{gd}=C_{gd}/C_{tot}, \alpha_{st}=C_{st}/C_{tot} \qquad \text{(Formula 1)}$$

are set to be different values between a portion close to feeding ends in a screen and a portion away therefrom, a potential of a scanning electrode becomes a first potential level $V_{gon}$ when the scanning electrode is selected and becomes substantially a second potential level $V_{goff}$ during a retention period in which the scanning electrode is not selected, a potential of a common electrode that is a connection destination of storage capacitance connected to pixel electrodes of a plurality of pixels belonging to the scanning electrode becomes a first potential level $V_c(+)$ in a ease where a polarity of a video signal is positive and a second potential level $V_c(-)$ in a case where the polarity of the video signal is negative, when the scanning electrode is selected, and in a case where a difference between the first potential level $V_c(+)$ of the common electrode and a potential during a subsequent retention period is represented by $\Delta V_c(+)$, and a difference between the second potential level $V_c(-)$ of the common electrode and a potential during a subsequent retention period is represented by $\Delta V_c(-)$, γ represented by $$\gamma=\alpha_{st}V_{cp}/2 \qquad \text{(Formula 2)}$$

$$(\text{where } V_{cp}=\Delta V_c(+)-\Delta V_c(-)) \qquad \text{(Formula 3))}$$

is set to be smaller in the portion away from the feeding ends in the screen, compared with the portion close thereto.

15. A display apparatus according to claim 14, wherein, assuming that a value of γ in the portion close to the feeding ends in the screen is γ(O), a value of γ in the portion away from the feeding ends in the screen is γ(E), and a value of γ in a portion in a middle therebetween in terms of a distance is γ(M), γ(M) is smaller than [γ(O)+γ(E)]/2.

16. A display apparatus according to claim 14, wherein $V_{cp}$ takes a negative value.

17. A display apparatus according to claim 14, wherein a common electrode potential is different between a retention period after the pixel electrodes are charged with a positive video signal and a retention period after the pixel electrodes are charged with a negative video signal.

18. A display apparatus, comprising:
a plurality of pixel electrodes arranged in a matrix;
switching elements connected thereto;
scanning electrodes;
video signal electrodes;
common electrodes;
a counter electrode;
a display medium interposed between the pixel electrodes and the counter electrode;
storage capacitance formed between the pixel electrodes and the common electrodes;
a video signal driving circuit for applying two kinds of video signals having different polarities to video signal electrodes in accordance with a display period; and
a common electrode potential control circuit for applying a voltage signal to a plurality of common electrodes mid a scanning signal driving circuit for applying a voltage signal to a plurality of scanning electrodes, the common electrode potential control circuit has output potential levels of at least two values, and the scanning signal driving circuit has output potential levels of at least two values, wherein, in a case where a scanning electrode-pixel electrode capacitance between the pixel electrodes and the scanning electrodes is represented by $C_{gd}$, a common electrode-pixel electrode capacitance between the pixel electrodes and the common electrodes is represented by $C_{st}$, and a total capacitance connected electrically to the pixel electrodes is represented by $C_{tot}$, $\alpha_{gd}$ and $\alpha_{st}$ represented by $$\alpha_{gd}=C_{gd}/C_{tot}, \alpha_{st}=C_{st}/C_{tot} \quad \text{(Formula 1)}$$

are set to be different values between a portion close to feeding ends in a screen and a portion away therefrom, a potential of a scanning electrode becomes a first potential level $V_{gon}$ when the scanning electrode is selected and becomes substantially a second potential level $V_{goff}$ during a retention period in which the scanning electrode is not selected, a potential of a common electrode that is a connection destination of storage capacitance connected to pixel electrodes of a plurality of pixels belonging to the scanning electrode becomes a first potential level $V_c(+)$ in a case where a polarity of a video signal is positive and a second potential level $V_c(-)$ in a case where the polarity of the video signal is negative, when the scamming electrode is selected, and in a case where a difference between the first potential level $V_c(+)$ of the common electrode and a potential during a subsequent retention period is represented by $\Delta V_c(+)$, and a difference between the second potential level $V_c(-)$ of the common electrode and a potential during a subsequent retention period is represented by $\Delta V_c(-)$, $\beta$ represented by $$\beta=\alpha_{gd}+\alpha_{st}(\Delta V_{cc}/\Delta V_{gon}) \quad \text{(Formula 4)}$$

$$\text{(where } \Delta V_{gon}=V_{gon}-V_{goff}, \Delta V_{cc}=[\Delta V_c(+)+\Delta V_c(-)]/2 \quad \text{(Formula 5))}$$

is set to be larger in the portion away from the feeding ends in the screen, compared with the portion close thereto.

19. A display apparatus according to claim 18, wherein, assuming that a value of $\beta$ in the portion close to the feeding ends in the screen is $\beta(O)$, a value of $\beta$ in the portion away from the feeding ends in the screen is $\beta(E)$, and a value of $\beta$ in a portion in a middle therebetween in terms of a distance is $\beta(M)$, $\beta(M)$ is larger than $[\beta(O)+\beta(E)]/2$.

20. A display apparatus according to claim 18, wherein $\Delta V_{cc}$ is negative.

21. A display apparatus, comprising:
a plurality of pixel electrodes arranged in a matrix;
switching elements connected thereto;
scanning electrodes;
video signal electrodes;
common electrodes;
a counter electrode;
a display medium interposed between the pixel electrodes and the counter electrode;
storage capacitance formed between the pixel electrodes and the common electrodes;

a video signal driving circuit for applying two kinds of video signals having different polarities to video signal electrodes in accordance with a display period; and a common electrode potential control circuit for applying a voltage signal to a plurality of common electrodes and a scanning signal driving circuit for applying a voltage signal to a plurality of scanning electrodes, the common electrode potential control circuit has output potential levels of at least two values, and the scanning signal driving circuit has output potential levels of at least two values, wherein, in a case where a scanning electrode-pixel electrode capacitance between the pixel electrodes and the scanning electrodes is represented by $C_{gd}$, a common electrode-pixel electrode capacitance between the pixel electrodes and the common electrodes is represented by $C_{st}$, and a total capacitance connected electrically to the pixel electrodes is represented by $C_{tot}$, $\alpha_{gd}$ and $\alpha_{st}$ represented by $$\alpha_{gd}=C_{gd}/C_{tot}, \alpha_{st}=C_{st}/C_{tot} \quad \text{(Formula 1)}$$

are set to be different values between a portion close to feeding ends in a screen and a portion away therefrom, a potential of a scanning electrode becomes a first potential level $V_{gon}$ when the scanning electrode is selected and becomes substantially a second potential level $V_{goff}$ during a retention period in which the scanning electrode is not selected, a potential of a common electrode that is a connection destination of storage capacitance connected to pixel electrodes of a plurality of pixels belonging to the scanning electrode becomes a first potential level $V_c(+)$ in a case where a polarity of a video signal is positive and a second potential level $V_c(-)$ in a case where the polarity of the video signal is negative, when the scanning electrode is selected, in a case where a difference between the first potential level $V_c(+)$ of the common electrode and a potential during a subsequent retention period is represented by $\Delta V_c(+)$, and a difference between the second potential level $V_c(-)$ of the common electrode and a potential during a subsequent retention period is represented by $\Delta V_c(-)$, $\gamma$ represented by $$\gamma=\alpha_{st}V_{cp}/2 \quad \text{(Formula 2)}$$

$$\text{(where } V_{cp}=\Delta V_c(+)-\Delta V_c(-)) \quad \text{(Formula 3))}$$

is set to be smaller in the portion away from the feeding ends in the screen, compared with the portion close thereto, and $\beta$ represented by $$\beta=\alpha_{gd}+\alpha_{st}(\Delta V_{cc}/\Delta V_{gon}) \quad \text{(Formula 4)}$$

$$\text{(where } \Delta V_{gon}=V_{gon}-V_{goff}, \Delta V_{cc}=[\Delta V_c(+)+\Delta V_c(-)]/2 \quad \text{(Formula 5))}$$

is set to be larger in the portion away from the feeding ends in the screen, compared with the portion close thereto.

22. A display element, comprising: a plurality of pixel electrodes arranged in a matrix; switching elements connected thereto; scanning electrodes; video signal electrodes; common electrodes; a counter electrode; a display medium interposed between the pixel electrodes and the counter electrode; and storage capacitance formed between the pixel electrodes and the common electrodes, wherein, in a case where a scanning electrode-pixel electrode capacitance between the pixel electrodes and the scanning electrodes is represented by $C_{gd}$, a common electrode-pixel electrode capacitance between the pixel electrodes and the common electrodes is represented by $C_{st}$, and a total capacitance connected electrically to the pixel electrodes is represented by $C_{tot}$, $\alpha_{gd}$ and $\alpha_{st}$ represented by $$\alpha_{gd}=C_{gd}/C_{tot}, \alpha_{st}=C_{st}/C_{tot} \quad \text{(Formula 1)}$$

are set to be different values between a portion close to feeding ends in a screen and a portion away therefrom, and an area of overlapping portions between the scanning electrodes and the pixel electrodes, and an area of overlapping portions between the common electrodes and the pixel electrodes are set to be larger in a screen center portion farthest from the feeding ends than in a screen end portion closest to the feeding ends, so that $\alpha_{gd}$ and $\alpha_{st}$ are both larger in the screen center portion farthest from the feeding ends than in the screen end portion closest to the feeding ends.

* * * * *

UNITED STATES PATENT AND TRADEMARK OFFICE
CERTIFICATE OF CORRECTION

PATENT NO.       : 6,963,335 B2  
APPLICATION NO.  : 10/049583  
DATED            : November 8, 2005  
INVENTOR(S)      : Tanaka et al.

Page 1 of 1

It is certified that error appears in the above-identified patent and that said Letters Patent is hereby corrected as shown below:

<u>Title page,</u>  
Item [54], Title, "APPARATUS METHOD" should read -- APPARATUS, METHOD --.

<u>Column 51,</u>  
Line 60, "in a vase where" should read -- in a case where --.

<u>Column 52,</u>  
Line 16, "in a ease where" should read -- in a case where --.  
Line 66, "common electrodes mid a" should read -- common electrodes and a --.

Signed and Sealed this

Twentieth Day of June, 2006

JON W. DUDAS  
*Director of the United States Patent and Trademark Office*